United States Patent
Li et al.

(10) Patent No.: US 12,429,247 B2
(45) Date of Patent: Sep. 30, 2025

(54) HEAT EXCHANGER AND MANUFACTURING METHOD THEREFOR, ELECTRIC CONTROL BOX, AND AIR CONDITIONING SYSTEM

(71) Applicants: GD Midea Heating & Ventilating Equipment Co., Ltd., Foshan (CN); Midea Group Co., Ltd., Foshan (CN)

(72) Inventors: Zhaohui Li, Foshan (CN); Yuzhao Luo, Foshan (CN); Feng Li, Foshan (CN)

(73) Assignees: GD Midea Heating & Ventilating Equipment Co., Ltd., Foshan (CN); Midea Group Co., Ltd., Foshan (CN)

( * ) Notice: Subject to any disclaimer, the term of this patent is extended or adjusted under 35 U.S.C. 154(b) by 184 days.

(21) Appl. No.: 18/231,242

(22) Filed: Aug. 7, 2023

(65) Prior Publication Data

US 2023/0383993 A1    Nov. 30, 2023

Related U.S. Application Data

(63) Continuation of application No. PCT/CN2021/120787, filed on Sep. 26, 2021.

(30) Foreign Application Priority Data

Feb. 8, 2021    (CN) .......................... 202110183051.2

(51) Int. Cl.
*F24F 13/30* (2006.01)
*F28F 1/02* (2006.01)
(Continued)

(52) U.S. Cl.
CPC .............. *F24F 13/30* (2013.01); *F28F 1/022* (2013.01); *F28F 1/12* (2013.01); *F28F 21/084* (2013.01);
(Continued)

(58) Field of Classification Search
CPC ........ F24F 13/30; F24F 1/0063; F24F 1/0067; F24F 1/16; F24F 1/24; F24F 1/32;
(Continued)

(56) References Cited

U.S. PATENT DOCUMENTS 5,279,360 A    1/1994   Hughes et al.
2003/0178188 A1  9/2003   Coleman
(Continued)

FOREIGN PATENT DOCUMENTS

CN    102062549 A  *  5/2011
CN    103069245 A     4/2013
(Continued)

OTHER PUBLICATIONS

Midea Group Co., Ltd., Brazilian Examination Report, BR Patent Application No. BR112023015803-6, Apr. 16, 2024, 4 pgs.
(Continued)

*Primary Examiner* — Emmanuel E Duke
(74) *Attorney, Agent, or Firm* — Morgan, Lewis & Bockius LLP

(57) ABSTRACT

A heat exchanger includes at least two plate bodies stacked with each other and at least one connecting sheet. Each of the at least two plate bodies is provided with a plurality of micro-passages. The at least one connecting sheet is arranged between adjacent plate bodies of the at least two plate bodies. A solder is disposed on each of two opposite sides of the at least one connecting sheet, and the solder is configured to weld and fix the at least one connecting sheet with the adjacent plate bodies of the at least two plate bodies.

20 Claims, 21 Drawing Sheets

(51) Int. Cl.
*F28F 1/12* (2006.01)
*F28F 21/08* (2006.01)
*F28D 21/00* (2006.01)

(52) U.S. Cl.
CPC .... *F28F 21/085* (2013.01); *F28D 2021/0035* (2013.01); *F28F 2260/02* (2013.01); *F28F 2275/04* (2013.01)

(58) Field of Classification Search
CPC .. F28F 1/022; F28F 1/12; F28F 21/084; F28F 21/085; F28F 2260/02; F28F 2275/04; F28F 2275/045; F28F 1/126; F28F 9/0243; F28F 9/26; F28F 3/12; F28F 2275/06; F28D 2021/0035; F28D 2021/0068; F28D 7/0025; F28D 7/1653; B23K 1/0012; B23P 15/26; F25B 49/02; F25B 2400/13; F25B 2600/2519; F25B 41/20; F25B 41/31; F25B 13/00; F25B 39/04; F25B 39/00; F25B 2400/054
See application file for complete search history.

(56) References Cited

U.S. PATENT DOCUMENTS

| | | |
|---|---|---|
| 2013/0126127 A1 | 5/2013 | Yoshimura et al. |
| 2016/0341498 A1 | 11/2016 | Lynn et al. |
| 2018/0169801 A1 | 6/2018 | Ueda et al. |
| 2018/0299171 A1 | 10/2018 | Olsen et al. |
| 2018/0340746 A1 | 11/2018 | Jin et al. |
| 2019/0368817 A1 | 12/2019 | Huang et al. |

FOREIGN PATENT DOCUMENTS

| | | | | |
|---|---|---|---|---|
| CN | 103277942 A | * | 9/2013 | |
| CN | 103574969 A | * | 2/2014 | ............ Y02B 30/70 |
| CN | 106440863 A | | 2/2017 | |
| CN | 107093611 A | | 8/2017 | |
| CN | 107796143 A | | 3/2018 | |
| CN | 110207428 A | | 9/2019 | |
| CN | 110686548 A | * | 1/2020 | ............... F28F 1/02 |
| CN | 210602337 U | | 5/2020 | |
| CN | 111679496 A | | 9/2020 | |
| CN | 112146310 A | * | 12/2020 | ............... F28F 9/26 |
| CN | 214666271 U | | 11/2021 | |
| EP | 2738507 A1 | | 6/2014 | |
| JP | H 0473599 A | | 3/1993 | |
| JP | 2003279275 A | | 10/2003 | |
| JP | 2005344969 A | | 12/2005 | |
| JP | 2006112756 A | | 4/2006 | |
| JP | 2006329537 A | * | 12/2006 | ............. F25B 40/00 |
| JP | 2010091251 A | * | 4/2010 | ........... F28D 7/0033 |
| JP | 2010175158 A | | 8/2010 | |
| JP | 2010216773 A | | 9/2010 | |
| JP | 2010266197 A | | 11/2010 | |
| JP | 2013029244 A | | 2/2013 | |
| JP | 2013234801 A | | 11/2013 | |
| JP | 2014066409 A | | 4/2014 | |
| JP | 2019168136 A | * | 10/2019 | ............... F28D 7/00 |
| RU | 2502932 C2 | | 11/2011 | |
| RU | 2011152837 A | | 12/2011 | |
| WO | WO 2012017681 A1 | | 2/2012 | |

OTHER PUBLICATIONS

Midea Group Co., Ltd., Extended European Search Report, EP Patent Application No. 21924220.3, Jun. 24, 2024, 7 pgs.
Midea Group Co., Ltd., Australian Examination Report, AU Patent Application No. 2021425176, Jul. 16, 2024, 7 pgs.
Midea Group Co., Ltd., Saudi Arabian Second Examination Report, SA U.S. Appl. No. 52/350,199, May 27, 2024, 12 pgs.
Midea Group Co., Ltd., Japanese Notice of Reasons for Refusal, JP Patent Application No. 2023-545362, Aug. 26, 2024, 18 pgs.
Midea Group Co., Ltd., Australian Second Examination Report, AU Patent Application No. 2021425176, Oct. 9, 2024, 4 pgs.
Midea Group Co., Ltd., Russian First Office Action, RU Patent Application No. 2023122677/12, Feb. 12, 2024, 10 pgs.
Midea Group Co., Ltd., Saudi Arabian First Examination Report, Saudi Arabia Patent Application No. 523450199, Mar. 10, 2024, 10 pgs.
Midea Group Co., Ltd., Chinese Office Action, CN Patent Application No. 202110183051.2, Mar. 9, 2023, 12 pgs.
Midea Group Co., Ltd., Chinese Office Action, CN Patent Application No. 202110183051.2, Jun. 28, 2023, 10 pgs.
Midea Group Co., Ltd., ISRWO, PCT/CN2021/120787, Dec. 30, 2021, 10 pgs.
Midea Group Co., Ltd., IPRP, PCT/CN2021/120787, Aug. 3, 2023, 8 pgs.

* cited by examiner

HEAT EXCHANGER AND MANUFACTURING METHOD THEREFOR, ELECTRIC CONTROL BOX, AND AIR CONDITIONING SYSTEM

CROSS-REFERENCE TO RELATED APPLICATIONS

The present application is a continuation of International (PCT) Patent Application No. PCT/CN2021/120787 filed on Sep. 26, 2021, which claims priority to Chinese patent application No. 202110183051.2, filed on Feb. 8, 2021, the contents of all of which are hereby incorporated by reference in their entireties.

TECHNICAL FIELD

The present disclosure relates to the technical field of air conditioners, in particular to a heat exchanger, a method for manufacturing the heat exchanger, an electric control box, and an air conditioning system.

BACKGROUND

Heat exchangers may be used widely in air conditioning systems and other fields. For example, an air conditioning system typically adopts a heat exchanger as an economizer to increase the degree of subcooling of an outlet of a condenser, thereby improving the refrigerating or heating capacity of a refrigerant per unit mass. A conventional heat exchanger includes a plate-type heat exchanger. The plate-type heat exchanger may be made by pressing thin metal plates into heat exchange plates with a certain ripple shape, stacking the metal plates on one another, and fastening the metal plates with clamps and bolts. Passages are formed between the heat exchange plates, and the refrigerant flows through the passages to achieve the heat exchange through the heat exchange plates. The heat exchanger may require multiple layers of stacked heat exchange plates, resulting in a large volume of the heat exchanger.

SUMMARY OF THE DISCLOSURE

The present disclosure provides a heat exchanger, a method for manufacturing the heat exchanger, an electric control box, and an air conditioning system.

A first aspect of the present disclosure provides a heat exchanger. The heat exchanger includes at least two plate bodies and at least one connecting sheet. The at least two plate bodies are stacked with each other and each of the at least two plate bodies is provided with a plurality of micro-passages. The connecting sheet is arranged between adjacent plate bodies of the at least two plate bodies. A solder is disposed on each of two opposite sides of the at least one connecting sheet, and the solder is configured to weld and fix the at least one connecting sheet with the adjacent plate bodies of the at least two plate bodies.

In some embodiments, the at least one connecting sheet disposed between the adjacent plate bodies of the at least two plate bodies is a single-layer structure, or the at least one connecting sheet comprises at least two connecting sheets disposed between the adjacent plate bodies and the at least two connecting sheets are welded and fixed with each other by using another solder.

In some embodiments, the melting point of the at least one connecting sheet is greater than the melting point of the solder.

In some embodiments, the at east one connecting sheet is an aluminum foil or a copper foil.

In some embodiments, the thickness of the at least one connecting sheet ranges from 0.9 mm to 1.2 mm.

In some embodiments, a coverage area of the solder on the at least one connecting sheet, which covers a corresponding one of the adjacent plate bodies that are located on the two opposite sides of the connecting sheet, is greater than or equal to 80% of an overlapping area of the adjacent plate bodies that are located on two sides of the connecting sheet.

In some embodiments, the at least two plate bodies comprise a first plate body and a second plate body, the first plate body is provided with a plurality of first micro-passages for a first refrigerant medium to flow, the second plate body is provided with a plurality of second micro-passages for a second refrigerant medium to flow, the second refrigerant medium is configured to absorb heat from the first refrigerant medium to subcool the first refrigerant medium, or the first refrigerant medium is configured to absorb heat from the second refrigerant medium to subcool the second refrigerant medium.

In some embodiments, the heat exchanger further includes a collecting tube, a tube wall of the collecting tube defines at least two insertion holes, the at least two plate bodies are in one-to-one correspondence with the at least two insertion holes and are fixed with the collecting tube by welding, and a distance between adjacent insertion holes of the at least two insertion holes is greater than or equal to 2 mm.

A third aspect of the present disclosure provides an electric control box. The electric control box includes a box body and a heat exchanger of any one of above embodiments. The heat exchanger is connected to the electric control box, and the heat exchanger is configured to dissipate heat of the electric control box.

A fourth aspect of the present disclosure provides an air conditioning system. The air conditioning system includes a compressor, an outdoor heat exchanger, an indoor heat exchanger and a heat exchanger of any one of above embodiments. The compressor is configured to provide a circulating refrigerant medium between the outdoor heat exchanger and the indoor heat exchanger through connecting pipelines, and the heat exchanger is disposed between the outdoor heat exchanger and the indoor heat exchanger and communicated with the connecting pipelines.

In some embodiments, at least two plate bodies with the plurality of micro-passages are stacked on each other, such that the volume of the heat exchanger may be effectively reduced. Furthermore, in some embodiments, the at least one connecting sheet is sandwiched between adjacent plate bodies of the at least two plate bodies, and the at least one connecting sheet and the at least two plate bodies are fixed through welding the solders on two opposite sides of the at least one connecting sheet, so that the welding process may be simple, the welding reliability may be high, and the processing cost may be reduced.

It is to be understood that the foregoing general description and the following detailed description are merely exemplary and illustrative, and are not intended to limit the present disclosure.

BRIEF DESCRIPTION OF THE DRAWINGS

The accompanying drawings here are incorporated into the specification and form a part of this specification. These drawings illustrate embodiments in accordance with the present disclosure and are used together with the specification to illustrate the technical solution of the present disclosure.

DETAILED DESCRIPTION

Technical solution in some embodiments of the present disclosure may be clearly and completely described in connection with accompanying drawings in some embodiments of the present disclosure. Obviously, the described embodiments are merely a part of the embodiments of the present disclosure, and not all embodiments. Based on the embodiments of the present disclosure, all other embodiments obtained by those of ordinary skill in the art without inventive effort are within the scope of the present disclosure.

Reference herein to "embodiments" means that, particular features, structures, or characteristics described in connection with embodiments may be included in at least one embodiment of the present disclosure. The phrase appearing in various positions in the specification does not necessarily refer to the same embodiments, nor is it an independent or alternative embodiment that is mutually exclusive with other embodiments. Technicians in the art explicitly and implicitly understand that the embodiments described in the present disclosure can be combined with other embodiments.

Figure 1:
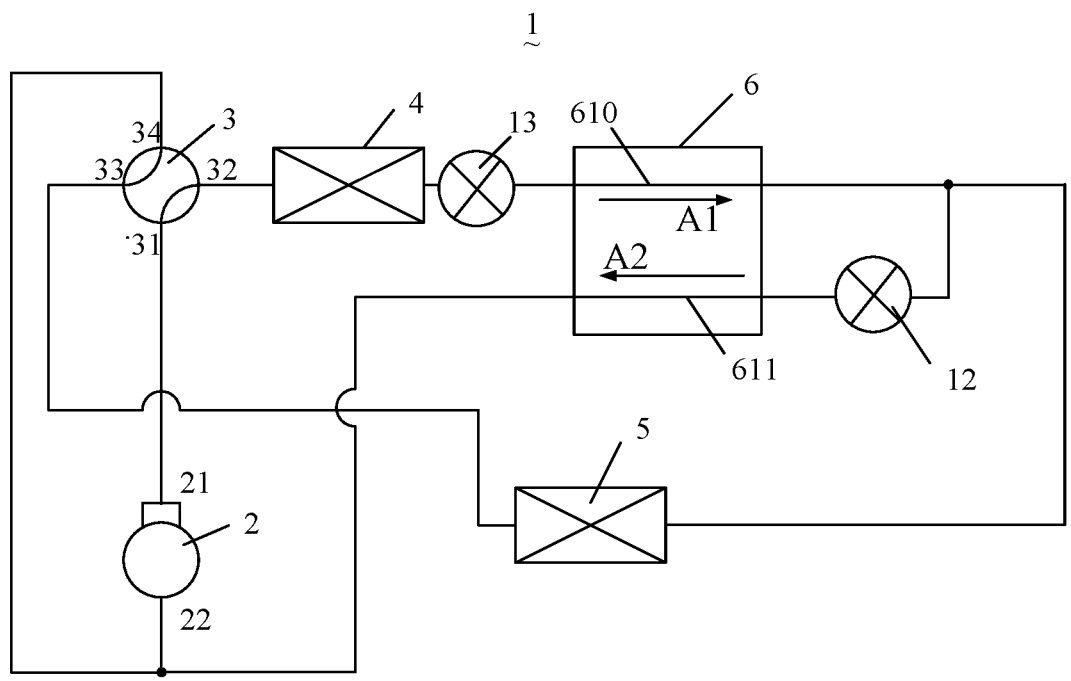
FIG. 1 is a schematic block diagram of some embodiments of an air conditioning system of the present disclosure.

As shown in FIG. 1, FIG. 1 is a schematic block diagram of some embodiments of an air conditioning system of the present disclosure. As shown in FIG. 1, the air conditioning system 1 includes a compressor 2, a four-way valve 3, an outdoor heat exchanger 4, an indoor heat exchanger 5, a heat exchanger 6, an expansion valve 12, and an expansion valve 13. The expansion valve 13 and the heat exchanger 6 are disposed between the outdoor heat exchanger 4 and the indoor heat exchanger 5. The compressor 2 is configured to provide circulating refrigerant flow between the outdoor heat exchanger 4 and the indoor heat exchanger 5 through the four-way valve 3.

The heat exchanger 6 includes a plurality of first heat exchange passages 610 and a plurality of second heat exchange passages 611. First ends of the first heat exchange passages 610 are connected to the outdoor heat exchanger 4 through the expansion valve 13, and second ends of the first heat exchange passages 610, which are opposite to the first ends of the first heat exchange passages 610, are connected to the indoor heat exchanger 5. First ends of the second heat exchange passages 611 are connected to the second ends of the first heat exchange passages 610 through the expansion valve 12, and second ends of the second heat exchange passages 611, which are opposite to the first ends of the second heat exchange passages 611, are connected to a suction port 22 of the compressor 2.

When the air conditioning system 1 is in a refrigeration mode, a flowing path of the refrigerant medium is as follows.

An exhaust port 21 of the compressor 2—a connection port 31 of the four-way valve 3—a connection port 32 of the four-way valve 3—the outdoor heat exchanger 4—the heat exchanger 6—the indoor heat exchanger 5—a connection port 33 of the four-way valve 3—a connection port 34 of the four-way valve 3—the suction port 22 of the compressor 2.

The path (main path) of the refrigerant medium in each of the first heat exchange passages 610 is: the first end of the first heat exchange passage 610—the second end of the first heat exchange passage 610—the indoor heat exchanger 5. The path (auxiliary path) of the refrigerant medium in each of the second heat exchange passages 611 is: the second end of the first heat exchange passage 610—the expansion valve 12—the first end of the second heat exchange passage 611—the second end of the second heat exchange passage 611—the suction port 22 of the compressor 2.

In some embodiments, an operating principle of the air conditioning system is: the outdoor heat exchanger 4 is used as a condenser and outputs a refrigerant medium with a medium pressure and a medium temperature (the refrigerant medium with the medium pressure and the medium temperature may be liquid refrigerant medium with a temperature of 40° C.) through the expansion valve 13. The refrigerant medium in each of the first heat exchange passages 610 is a refrigerant medium with the medium pressure and the medium temperature, the expansion valve 12 converts the refrigerant medium with the medium pressure and the medium temperature into a refrigerant medium with a low pressure and a low temperature (the refrigerant medium with the low pressure and the low temperature may be a refrigerant medium in two phases including liquid and gas with a temperature of 10° C.). The refrigerant medium in each of the second heat exchange passages 611 is the refrigerant medium with the low pressure and the low temperature. The refrigerant medium with the low pressure and the low temperature in each of the second heat exchange passages 611 absorbs heat from the refrigerant medium with the medium pressure and the medium temperature in each of the first heat exchange passages 610, so that the refrigerant medium in each of the second heat exchange passages 611 is vaporized, to further subcool the refrigerant medium in each of the first heat exchange passages 610. The vaporized refrigerant medium in each of the second heat exchange passage 611 is configured to perform enhanced vapor injection on the compressor 2, thereby improving the refrigeration capacity of the air conditioning system 1.

The expansion valve 12 may serve as a throttling portion of the second heat exchange passages 611, and configured to adjust a flow rate of the refrigerant medium in each of the second heat exchange passages 611. Heat exchange may be conducted between the refrigerant medium in each of the first heat exchange passages 610 and the refrigerant medium in each of the second heat exchange passages 611, so as to realize subcooling of the refrigerant medium in each of the first heat exchange passages 610. Therefore, the heat exchanger 6 may be used as an economizer of the air conditioning system 1, the subcooling degree is improved, and the heat exchange efficiency of the air conditioning system 1 is further improved.

Further, in a heating mode, the connecting port 31 of the four-way valve 3 is connected to the connecting port 33, and the connecting port 32 of the four-way valve 3 is connected to the connecting port 34. The refrigerant medium that is output from the compressor 2 through the exhaust port 21 flows from the indoor heat exchanger 5 to the outdoor heat exchanger 4, and the indoor heat exchanger 5 is used as the condenser. At this time, the refrigerant medium output from the indoor heat exchanger 5 is divided into two paths, one path of the two paths flows into the first heat exchange passages 610 (main path), and the other path of the two paths flows into the second heat exchange passages 611 (auxiliary path) through the expansion valve 12. The refrigerant medium in the second heat exchange passages 611 may also subcool the refrigerant medium in the first heat exchange passages 610, so that the heating capacity of the air conditioner is improved.

Figure 2:
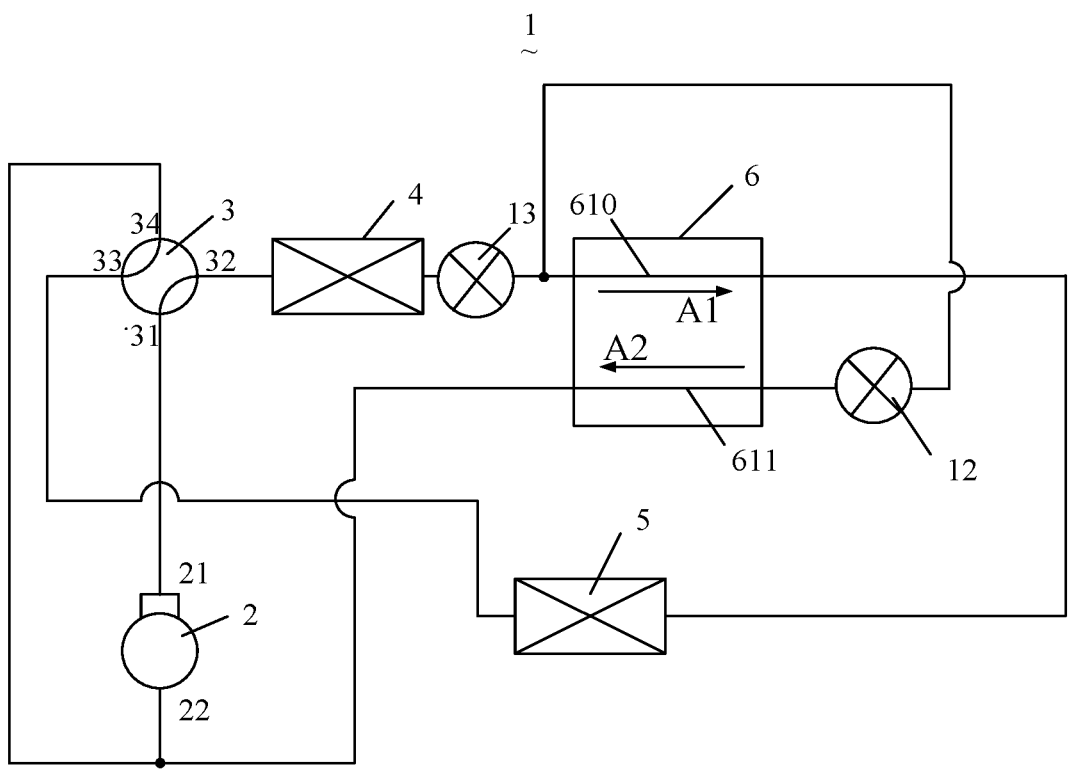
FIG. 2 is a schematic block diagram of some embodiments of the air conditioning system of the present disclosure.
Figure 3:
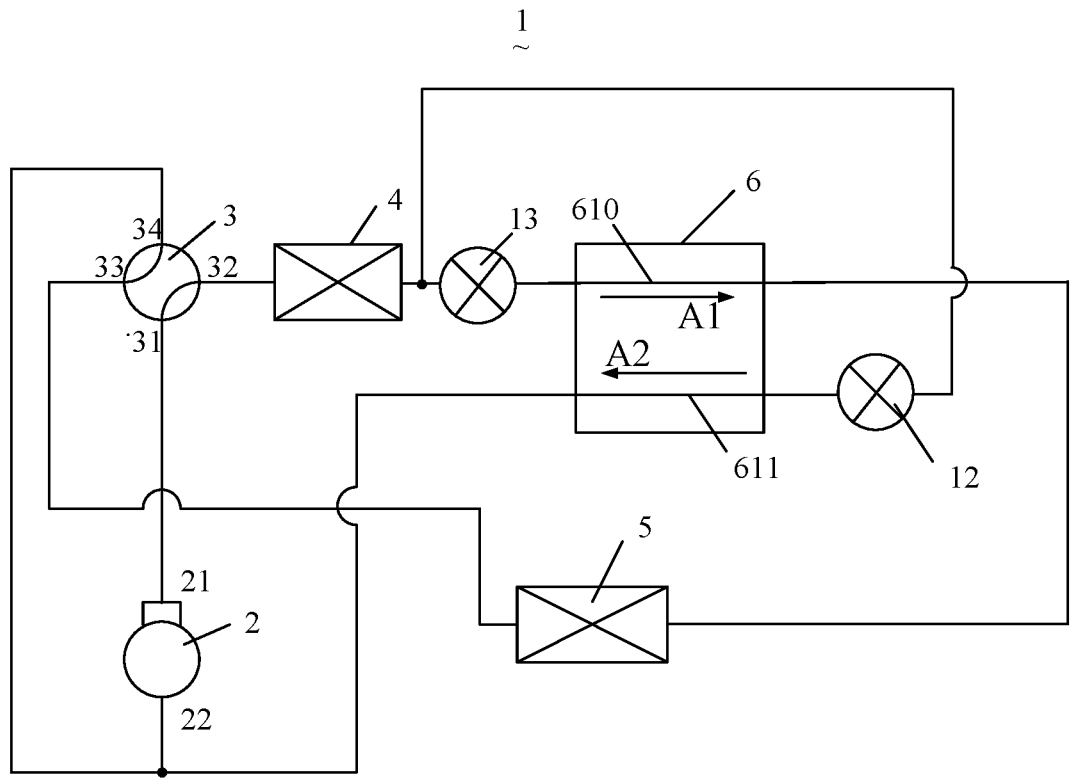
FIG. 3 is a schematic block diagram of some embodiments of the air conditioning system of the present disclosure.

In some embodiments, as shown in FIGS. 2 and 3, the first ends of the second eat exchange passages 611 may not be connected to the second ends of the first heat exchange passages 610, and the first ends of the second heat exchange passages 611 may be directly connected to the first end of the expansion valve 13 or the second end of the expansion valve 13, so that the refrigerant medium in the first heat exchange passages 610 may be subcooled by the refrigerant medium in the second heat exchange passages 611, thereby improving the refrigeration or heating capacity of the air conditioning system 1.

Figure 4:
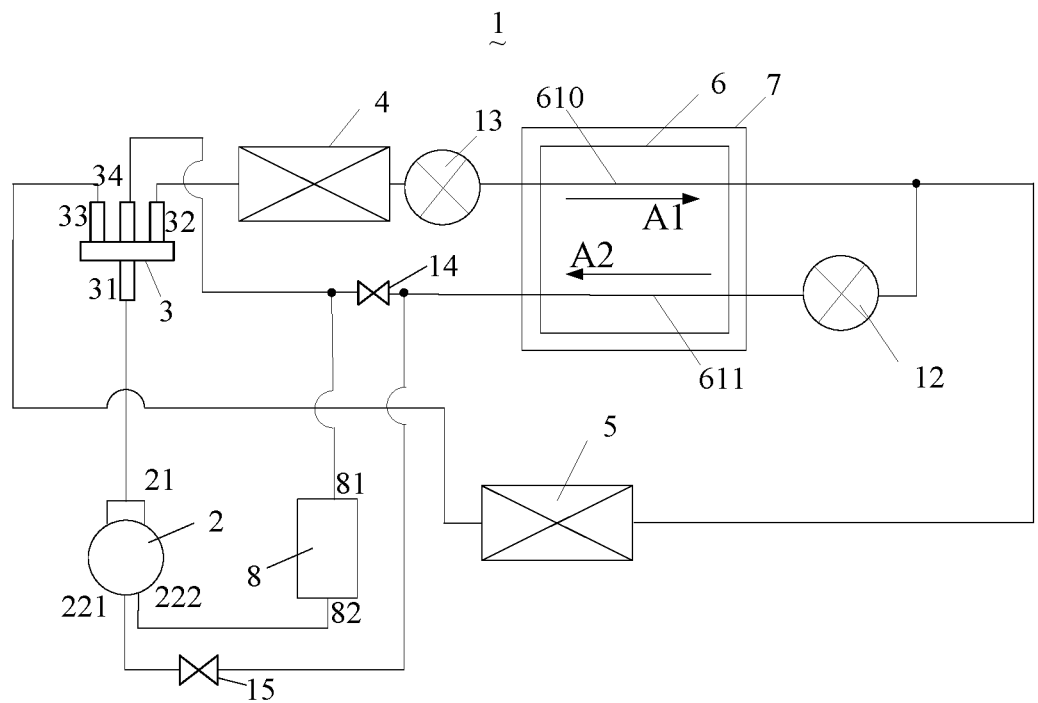
FIG. 4 is a schematic block diagram of some embodiments of the air conditioning system of the present disclosure.

As shown in FIG. 4, FIG. 4 is a schematic block diagram of some embodiments of the air conditioning system of the present disclosure. The difference between the air conditioning system 1 shown in FIG. 4 and the air conditioning system 1 shown in FIG. 1 includes that a gas-liquid separator 8 is added.

As in some embodiments shown in FIG. 1, the heat exchanger 6 includes the first heat exchange passages 610 through which first refrigerant medium flows and a second heat exchange passage 611 through which second refrigerant medium flows. The second refrigerant medium absorbs heat from the first refrigerant medium during the process flowing along the second heat exchange passages 611, to subcool the first refrigerant medium. In some embodiments, it is also possible that the first refrigerant medium absorbs heat from the second refrigerant medium during the process flowing along the first heat exchange passages 610, to subcool the second refrigerant medium. Therefore, the heat exchanger 6 may serve as the economizer of the air conditioning system 1, which improves the degree of subcooling, thereby improving the heat exchange efficiency of the air conditioning system 1.

In some embodiments, the suction port of the compressor 2 includes an enthalpy-increasing inlet 221 and a return port 222. The second refrigerant medium flowing through the second heat exchange passages 611 is further supplied to the enthalpy-increasing inlet 221 of the compressor 2 or an inlet 81 of the gas-liquid separator 8. An outlet 82 of the gas-liquid separator 8 is further connected to the return port 222 of the compressor 2 and configured to supply low-pressure gaseous refrigerant medium to the compressor 2.

Furthermore, the air conditioning system 1 also includes the four-way valve 3, the expansion valve 12, and the expansion valve 13. The expansion valve 13 and the heat exchanger 6 are disposed between the outdoor heat exchanger 4 and the indoor heat exchanger 5, and the compressor 2 may be configured to provide the circulating refrigerant medium between the outdoor heat exchanger 4 and the indoor heat exchanger 5 through the four-way valve 3.

The four-way valve 3 includes the connecting port 31, the connecting port 32, the connecting port 33, and the connecting port 34. The connecting port 32 of the four-way valve 3 is connected to the outdoor heat exchanger 4. The connecting port 34 of the four-way valve 3 is connected to the gas-liquid separator 8. The connecting port 31 of the four-way valve 3 is connected to the compressor 2. In some embodiments, the connecting port 31 of the four-way valve 3 is connected to the exhaust port 21 of the compressor 2. The connecting port 33 of the four-way valve 3 is connected to the indoor heat exchanger 5.

In the embodiments described above, the four-way valve 31 in the air conditioning system 1 is configured to realize mutual conversion between refrigeration and heating by changing a flowing direction of the refrigerant medium in pipelines of the air conditioning system 1, so that the air conditioning system 1 may be switched between the refrigeration mode and the heating mode. When the air conditioning system 1 has both the refrigeration and heating functions at the same time, the four-way valve 31 may be configured to achieve reversing.

In some embodiments, the air conditioning system 1 may also be configured without the four-way valve 31. When the air conditioning system 1 does not include the four-way valve 31, the compressor 2 may be directly connected to the outdoor heat exchanger 4 through a connecting pipeline. In some embodiments, the compressor 2 may be configured to provide the circulating refrigerant medium between the outdoor heat exchanger 4 and the indoor heat exchanger 5 through the connecting pipeline. The heat exchanger 6 is disposed between the outdoor heat exchanger 4 and the indoor heat exchanger 5, and is communicated with the connecting pipeline. In some embodiments, when the air conditioning system 1 only has the refrigeration capacity or the heating capacity, the air conditioning system 1 may be configured without the four-way valve 31, so that a structure of the air conditioning system 1 may be simplified, and a production cost of the air conditioning system 1 is saved. In addition, when the heat exchanger 6 is not used as the economizer, the heat exchanger 6 may be communicated with connecting pipelines at other positions.

The first ends of the first heat exchange passages 610 are connected to the outdoor heat exchanger 4 through the expansion valve 13. The second ends of the first heat exchange passages 610 are connected to the indoor heat exchanger 5. The first ends of the second heat exchange passages 611 are connected to the second ends of the first heat exchange passages 610 through the expansion valve 12. The second ends of the second heat exchange passages 611 are connected to the enthalpy-increasing inlet 221 of the compressor 2 or the inlet 81 of the gas-liquid separator 8.

When the second ends of the second heat exchange passages 611 are connected to the enthalpy-increasing inlet 221 of the compressor 2, gaseous refrigerant with a medium pressure may be provided for the enhanced vapor injection of the compressor 2, thereby improving the refrigeration and/or heating capacity of the air conditioning system 1. The principle and effect of enhanced vapor injection may be understood by those skilled in the art, and will not be described in some embodiments of the present disclosure. When the second ends of the second heat exchange passages 611 are connected to the inlet 81 of the gas-liquid separator 8, compared with a position with the medium pressure, an evaporation temperature of the refrigerant medium is low, the temperature difference is great, and the heat exchange efficiency of the air conditioning system 1 is further improved.

The air conditioning system 1 may also include a switching assembly. The switching assembly is configured to selectively connect the second ends of the second heat exchange passages 611 to the enthalpy-increasing inlet 221 of the compressor 2 and the inlet 81 of the gas-liquid separator 8. That is, the switching assembly may be configured to selectively convey the second refrigerant medium flowing through the second heat exchange passages 611 to the enthalpy-increasing inlet 221 of the compressor 2 and the inlet 81 of the gas-liquid separator 8.

In some embodiments, the switching assembly may include a solenoid valve 15. The solenoid valve 15 is connected between the enthalpy-increasing inlet 221 of the compressor 2 and the second ends of the second heat exchange passages 611, so that the solenoid valve 15 is turned on when the compressor 2 uses the enhanced vapor injection, thereby providing the gaseous refrigerant with the middle pressure for the enhanced vapor injection of the compressor 2.

The switching assembly may further include a solenoid valve 14, and the solenoid valve 14 is connected between the second ends of the second heat exchange passages 611 and the inlet 81 of the gas-liquid separator 8. The solenoid valve 14 is configured to be turned on when the compressor 2 does not use the enhanced vapor injection or when it is not suitable to perform the enhanced vapor injection, thereby guiding the second refrigerant medium output from the second ends of the second heat exchange passages 611 into the gas-liquid separator 8.

The solenoid valve 15 and the solenoid valve 14 are respectively connected to the second ends of the second heat exchange passages 612. The expansion valve 12 serves as the throttling portion of the second heat exchange passages 611, and configured to adjust the flow rate of the second refrigerant medium in the second heat exchange passages 611.

The refrigeration and heating principles of the air conditioning system 1 shown in FIG. 4 are substantially consistent with the refrigeration and heating principles of the air conditioning system 1 shown in FIG. 1, and will not be described further herein.

As shown in FIG. 4, the air conditioning system 1 also includes an electric control box 7. The heat exchanger 6 is connected to the electric control box 7, and the heat exchanger 6 is configured to dissipate heat of electronic components in the electric control box 7, see the description below for details. That is, the heat exchanger 6 may serve as the economizer of the air conditioning system 1 to improve the degree of subcooling, and may also serve as a heat sink to dissipate heat of the electric control box 7, and dissipates the heat of the electronic components in the electric control box 7.

The present disclosure further optimizes the following aspects 1 to 11 on the basis of the overall structure of the air conditioning system 1 described above.

1. Micro-Passage Heat Exchanger

Figure 5:
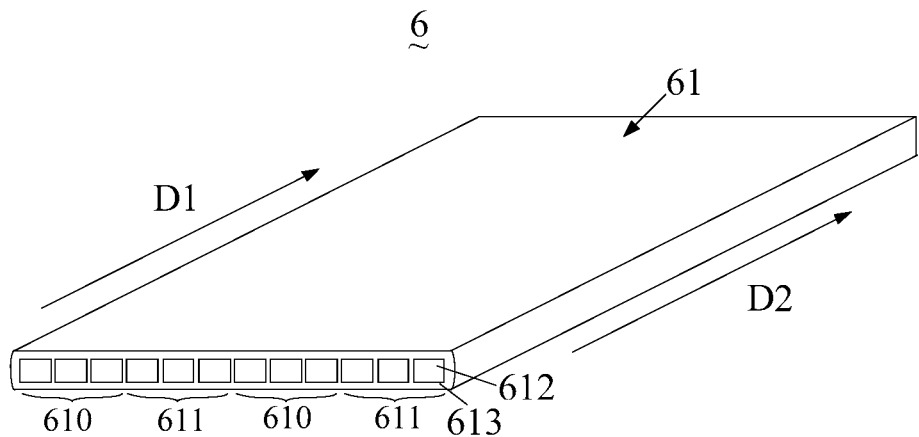
FIG. 5 is a structural schematic view of some embodiments of a heat exchange body of a heat exchanger of the present disclosure.
Figure 6:
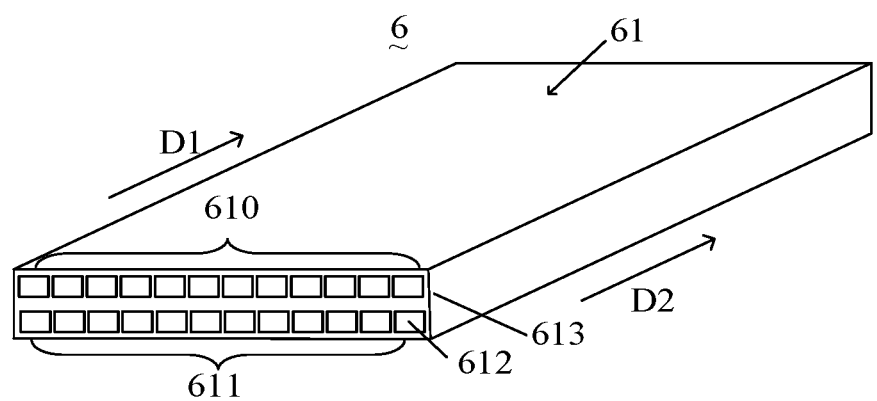
FIG. 6 is a structural schematic view of some embodiments of the heat exchange body of the heat exchanger of the present disclosure.
Figure 7:
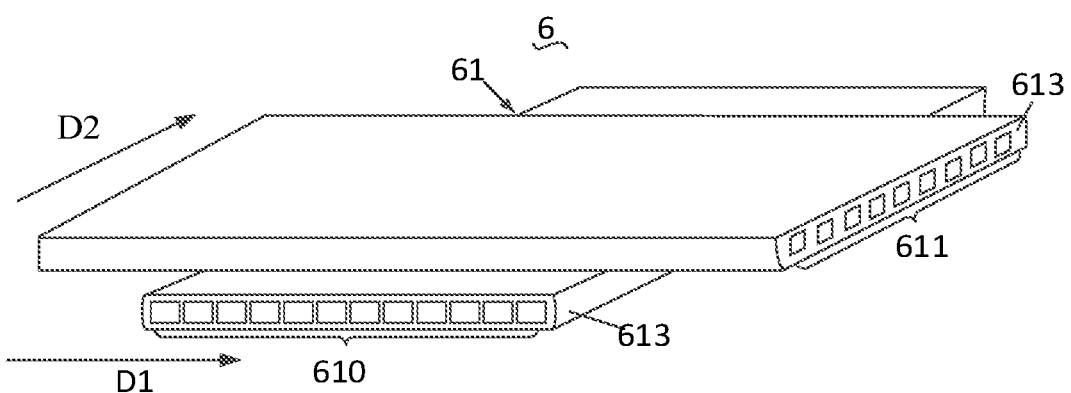
FIG. 7 is a structural schematic view of some embodiments of the heat exchange body of the heat exchanger of the present disclosure.

As shown in FIGS. 5, 6 and 7, the heat exchanger 6 includes a heat exchange body 61. The heat exchange body 61 is provided with a plurality of micro-passages 612. The plurality of micro-passages 612 include a plurality of first micro-passages and a plurality of second micro-passages. In the air conditioning system shown in FIGS. 1 to 4, the first micro-passages serve as the first heat exchange passages 610 of the heat exchanger 6, and the second micro-passages serve as the second heat exchange passages 611 of the heat exchanger 6. Thus, the first micro-passages 610 and the first heat exchange passages 610 are indicated by a same reference numeral, and the second micro-passages 611 and the second heat exchange passages 611 are indicated by a same reference numeral. The heat exchange body 61 may include a single plate body or multiple plate bodies 613.

For each micro-passage 612, the micro-passage 612 may have a cross section perpendicular to the extending direction of the micro-passage 612, and the cross section may be rectangular. Each micro-passage 612 has the length of 0.5 mm to 3 mm along the extending direction thereof. A distance between each micro-passage 612 and the corresponding surface of the plate body 613 and a distance between the micro-passages 612 are in a range from 0.2 mm to 0.5 mm, so that the micro-passages 612 meet the requirements of pressure resistance and heat transferring performance. In some embodiments, the cross section of each micro-passage 612 along the direction perpendicular to the extending direction of the micro-passage 612 may be in other shapes, such as circular, triangular, trapezoidal, elliptical, or irregular.

The plurality of micro-passages 612 may be configured as single-layered micro-passages or multilayered micro-passages. The larger the cross-sectional area of each of the plurality of micro-passages 612, the shorter the length of each of the plurality of micro-passages 612 when the flow rate of the refrigerant medium is low and the refrigerant medium is in a laminar flowing state, the flow resistance loss of the refrigerant medium may be reduced.

The plurality of micro-passages 612 defined in the plate body 613 may include the first micro-passages 610 and the second micro-passages 611 alternately arranged. The first micro-passages 610 extend along an extending direction D1, the second micro-passages 611 extend along an extending direction D2, and the extending direction D1 is parallel to the extending direction D2. In some embodiments, as shown in FIG. 5, a first preset number of micro-passages selected from the plurality of micro-passages 612 are defined as the first micro-passages 610, a second present number of micro-passages selected from the plurality of micro-passages 612 are defined as the second micro-passages 611, and multiple groups of first micro-passages 610 and multiple groups of second micro-passages 611 are alternately arranged in sequence. That is, the second micro-passage 611 is disposed between the two groups of first micro-passages 610, and the first micro-passage 610 is disposed between the two groups of second micro-passages 611, so that the at least two groups of first micro-passages 610 are spaced apart from each other, and the at least two groups of second micro-passages 611 are spaced apart from each other. Thus, the heat exchanger 6 having the first micro-passages 610 and the second micro-passages 611 arranged alternately is formed. The first preset number and the second preset number may be equal to each other or different from each other.

Further, in an usage scenario of FIGS. 1 to 4, the first micro-passages 610 and the second micro-passages 611 may be independent of each other so that different refrigerant media may flow therethrough, and thus one refrigerant medium may be used to subcool another refrigerant medium. In some embodiments, the first micro-passages 610 and the second micro-passages 611 may be communicated with each other, and used as a single micro-passage to allow the same refrigerant medium to flow therethrough. In addition, when the first micro-passages 610 and/or the second micro-passages 611 are disposed in two or more layers, the first micro-passages 610 and/or the second micro-passages 611 in the two or more layers may be communicated with each other through a reverse collecting tube, which is a collecting tube configured to reverse the flowing direction of the refrigerant medium flowing therethrough. Or, the plate body 613 is bent by 180 degrees to form the first micro-passages 610 and/or the second micro-passages 611 in the two or more layers.

In some embodiments, as shown in FIG. 5, the heat exchange body 61 may include at least one group of first micro-passages 610 and at least one group of second micro-passages 611. The at least one group of first micro-passages 610 and the at least one group of second micro-passages 611 are spaced apart from each other in a width direction of the plate body 613, and the width direction of the plate body 613 is perpendicular to an extending direction of the plate body 613.

In some embodiments, as shown in FIG. 6, the at least one group of first micro-passages 610 and the at least one group of second micro-passages 611 may also be spaced apart from each other in a thickness direction of the plate body 613, and the thickness direction of the plate body 613 is perpendicular to the extending direction of the plate body 613.

In some embodiments, as shown in FIG. 7, the first micro-passages 610 and the second micro-passages 611 are independent of each other, and are respectively disposed or defined in different plate bodies 613, so that the extending direction D1 of the first micro-passages 610 and the extending direction D2 of the second micro-passages 611 are perpendicular to each other. In this way, the first collecting tube and the second collecting tube described below may be respectively disposed on different side surfaces of the heat exchanger 6, thereby facilitating the arrangement of the collecting tubes of the heat exchanger 6. In some embodiments, different refrigerant media may flow through the first micro-passages 610 and the second micro-passages 611, so that one refrigerant medium may be used to subcool the other refrigerant medium.

Further, the plate body 613 may be a flat tube, so that a heat dissipation component or an electronic component may be disposed on the plate body 613. In some embodiments, the plate body 613 may also be a carrier having a cross section in other shapes, such as having a cylinder cross section, a rectangular cross section, a square cross section, and the like. In some embodiments, as described below, the heat exchange body 61 may also include at least two plate bodies 613 or two tubes. The two plate bodies 613 may be stacked on each other. For the two tubes, one of the two tubes may be sleeved on the other of the two tubes.

In some embodiments, when the air conditioning system shown in FIGS. 1 to 4 is in the refrigeration mode, the first refrigerant medium (i.e., the refrigerant medium having the medium pressure and the medium temperature) flows through the first micro-passages 610, the second refrigerant medium (i.e., the refrigerant medium having the low pressure and the low temperature) flows through the second micro-passages 611. The first refrigerant medium may be a liquid phase refrigerant medium, and the second refrigerant medium may be a medium in two phases including liquid and gas. When flowing along the second micro-passages 611, the second refrigerant medium absorbs heat from the first refrigerant medium flowing in the first micro-passages 610 and is further gasified, so that the first refrigerant medium is further subcooled.

The heat exchanger 6 having the micro-passages described above and below is not limited to the application scenarios shown in FIGS. 1 to 4. Thus, the terms "first" and "second" in the first micro-passages 610, the second micro-passages 611, the first refrigerant medium, and the second refrigerant medium are merely used to distinguish between different micro-passages and refrigerant media, and it should not be construed as limiting specific applications of the micro-passages 612 and refrigerant media. For example, in some embodiments or modes of operation, the first refrigerant medium that flows through the first micro-passages 610 may absorb heat from the second refrigerant medium that flows through the second micro-passages 611. The first refrigerant medium and the second refrigerant medium are not limited to be in the liquid phase or the gas-liquid phase as defined above.

As shown in FIGS. 1 to 4, a flowing direction A1 of the first refrigerant medium is opposite to a flowing direction A2 of the second refrigerant medium, so that a large temperature difference exists between the temperature of the first refrigerant medium and the temperature of the second refrigerant medium in an heat exchange area, and the heat exchange efficiency between the first refrigerant medium and the second refrigerant medium is improved.

In some embodiments, the flowing direction A1 of the first refrigerant medium may be the same as or perpendicular to the flowing direction A2 of the second refrigerant medium. When the flowing direction A1 of the first refrigerant medium is the same as the flowing direction A2 of the second refrigerant medium, the temperature of an area of the heat exchanger 6 on the side close to the inlet is lower, so that the heat exchange effect in the area is improved. In some embodiments, the area is connected to an area with greater heating caused by electric control to improve the heat dissipation effect. When the flowing direction A1 of the first refrigerant medium is perpendicular to the flowing direction A2 of the second refrigerant medium, the first collecting tube and the second collecting tube are disposed on different side surfaces of the heat exchanger 6, respectively, so that the arrangement of the refrigerant collecting tubes of the heat exchanger may be facilitated.

1.1 Collecting Tube Assembly

Figure 8:
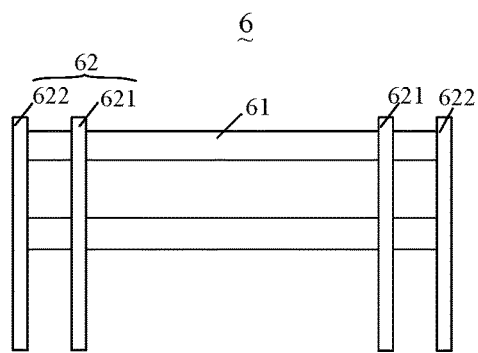
FIG. 8 is a structural schematic view illustrating some embodiments of the heat exchange body and a collecting tube assembly of the heat exchanger of the present disclosure.

As further shown in FIG. 8, the heat exchanger 6 further includes a collecting tube assembly 62. The extending direction of the collecting tube assembly 62 is perpendicular to the extending direction of the heat exchange body 61. In some embodiments, when the heat exchange body 61 is disposed along the horizontal plane, the collecting tube assembly 62 is disposed vertically in the gravity direction, so that when the collecting tube assembly 62 is connected to the compressor disposed below the heat exchanger 6, the pipeline arrangement of the collecting tube assembly 62 may be facilitated.

When the heat exchange body 61 is vertically disposed along the gravity direction, the collecting tube assembly 62 is disposed along the horizontal plane, so that the refrigerant may be distributed in the collecting tube assembly 62 more evenly, and the refrigerant may be distributed in the heat exchange body 6 more evenly.

As shown in FIG. 8, the collecting tube assembly 62 includes a first collecting tube 621 and a second collecting tube 622. The first collecting tube 621 is provided with a first collecting passage, and the second collecting tube 622 is provided with a second collecting passage. The heat exchanger 6 has a cross section in the flowing direction of the refrigerant medium (the first refrigerant medium or the second refrigerant medium) in the heat exchange body 61, and the cross section is I-shaped. In some embodiments, the cross section of the heat exchanger 6 in the flowing direction of the refrigerant medium in the heat exchange body 61 may be L-shaped, U-shaped, G-shaped, circular, etc.

The first collecting tube is connected to and communicated with the first micro-passages 610, so as to provide the first refrigerant medium to the first micro-passages 610 through the first collecting passage and/or collect the first refrigerant medium flowing through the first micro-passages 610.

In some embodiments, in the air conditioning system shown in FIGS. 1 to 4, for each first micro-passage 610, the first end of the first micro-passage 610 is connected to the outdoor heat exchanger 4 through one of two first collecting tubes 621 via the expansion valve 13. In this way, in the refrigeration mode, the first refrigerant medium may be provided to the first micro-passage 610. The second end of the first micro-passage 610 is connected to the indoor heat exchanger 5 through the other of the two first collecting tubes 621, so as to collect the first refrigerant medium flowing through the first micro-passage 610. In the heating mode, since the first refrigerant medium may flow in the first micro-passage 610 in an opposite direction, functions of the two first collecting tubes 621 may be interchanged compared with the functions in the refrigeration mode.

The second collecting passage is connected to and communicated with the second micro-passages 611, so as to provide the second refrigerant medium to the second micro-passages 611 through the second collecting passage and/or collect the second refrigerant medium flowing through the second micro-passages 611. In some embodiments, in the air conditioning system shown in FIGS. 1 to 4, for each second micro-passage 611, the first end of the second micro-passage 611 is connected to the second expansion valve 12 through one of the two second collecting tubes 622, so as to provide the second refrigerant medium to the second micro-passage 611. The second end of the second micro-passage 611 is connected to the enthalpy-increasing inlet 221 of the compressor 2 or the inlet 81 of the gas-liquid separator 8 through the other of the two second collecting tubes 622, so as to collect the second refrigerant medium flowing through the second micro-passage 611.

When the first micro-passages 610 are communicated with each other via bending by 180° or via the reverse collecting tube to form two layers of the first micro-passages 610, and/or when the second micro-passages 611 are communicated with each other via bending by 180° or via the reverse collecting tube to form two layers of the second micro-passages 611, the inlets and the outlets of the first micro-passages 610 may be disposed on the same side of the heat exchange body 61, and/or the inlets and outlets of the second micro-passages 611 may be disposed on the same side of the heat exchange body 61. In this case, each of the first collecting passage and the second collecting passage may include a refrigerant providing area and a refrigerant collecting area. The inlets and the outlets of the first and/or second micro-passages are respectively connected to the refrigerant providing area and the refrigerant collecting area of the collecting tube assembly 62.

In some embodiments, the heat exchange body 61 includes at least two groups of first micro-passages 610 and at least two groups of second micro-passages 611. The same ends of the at least two groups of first micro-passages 610 are connected to the same first collecting tube 621, and the same ends of the at least two groups of second micro-passages 611 are connected to the same second collecting tube 622. That is, one collecting tube may correspond to a plurality of groups of micro-passages, so that it is possible to avoid disposing corresponding collecting tubes on each micro-passage, and the cost is reduced.

In some embodiments shown in FIG. 8, since the extending direction D1 of the first micro-passages 610 and the extending direction D2 of the second micro-passages 611 are parallel to each other, the extending directions of the first collecting tube 621 and the second collecting tube 622 are parallel to each other. However, in some embodiments, the extending directions of the first collecting tube 621 and the second collecting tube 622 may be adjusted in accordance with the extending directions of the first micro-passages 610 and the second micro-passages 611, such as, perpendicular to each other.

1.2 First Collecting Tube and Second Collecting Tube Spaced Apart from Each Other As shown in FIG. 8, the first collecting tube 621 and the second collecting tube 622 are spaced apart from each other, and the second collecting tube 622 is farther away from the heat exchange body 61 than the first collecting tube 621. The first collecting tube 621 is disposed between the second collecting tube 622 and the heat exchange body 61.

Figure 9:
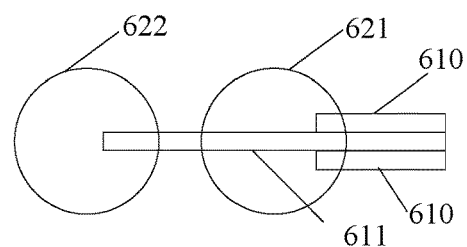
FIG. 9 is a structural schematic view illustrating some embodiments of the heat exchange body and the collecting tube assembly of the heat exchanger of the present disclosure.
Figure 10:
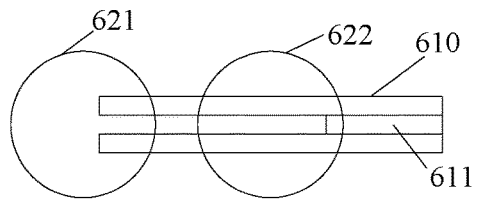
FIG. 10 is a structural schematic view of some embodiments of the heat exchange body and the collecting tube assembly of the heat exchanger of the present disclosure.

In some embodiments, as shown in FIG. 9, each second micro-passage 611 extends through the first collecting tube 621 and is inserted into and welded with the second collecting tube 622. Each first micro-passage 610 is inserted into and welded with the first collecting tube 621. In some embodiments, as shown in FIG. 10, the first collecting tube 621 is disposed farther away from the heat exchange body 61 than the second collecting tube 622, and the second collecting tube 622 is disposed between the first collecting tube 621 and the heat exchange body 61. Each first micro-passage 610 extend through the second collecting tube 622, and is inserted into and welded with the first collecting tube 621.

The micro-passage extending through the collecting tube described here and in other positions of the present disclosure refers to the micro-passage extending through the collecting tube without being communicated with the collecting tube. The micro-passage being inserted into the collecting tube refers to the micro-passage being communicated with the collecting tube. In some embodiments, the second micro-passage 611 extending through the first collecting tube 621 refers to the second micro-passage 611 extending through the first collecting tube 621 without being communicated with the first collecting tube 621. The second micro-passage 611 being inserted into the second collecting tube 622 refers to the second micro-passage 611 being communicated with the second collecting tube 622.

One or more groups of first micro-passage 610 and one or more groups of second micro-passage 611 may be provided. In some embodiments, as shown in FIG. 9, two groups of first micro-passages 610 and one group of second micro-passages 611 may be arranged, and the one group of second micro-passages 611 are located between the two groups of first micro-passages 610. In some embodiments, two or more groups of first micro-passages 610 and two or more groups of second micro-passages 611 may be arranged, and the two or more groups of first micro-passages 610 and the two or more groups of second micro-passages 611 are alternately stacked on each other. In some embodiments, the first micro-passages 610 and the second micro-passages 611 are arranged in the following form: the first micro-passage 610—the second micro-passage 611—the first micro-passage 610—the second micro-passage 611, or the first micro-passage 610—the second micro-passage 611—the second micro-passage 611—the first micro-passage 610, and the like.

In some embodiments, as shown in FIG. 9, one of the first micro-passage 610 and the second micro-passage 611 may serve as a main passage. The other of the first micro-passage 610 and the second micro-passage 611 may serve as an auxiliary passage. The refrigerant medium in the auxiliary passage is utilized to subcool the refrigerant medium in the main passage. Since the flow rate of the refrigerant medium in the main passage is large and the flow rate of the refrigerant medium in the auxiliary passage is small, the main passage may be arranged outside of the heat exchange body 61, so that the main passage is easy to be connected to the electric control box 7 for dissipating the heat of the electric control box 7. In addition, in some embodiments, the main passage with a large flow rate extends through the collecting tube corresponding to the auxiliary passage, and is inserted into the collecting tube corresponding to main passage. In this way, compared with the auxiliary passage extending through the collecting tube corresponding to the main passage, the space of the collecting tube corresponding to the main passage may not be occupied, the pressure loss of the flow path of the collecting tube corresponding to the main passage may be reduced, so that the flow distribution may be more uniform.

In some embodiments, as shown in FIG. 10, when the first micro-passage 610 is the main passage with a large flow rate and the second micro-passage 611 is the auxiliary passage with a small flow rate, the first micro-passage 610 may extend through the second collecting tube 622 and is inserted into the first collecting tube 621, so that the second micro-passage 611 does not occupy the space of the first collecting tube 621. Compared with the way that the second micro-passage 610 extends through the first collecting tube 621, the pressure loss of the flow path of the first collecting tube 621 may be reduced, and the flow distribution may be more uniform.

In some embodiments, the first collecting tube 621 and the second collecting tube 622 may be welded together to reduce the distance between the first collecting tube 621 and the second collecting tube 622. In some embodiments, the first collecting tube 621 and the second collectin tube 622 may be bonded or snapped together.

In addition, the first micro-passage 610 may be connected to the first collecting tube 621 after bypassing the second collecting tube 622. In some embodiments, the first micro-passage 610 is disposed outside of the second collecting tube 622 to be connected to the first collecting tube 621 after bypassing the second collecting tube 622, or the second micro-passage 611 may be connected to the second collecting tube 622 after bypassing the first collecting tube 621.

In some embodiments, the micro-passages defined in the heat exchange body 61 may also be provided in other ways. At least part of the micro-passages may extend through one of the at least two collecting tubes, and be inserted into another of the at least two collecting tubes. In this way, the volume of the heat exchanger 6 may be reduced. In specific arrangement, the micro-passage with a large flow rate may extend through one of the at least two collecting tubes, and be inserted into another of the at least two collecting tubes. In this way, the pressure loss of the collecting tube may be reduced, and the flow distribution of the micro-passage may be more uniform.

The heat exchange body 61 may include one plate body 613, or include a plurality of plate bodies 613. Accordingly, the first micro-passages 610 and the second micro-passages 611 may be disposed in the same plate body 613, or may also be disposed in different plate bodies 613. In some embodiments, when the first micro-passages 610 and the second micro-passages 611 are disposed in the same plate body 613, one end of each of a part of the micro-passages extends through one of the at least two collecting tubes and is inserted into the other of the at least two collecting tubes, and the other end of the corresponding one of the part of the micro-passages is inserted into the collecting tube through which the corresponding micro-passage extends. Due to this arrangement, the integration level of the heat exchange body 61 maybe improved, procedures such as welding and the like may be omitted, and the heat exchange effect is improved.

The spacing arrangement of the at least two collecting tubes are not limited to that described above, and the at least two collecting tubes may be formed by the combination of a main collecting tube and a baffle plate as described below.

1.3 Main Collecting Tube being Divided into Two Collecting Tubes

Figure 11:
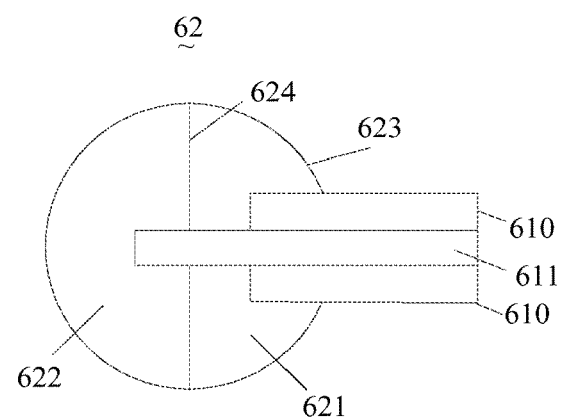
FIG. 11 is a structural schematic view of some embodiments of the heat exchange body and the collecting tube assembly of the heat exchanger of the present disclosure.

As shown in FIG. 11, the collecting tube assembly 62 includes a main collecting tube 623 and a baffle plate 624 disposed within the main collecting tube 623, so as to divide the main collecting tube 623 into the first collecting tube 621 and the second collecting tube 622 by the baffle plate 624. In some embodiments, the number of the baffle plates 624 and the number of the collecting tubes formed by the baffle plate 624 may be set as required.

As shown in FIG. 11, the first micro-passage 610 extends through a tube wall of the main collecting tube 623 and is inserted into the first collecting tube 621, and the second micro-passage 611 extends through a tube wall of the main collecting tube 623 and the baffle plate 624 (i.e., extending through the first collecting tube 621), and is inserted into the second collecting tube 622. In some embodiments, the second micro-passage 611 may extend through the tube wall of the main collecting tube 623 and is inserted into the second collecting tube 622, and the first micro-passage 610 may extend through the tube wall of the main collecting tube 623 and the baffle plate 624 and is inserted into the first collecting tube 621.

Compared with the collecting tube assembly 62 shown in FIG. 9 or 10, in some present embodiments, functions of both the first collecting tube 621 and the second collecting tube 622 may be achieved by one main collecting tube 623, which reduces the cost and volume of the collecting tube assembly 62.

In some embodiments, the main collecting tube 623 may be divided into two first collecting tubes 621 or two second collecting tubes 622 by the baffle plate 624. In some embodiments, when two layers of the first micro-passages 610 are formed via bending the first micro-passages 610 by 180° or via the reverse collecting tube or when two layers of the second micro-passages 611 are formed via bending the second micro-passages 611 by 180° or via the reverse collecting tube, one end of each first micro-passage 610 extends through the tube wall of the main collecting tube 623 and is inserted into one of the first collecting tubes 621, and the other end of the corresponding first micro-passage 610 extends through the tube wall of the main collecting tube 623 and the baffle plate 624 and is inserted into the other of the first collecting tubes 621. Or one end of each second micro-passage 611 extends through the tube wall of the main collecting tube 623 and is inserted into one of the second collecting tubes 622, and the other end of the corresponding second micro-passage 611 extends through the wall of the main collecting tube 623 and the baffle plate 624 and is inserted into the other of the second collecting tubes 622.

Figure 12:
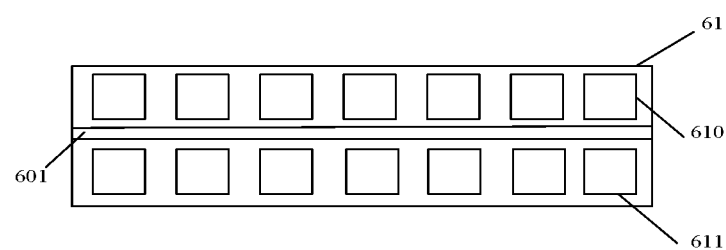
FIG. 12 is a structural schematic view of some embodiments of the heat exchange body of the heat exchanger of the present disclosure.
Figure 13:
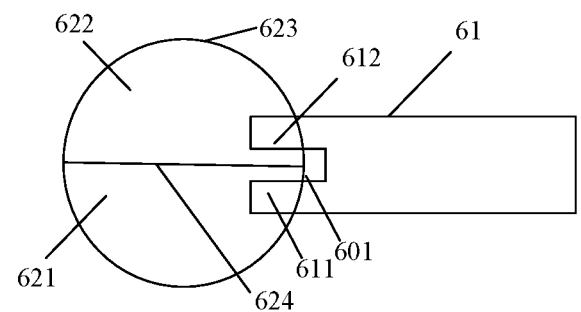
FIG. 13 is a structural schematic view of some embodiments of the heat exchange body and the collecting tube assembly of the heat exchanger of the present disclosure.

In some embodiments, as shown in FIGS. 12 and 13, an inserting slot 601 may be defined on an end face of the heat exchange body 61. The inserting slot 601 is located between the first micro-passages 610 and the second micro-passages 611. The baffle plate 624 is embedded in the inserting slot 601, so that the first micro-passages 610 extend through the tube wall of the main collecting tube 623 and are inserted into the first collecting tube 621. The second micro-passages 611 extend through the tube wall of the main collecting tube 623 and are inserted into the second collecting tube 622. By setting the inserting slot 601 in this way, the overall length of the heat exchanger 6 may be shortened, the material cost of the heat exchanger 6 may be reduced, and the welding process of the collecting tube assembly 62 and the heat exchange body 61 may be simplified.

In some embodiments, when two layers of the first micro-passages 610 are formed via bending the first micro-passages 610 by 180° or via the reverse collecting tube or when two layers of the second micro-passages 611 are formed via bending the second micro-passages 611 by 180° or via the reverse collecting tube, an inlet end and an outlet end of the heat exchange body 61 are located on the same side. In this case, one end of each first micro-passage 610 extends through the tube wall of the main collecting tube 623 and is inserted into one of the first collecting tubes 621, and the other end of the corresponding first micro-passage 610 extends through the tube wall of the main collecting tube 623 and is inserted into the other of the first collecting tubes 621.

In some embodiments, one end of each second micro-passage 611 extends through the tube wall of the main collecting tube 623 and is inserted into one of the second collecting tubes 622, and the other end of the corresponding second micro-passage 611 extends through the tube wall of the main collecting tube 623 and is inserted into the other of the second collecting tubes 622.

Further, the heat exchange body 61 may include a single plate body 613 or a plurality of plate bodies 613. In some embodiments shown in FIG. 12, the heat exchange body 61 may include a single plate body 613. The first micro-passages 610 and the second micro-passages 611 are disposed within the single plate body 613. Further, on the end face of the single plate body 613, a spacing area is disposed between the first micro-passages 610 and the second micro-passages 611, and the inserting slot 601 is disposed within the spacing area. In this way, the heat exchange body 61 is integrated and has a simple structure and a high reliability, and the heat transferring efficiency of the heat exchange body 61 may be improved. In some embodiments, as described below, the heat exchange body 61 may also include at least two plate bodies 613, and the at least two plate bodies 613 are stacked on each other. The end of the at least two plate bodies 613 defines the inserting slot 601, the inserting slot 601 is disposed between adjacent plate bodies 613 of the at least two plate bodies 613, and the baffle plate 624 is embedded in the slot 601.

The combination of the baffle plate 624 and the inserting slot 601 described above may be adapted for other micro-passage grouping modes, as long as at least two groups of micro-passages are disposed or defined in the heat exchange body 61. The at least two groups of micro-passages may be connected to each other and allow the same refrigerant medium to flow therethrough, or the at least two groups of micro-passages may be independent of each other and allow different refrigerant mediums to flow therethrough.

1.4 First Collecting Tube Sleeved on or by Second Collecting Tube

Figure 14:
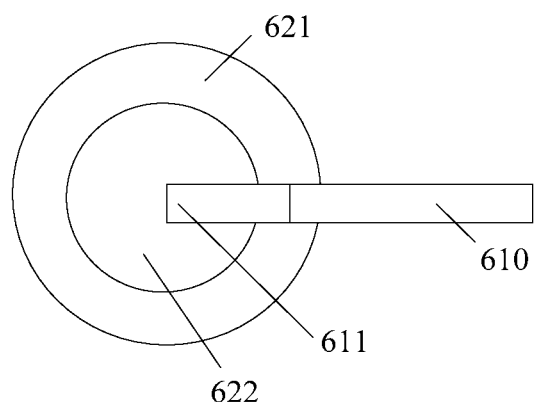
FIG. 14 is a structural schematic view of some embodiments of a heat exchange body and the collecting tube assembly of a heat exchanger of the present disclosure.

As shown in FIG. 14, the diameter of the second collecting tube 622 is smaller than the diameter of the first collecting tube 621. The first collecting tube 621 is sleeved on an outer side of the second collecting tube 622. The first micro-passage 610 extends through the tube wall of the first collecting tube 621 and is inserted into the first collecting tube 621. The second micro-passage 611 extends through the tube walls of the first collecting tube 621 and the second collecting tube 622, and is inserted into the second collecting tube 622. In some embodiments, the second collecting tube 622 is sleeved on the outer side of the first collecting tube 621. In this case, the second micro-passage 611 extends through the tube wall of the second collecting tube 622 and is inserted into the second collecting tube 622. The first micro-passage 610 extends through the tube walls of the second collecting tube 622 and the first collecting tube 621, and is inserted into the first collecting tube 621.

Compared with the collecting tube assembly 62 shown in FIG. 9 or 10, in some present embodiments, the volume of the collecting tube assembly 62 may be reduced by the sleeving.

In some embodiments, the two first collecting tubes 621 may be sleeved with each other, or the two second collecting tubes 622 may be sleeved with each other. In this case, one end of the first micro-passage 610 extends through the tube wall of an outer first collecting tube 621 of the two first collecting tubes 621 and is inserted into the outer first collecting tube 621. The other end of the first micro-passage 610 extends through the tube walls of the two first collecting tubes 621 and is inserted into an inner first collecting tube 621 of the two first collecting tubes 621.

In some embodiments, one end of the second micro-passage 611 extends through the tube wall of an outer second collecting tube 622 of the two second collecting tubes 622 and is inserted into the outer second collecting tube 622. The other end of the second micro-passage 611 extends through the tube walls of the two second collecting tubes 622 and is inserted into an inner first collecting tube 622 of the two second collecting tubes 622.

2. Heat Exchange with Sleeved Tubes

Figure 15:
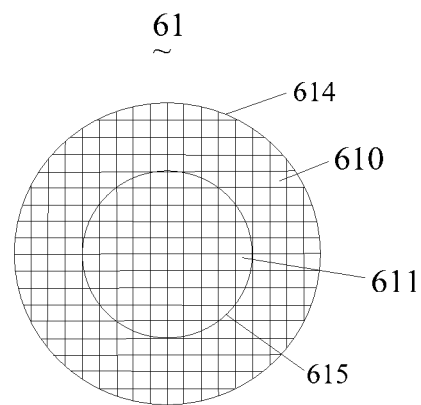
FIG. 15 is a structural schematic view of some embodiments of the heat exchange body of the heat exchanger of the present disclosure.

As shown in FIG. 15, the heat exchanger 6 includes the heat exchange body 61. The heat exchange body 61 includes a first tube body 614 and a second tube body 615 sleeved with each other. That is, the heat exchanger 6 is a heat exchanger with sleeved tubes. The plurality of first micro-passages 610 are defined in the first tube body 614, and the plurality of second micro-passages 611 are defined in the second tube body 615. The plurality of first micro-passages 610 and the plurality of second micro-passages 611 are the same as the micro-passages 612 shown in FIG. 5, so that the length of the heat exchange body 61 is shortened, and the volume of the heat exchanger 6 is further reduced.

The extending direction of each first micro-passage 610 and the extending direction of each second micro-passage 611 are parallel to each other. In some embodiments, the extending direction of each first micro-passage 610 is the same as the extending direction of each second micro-passage 611.

Figure 16:
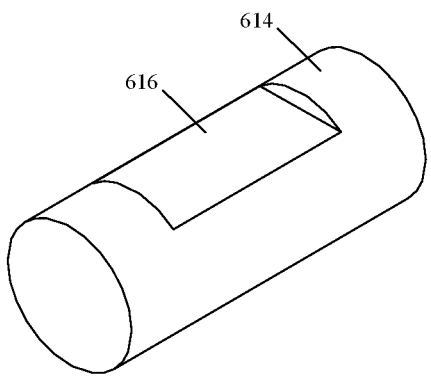
FIG. 16 is a perspective view of a first tube placement plane of FIG. 15.

In some embodiments, as shown in FIG. 16, the first tube body 614 is sleeved on the outer side of the second tube body 615, and the outer surface of the first tube body 614 is arranged with at least one flat surface 616 to form a heat exchange contact surface of the first tube body 614. The heat dissipation component or the electronic component may be disposed on the flat surface 616, which facilitates the mounting of the heat dissipation component or the electronic component. In some embodiments, the second tube body 615 may be sleeved on the outer side of the first tube body 614 and a similar flat surface may be formed on the second tub body 615.

In the air conditioning system 1 shown in FIGS. 1 to 4, the first refrigerant medium flows through the plurality of first micro-passages 610, and the second refrigerant medium flows through the plurality of second micro-passages 611. The first refrigerant medium may be in the liquid phase, and the second refrigerant medium may be in the gas-liquid phase. When flowing along the plurality of second micro-passages 611, the second refrigerant medium absorbs heat from the first refrigerant medium in the plurality of first micro-passages 610 and is further gasified, so that the first refrigerant medium is further subcooled. In some embodiments or modes of operation, the first refrigerant medium flowing through the first micro-passages 610 may absorb heat from the second refrigerant medium flowing through the second micro-passages 611, and the phases of the first refrigerant medium and the second refrigerant medium are not limited to the liquid phase or gas-liquid phase as defined above.

Compared with the heat exchanger 6 shown in FIG. 5, in some present embodiments, the area of the cross section of the heat exchange body 61 is increased, so that the pressure loss of the refrigerant medium may be reduced. In addition, the first tube body 614 is sleeved on the outer side of the second tube body 615, so that the heat exchange area of the first micro-passages 610 and the second micro-passages 611 may be increased, and the heat exchange efficiency between the first micro-passages 610 and the second micro-passages 611 may be improved.

Similar to the embodiments shown in FIG. 8, the heat exchanger 6 also includes the collecting tube assembly 62, and the collecting tube assembly 62 includes the first collecting tube 621 and the second collecting tube 622. The first collecting tube 621 is provided with the first collecting passage, and the first collecting passage is configured to provide the first refrigerant medium to the first micro-passages 610 and/or collect the first refrigerant medium flowing through the first micro-passages 610. The second collecting tube 622 is provided with the second collecting passage, and the second collecting tube is configured to provide the second refrigerant medium to the second micro-passages 611 and/or collect the second refrigerant medium flowing through the second micro-passages 611. In some embodiments, the heat exchanger 6 has a cross section along the flowing direction of the refrigerant medium in the heat exchange body 61, and the cross section of the heat exchanged 6 may be I-shaped. In some embodiments, the cross section of the heat exchanged 6 along the flowing direction of the refrigerant medium in the heat exchange body 61 may be L-shaped, U-shaped, G-shaped or circular, etc.

The collecting tubes of the collecting tube assembly 62 may be configured in any one of the above-described manners. For example, as described above, the first collecting tube 621 is spaced apart from the second collecting tube 622, the baffle plate 624 is arranged inside the main collecting tube 623, or the first collecting tube 621 and the second collecting tube 622 are sleeved with each other. In this case, the first tube body 614 together with the first micro-passages 610 defined therein and the second tube body 615 together with the second micro-passages 611 defined therein may be engaged with the collecting tubes in the manners described above, which will not be described further herein.

3. Heat Exchanger Having a Plurality of Plate Bodies Stacked on Each Other

Figure 17:
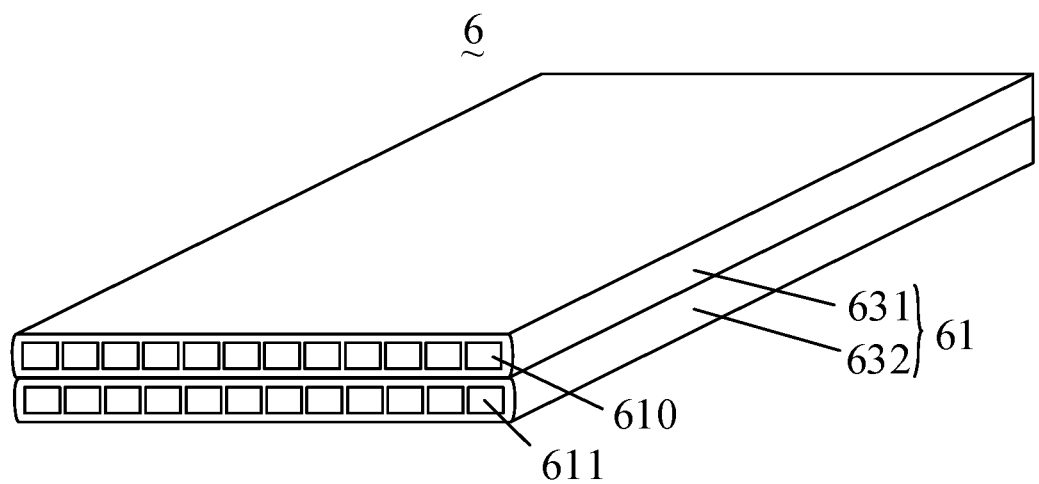
FIG. 17 is a structure schematic view of some embodiments of the heat exchange body of the heat exchanger of the present disclosure.

As shown in FIG. 17, the heat exchanger 6 includes the heat exchange body 61, and the heat exchange body 61 includes a first plate body 631 and a second plate body 632 which are stacked on each other.

The plurality of first micro-passages 610 are disposed in the first plate body 631, and the plurality of second micro-passages 611 are disposed in the second plate body 632. The plurality of first micro-passages 610 and the plurality of second micro-passages 611 are identical to the micro-passages 612 shown in FIGS. 5-7, and will not be described further herein. A multi-layer structure is adopted, so that the length of the heat exchange body 61 is shortened, and the volume of the heat exchanger 6 is further reduced.

Since the first plate body 631 and the second plate body 632 are stacked on each other, the contact area between the first plate body 631 and the second plate body 632 is increased, so that the heat exchange area between the first micro-passage 610 and the second micro-passage 611 is increased, and the heat exchange efficiency is improved.

In the air conditioning system shown in FIGS. 1 to 4, the first refrigerant medium flows through the plurality of first micro-passages 610, the second refrigerant medium flows through the plurality of second micro-passages 611. When flowing along the plurality of second micro-passages 611, the second refrigerant medium absorbs heat from the first refrigerant medium in the plurality of first micro-passages 610 and is further gasified, so that the first refrigerant medium is further subcooled.

In some embodiments or modes of operation, the first refrigerant medium flowing through the first micro-passages 610 may absorb heat from the second refrigerant medium flowing through the second micro-passages 611. The phases of the first refrigerant medium and the second refrigerant medium are not limited to the liquid phase or the gas-liquid phase as defined above.

In some embodiments, the number of the first plate bodies 631 and the number of the second plate bodies 632 may be one or more. In some embodiments, the number of the first plate bodies 631 may be two, and the second plate body 632 is sandwiched between the two first plate bodies 631. In some embodiments, one of the two first plate bodies 631, the second plate body 632, and the other of the two first plate bodies 631 are sequentially stacked on each other. The second plate body 632 is sandwiched between the two first plate bodies 631, so that the second refrigerant medium in the second plate body 632 absorbs heat from the first refrigerant medias in the two first plate bodies 631, to subcool the first refrigerant medias in the two first plate bodies 631. The heat dissipating component or the electronic component may be in thermally conductive connection with the first plate body 631. For example, the heat dissipating component or the electronic component may be disposed on a surface of the first plate body 631 away from the second plate body 632, to facilitate the mounting of the heat dissipating component or the electronic component may be. In some embodiments, the number of the first plate bodies 631 and the number of the second plate bodies 632 may be two or more, etc., and the two or more first plate bodies 631 and the two or more second plate bodies 632 may be alternately stacked on each other.

In some embodiments, the two first plate bodies 631 may be two individual plate bodies independent of or separated from each other. In some embodiments, the two first plate bodies 631 may also be integrally connected in a U shape or connected through the reverse collecting tube. In this case, the first micro-passages 610 in one of the two first plate bodies 631 is communicated with the corresponding first micro-passages 610 in the other of the two first plate bodies 631, and the first micro-passages 610 in the two first plate bodies 631 are formed in a U shape, so that the inlets and the outlets of the first micro-passages 610 are located on the same side of the heat exchange body 61.

In some embodiments, the number of the second plate bodies 632 may be two, and the first plate body 631 is sandwiched between the two second plate bodies 632. In this case, the heat dissipation component or the electronic component may be in thermally conductive connection with the two second plate bodies 632.

Figure 18:
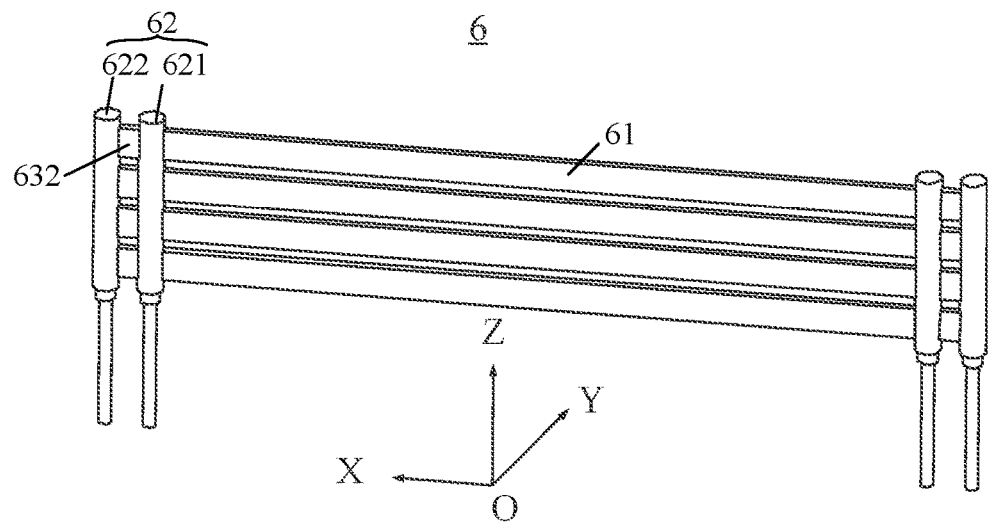
FIG. 18 is a structural schematic view of some embodiments of the heat exchange body and the collecting tube assembly of the heat exchanger of the present disclosure.

As shown in FIG. 18, the heat exchanger 6 also includes the collecting tube assembly 62, and the collecting tube assembly 62 includes the first collecting tube 621 and the second collecting tube 622. The first collecting tube 621 is provided with the first collecting passage, and the first collecting tube is configured to provide the first refrigerant medium to the first micro-passages 610 and/or collect the first refrigerant medium flowing through the first micro-passages 610. The second collecting tube 622 is provided with the second collecting passage, and the second collecting tube 622 is configured to provide the second refrigerant medium to the second micro-passages 611 and/or collect the second refrigerant medium flowing through the second micro-passages 611.

The collecting tubes of the collecting tube assembly 62 may be configured in any one of the above-described manners. For example, as described above, the first collecting tube 621 is spaced apart from the second collecting tube 622, the baffle plate 624 is arranged inside the main collecting tube 623, or the first collecting tube 621 and the second collecting tube 622 are sleeved with each other. In this case, the first plate body 631 together with the first micro-passages 610 defined therein and the second plate body 633 together with the second micro-passages 611 defined therein may be engaged with the collecting tubes in the manner described above.

3.1 Welding Process Between Stacked Plate Bodies

Figure 19:
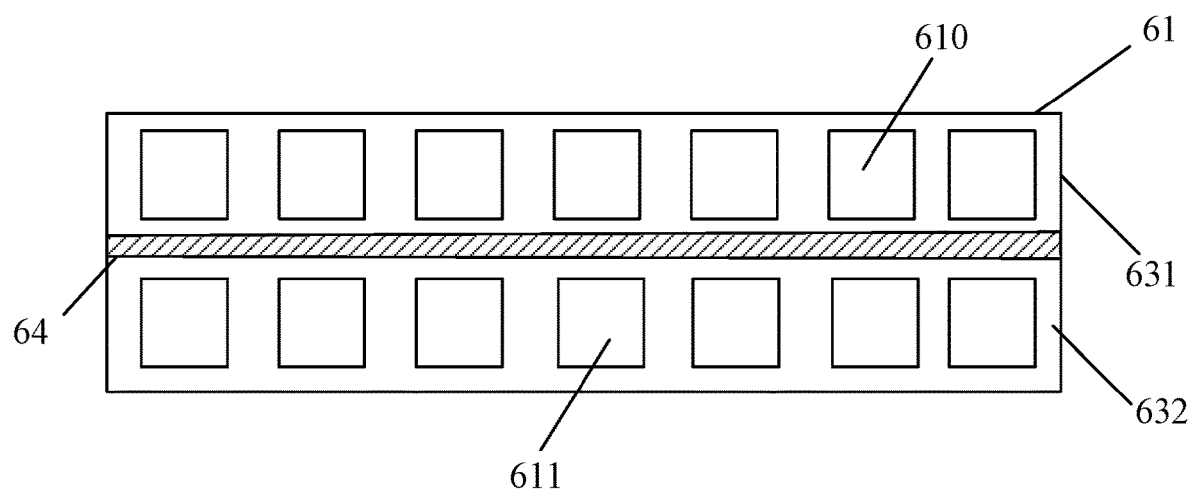
FIG. 19 is a structure schematic view of some embodiments of the heat exchange body of the heat exchanger of the present disclosure.

As shown in FIG. 19, in some embodiments, the heat exchanger 6 includes the first plate body 631, the second plate body 632, and a connecting sheet 64. The first plate body 631 and the second plate body 632 are stacked on each other. The connecting sheet 64 is clamped or sandwiched between the first plate body 631 and the second plate body 632 adjacent to the first plate body 631. Solders (not shown) are disposed on two opposite sides of the connecting sheet 64. The solders are configured to fixedly weld the connecting sheet 64 with the first plate body 631 and the second plate body 632 on the two opposite sides of the connecting sheet 64, respectively.

In some embodiments, the solders are disposed on the two opposite sides of the connecting sheet 64. The first plate body 631 is welded with the second plate body 632 through the connecting sheet 64. In this way, the first plate body 631 and the second plate body 632 may be effectively fixed. The solders are coated on the bonding surfaces between the two plate bodies 613 when welding the adjacent plate bodies 613, compared with the plate bodies 613 with the surfaces coated with the solders, the production cost may be greatly reduced by arranging the connecting sheet 64 with the solders between the two plate bodies 613.

Further, the connecting sheet 64 has the melting point higher or greater than the melting point of the solder. The connecting sheet 64 may be a metal foil, to improve the thermal conductivity. In some embodiments, the connecting sheet 64 may be an aluminum foil, a copper foil, or the like. The metal foil is relatively low in cost. The process of arranging the solders on two sides of the metal foil is relatively simple. Therefore, the metal foil with the solders is relatively easy to obtain and has relatively low production cost.

A coverage area of each of the solders on the connecting sheet 64, which covers the first plate body 631 or the second plate body 632 adjacent to the corresponding one of the solders on two opposite sides of the connecting sheet 64, is not less than 80% of an overlapping area of the first plate body 631 and the second plate body 632; i.e., the solders include a first solder adjacent to the first plate body 631 and a second solder adjacent to the second plate body 632, the covering area of the first solder covering the first plate body 631 is not less than 80% of the overlapping area of the first plate body 631 and the second plate body 632, and the covering area of the second solder covering the second plate body 632 is not less than 80% of the overlapping area of the first plate body 631 and the second plate body 632. In this way, it is possible to improve the reliability of welding between the first plate body 631 and the second plate body 632. In some embodiments, the coverage area of each of the solders on the connecting sheet 64 covering the first plate body 631 or the second plate body 632 may be 80% of the overlapping area of the first plate body 631 and the second plate body 632 on two adjacent sides of the connecting sheet 64. Or, the coverage area of each of the solders on the connecting sheet 64 covering the adjacent first plate body 631 or the second plate body 632 on two adjacent sides of the connecting sheet 64 is equal to the overlapping area of the first plate body 631 and the second plate body 632, in this way, the reliability of the heat exchanger 6 may be further improved.

In some embodiments, the connecting sheet 64 between the first plate body 631 and the second plate body 632 may have a single-layered structure, that is, only one layer of connecting sheet 64 is arranged between the first plate body 631 and the second plate body 632. In some embodiments, at least two layers of connecting sheets 64 are arranged between the first plate body 631 and the second plate body 632. In some embodiments, two, three, four layers of connecting sheets 64 may be arranged, etc. The at least two layers of connecting sheets 64 are further fixed to each other by solder welding. By flexibly selecting the number of layers of the connecting sheets 64, the distance between the first plate body 631 and the second plate body 632 may be adjusted, thereby enabling the heat exchanger 6 to adapt to different application scenarios. In some embodiments, an inserting slot may be defined between the first plate body 631 and the second plate body 632, and the inserting slot has a width equal to the lamination thickness of the at least two layers of connecting sheets 64, to engage with the baffle plate described above.

The thickness of the connecting sheet 64 may range from 0.9 mm to 1.2 mm. In some embodiments, the thickness of the connecting sheet 64 may be 0.9 mm, 1 mm, or 1.2 mm, etc.

It should be noted that, the connecting sheet 64 may be disposed between other adjacent plate bodies of at least two plate bodies having micro-passages, such as disposed between two first plate bodies 631, or between two second plate bodies 632.

Figure 20:
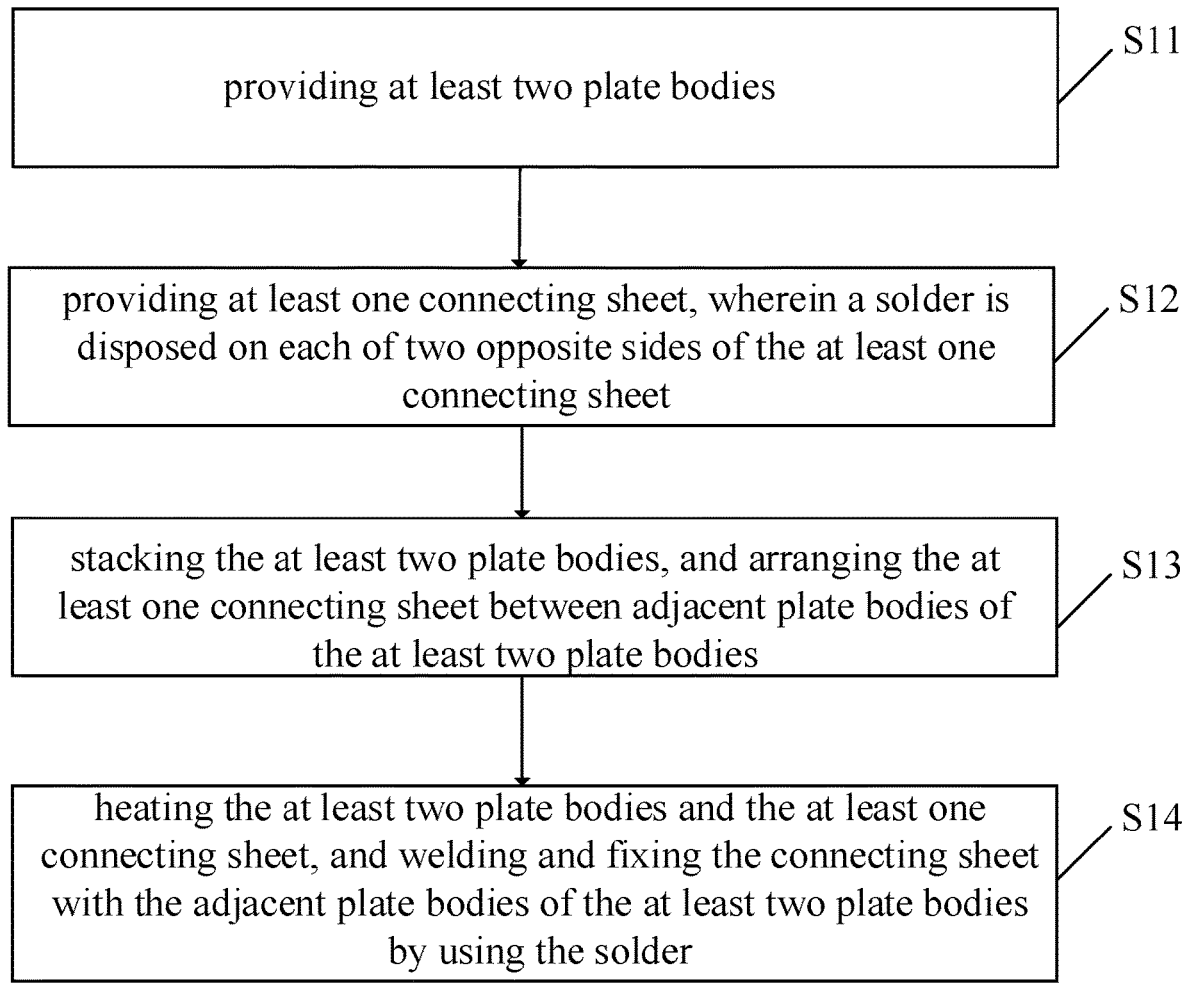
FIG. 20 is a flowchart of some embodiments of a method for manufacturing the heat exchanger of FIG. 19.

In some embodiments, as shown in FIG. 20, the method of manufacturing the heat exchanger 6 described above may include the following operations. In an operation S11, the method includes providing at least two plate bodies. In an operation S12, the method includes providing the connecting sheet, and the solders are disposed on two opposite sides of the connecting sheet. In an operation S13: the method includes stacking the at least two plate bodies on each other, and disposing or sandwiching the connecting sheet between the adjacent plate bodies. In an operation S14, the method includes heating the at least two plate bodies and the connecting sheet, so that the connecting sheet is welded and fixed with the at least plate bodies disposed on two opposite sides of the connecting sheet via the solders.

3.2 Connection Between Stacked Plate Bodies and Collecting Tube

Figure 21:
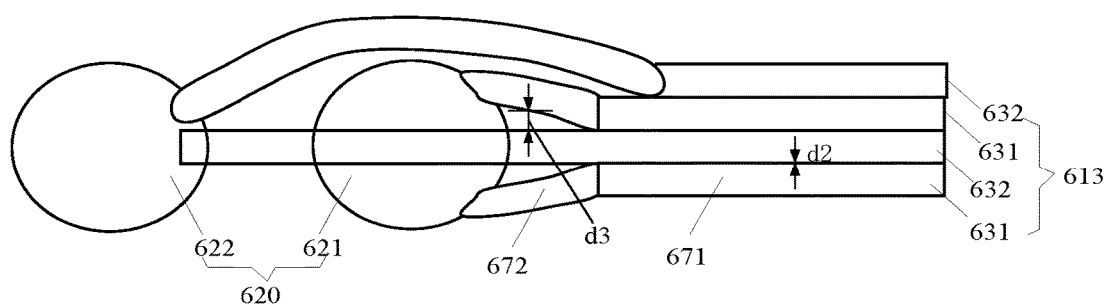
FIG. 21 is a structural schematic view of some embodiments of the heat exchange body and the collecting tube assembly of the heat exchanger of the present disclosure.

As shown in FIG. 21, the heat exchanger 6 includes at least two plate bodies 613 and at least one collecting tube 620. Each plate body 613 includes a body part 671 and a connecting part 672. The body parts 671 of the at least two plate bodies 613 are stacked on each other. One end of the connecting part 672 is connected to the body part 671, and the other end of the connecting part 672 is connected to the collecting tube 620.

Figure 22:
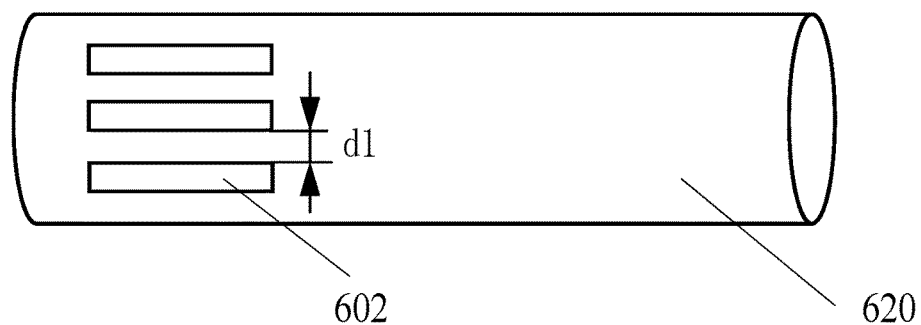
FIG. 22 is a structure schematic view of some embodiments of a collecting tube of FIG. 21.

As shown in FIG. 22, the collecting tube 620 has at least two insertion holes 602 formed or defined in the tube wall of the collecting tube 620. The other ends of the connecting parts 672 of the plate bodies 613 correspond to or face the insertion holes 602, and are welded and fixed with the collecting tube 620. That is, for each plate body 613, the connecting part 672 is located at the end of the plate body 613, and is configured to fix with the collecting tube 620. When the at least two plate bodies 613 are welded with the collecting tube pipe 620, if the distance between the two adjacent plate bodies 613 is small at the welding position, the welding difficulty is increased, and the solder will flow along a gap between the two adjacent plate bodies 613, thereby causing poor welding between each of the plate bodies 613 and the collecting tube 620, and there is the risk of refrigerant medium leakage.

In some embodiments, a first distance d1 is defined between two adjacent insertion holes 602 defined in the collecting tube 620, a second distance d2 is defined between the body parts 671 of two adjacent plate bodies 613, and the first distance d1 is greater than the second distance d2. In this way, the distance between the connecting parts 671 of the two adjacent plate bodies 613 at the welding position may be increased, the capillary action between the two adjacent plate bodies 613 may be reduced, and the welding reliability of each of the plate bodies 613 and the collecting tube 620 may be improved.

Furthermore, the first distance d1 is not less than 2 mm. In some embodiments, the first distance d1 may be 2 mm, 3 mm, or the like, so that the capillary action between the connecting parts 672 of the plate bodies 613 is reduced, and the welding between the connecting part 672 of each of the plate bodies 613 and the collecting tube 620 is facilitated. Furthermore, the first distance d1 is not greater than 6 mm, so that the heat exchanger 6 has a greater structural strength, and the reliability of the heat exchanger 6 is improved.

In some embodiments, the connecting parts 672 of at least part of the plate bodies 613 are bent. In some embodiments, each of the connecting parts 672 of the at least part of the plate bodies 613 are disposed in an arc shape, so that the distance between the connecting parts 672 of the two adjacent plate bodies 613 may be adjusted conveniently through the bent arrangement, which may facilitate the welding and fixing of each of the plate bodies 613 with the collecting tube 620, and the capillary action between the two adjacent plate bodies 613 during welding may be reduced.

In some embodiments, one ends of the connecting parts 672 of at least part of the plate bodies 613 are bent, and the other ends of the connecting parts 672 of the least part of plate bodies 613 are configured in a straight line to simplify the manufacturing process.

In some embodiments, a third distance d3 is formed or defined between the connecting parts 672 of two adjacent of at least part of plate bodies 613. The third distance d3 gradually increases at least from the body parts 671 of the adjacent plate bodies 613 to the collecting tube 620, so that the distance between the adjacent connecting parts 672 gradually increases and the capillary action between the two adjacent plate bodies 613 is reduced.

In some embodiments shown in FIG. 21, the at least two plate bodies 61 may include the first plate body 631 and the second plate body 632 as described above.

Further, in some embodiments, the number of the first plate bodies 631 is two, the number of the second plate bodies 632 is two, and the first plate bodies 631 and the second plate bodies 632 are stacked in sequence. One of the second plate bodies 632 is sandwiched between the two first plate bodies 631, and the other of the second plate bodies 632 is stacked on the outer side of one of the first plate bodies 631 that is away from the one of the second plate bodies 632 sandwiched between the two first plate bodies 631. The collecting tube 620 includes the first collecting tube 621 and the second collecting tube 622 that are spaced apart from each other. The first plate body 631 is provided with a plurality of first micro-passages configured to allow the first refrigerant medium to flow. The second plate body 632 is provided with a plurality of second micro-passages configured to allow the second refrigerant medium to flow. When flowing along the plurality of second micro-passages 611, the second refrigerant medium absorbs heat from the first refrigerant medium, so that the first refrigerant medium is subcooled. Or, when flowing along the plurality of first micro-passages 610, the first refrigerant medium absorbs heat from the second refrigerant medium, so that the second refrigerant medium is subcooled. The connecting part 672 of each of the first plate bodies 631 is fixedly welded with the first collecting tube 621, and the connecting part 672 of each of the second plate bodies 632 is fixedly welded with the second collecting tube 621.

As shown in FIG. 21, the connecting part 672 of the second plate body 632 which is sandwiched between the two first plate bodies 631 may extend through the first collecting tube 621, and may be connected to the second collecting tube 622. The connecting part 672 of the second plate body 632 located on the outer side may bypass the first collecting tube 621 and be welded with the second collecting tube 622. In this way, the number of the insertion holes 602 defined in the first collecting tube 621 may be reduced, the distance between the insertion holes 602 is increased, and the assembly of the heat exchanger 6 is facilitated, so that the heat exchanger 6 has a higher reliability. Besides, the interference to the refrigerant medium in the first collecting tube 621 may be reduced.

In some embodiments, the connecting parts 672 of the second plate bodies 632 all extend through the first collecting tube 621 and are connected to the second collecting tube 622. In some embodiments, the connecting parts 672 of the first plate bodies 631 may extend through the second collecting tube 622 and be connected to the first collecting tube 621, which will not be described further herein.

The number of the first plate bodies 631 and the number of the second plate bodies 632 may be selected according to practical application requirements, and are not limited herein.

The collecting tube 620 may be configured in any one of the above-described manners, and the arrangement of the collecting tube 620 will not be described further herein.

Further, the body part 672 of the plate body 613 may have a linear structure, so that the body part 671 of the first plate body 631 and the body part 671 of the second plate body 632 may be directly welded with each other by solders.

In some embodiments, the body part 671 of the first plate body 631 is connected to the body part 671 of the second plate body 672 through the connecting sheet with the solders described above, which will not be described further herein.

4. Heat Dissipation Fins

Figure 23:
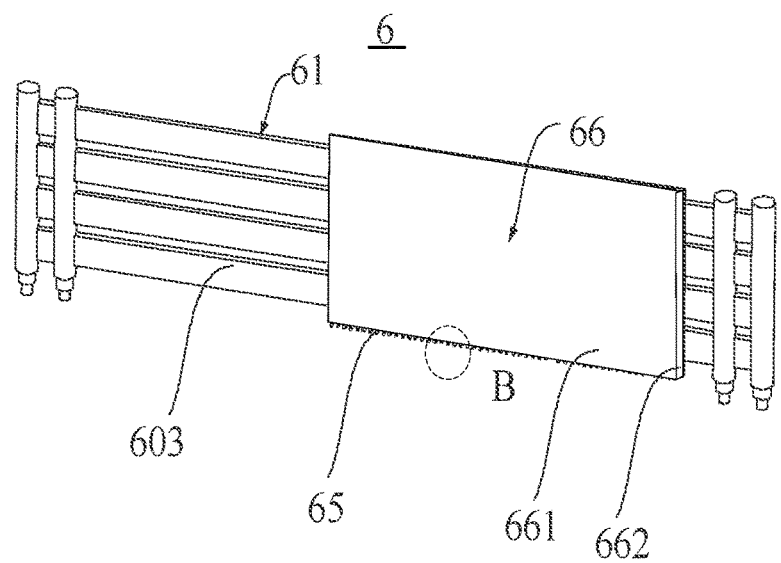
FIG. 23 is a structure schematic view of some embodiments of the heat exchanger of the present disclosure.
Figure 24:
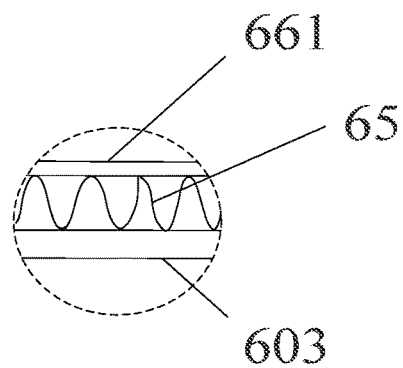
FIG. 24 is an enlarged cross-sectional structure schematic view of area B circumscribed in FIG. 23.

As shown in FIGS. 23 and 24, the heat exchanger 6 includes the heat exchange body 61 and a heat dissipation fin 65. The heat dissipation fin 65 may be disposed on the heat exchange body 61 and in thermally conductive connection with the heat exchange body 61. In this way, the contact area of the heat exchange body 61 and the air is enlarged by utilizing the heat dissipation fin 65, which facilitates the heat exchange with the air. The heat exchange efficiency of the heat exchanger 6 is improved, and the heat dissipation effect of the heat exchanger 6 is improved.

The heat dissipation fin 65 may be connected to the surface of the heat exchange body 61 by welding, bonding, or fastening.

Further, in some embodiments shown in FIG. 23, the heat exchange body 61 includes at least two plate body assemblies 603. The at least two plate body assemblies 603 are arranged side-by-side and spaced apart from each other. The heat dissipation fin 65 may be disposed on the at least two plate body assemblies 603.

The heat exchanger 6 further includes a fixing plate 66. The fixing plate 66 covers the heat dissipation tin 65 on the at least two plate body assemblies 603, and the fixing plate 66 is located on a side of the heat dissipation fin 65 away from the plate body assemblies 603, so that a heat dissipation channel is formed. In this way, the heat dissipation fin 65 may be sealed by using an integral fixing plate 66 with fewer components, such that the production of the heat exchanger 6 is simple and reliable. Besides, the heat dissipation channel may improve the heat dissipation effect. An airflow direction defined by the heat dissipation channel may be set along an interval direction or spacing direction of the plate body assemblies, that is, the airflow direction may be perpendicular to the extending direction of each plate body assembly 603, to increase the heat dissipation efficiency of the heat dissipation fin 65. In some embodiments, the airflow direction defined by the heat dissipation channel may be defined along the extending direction of the plate body assembly 603 or at other angles from the extending direction of the plate body assembly 603.

As shown in FIG. 23, the fixing plate 66 includes a top panel 661, and the top panel 661 may cover the heat dissipation fin 65 on the at least two plate body assemblies 603 to facilitate the sealing of the heat dissipation fin 65.

In some embodiments, the fixing plate 66 further includes at least one side panel 662. The side panel 662 is connected to the top panel 661 in a bending mode and extends towards the plate body assemblies 603 to seal the heat dissipation channel through the side panel 662, so that the components of the heat exchanger 6 are reduced, and the sealing performance of the heat dissipation channel is improved.

In some embodiments, in some embodiments, the fixing plate 66 may include the top panel 661 and the side panel 662. The side panel 662 is connected to one end of the top panel 661 in the bending mode. One end of the heat dissipation fin 65 abuts against the side panel 662 to seal the heat dissipation channel; the other end of the heat dissipation fin 65 may be spliced and assembled through other components, or abuts against the box body of the electric control box described below, so as to enable the heat dissipation fin 65 to form a complete air channel. In this way, the packaging or encapsulating of the heat dissipation fin may be simplified, and the assembling efficiency may be improved.

In some embodiments, the number of the side panels 662 is two. The two side panels 662 are spaced apart from each other in a direction perpendicular to the spacing direction of the at least two plate body assemblies 603. The top panel 661 is connected to the two side panels 662 in the bending mode, respectively, to form an accommodating space. The heat dissipation fin 65 may be located in the accommodating space, that is, disposed between the two side panels 662. In this way, the fixing plate 66 may completely seal the heat dissipation fin 65 to form an integral heat dissipation channel, so that the number of components is small, the packaging or encapsulating process of the heat dissipation fin 65 is further simplified. The production of the heat exchanger 6 is simple and reliable, and the heat exchange capacity is improved.

In some embodiments, as shown in FIG. 24, the heat dissipation fins 65 has a wave structure formed by sheet extrusion. Peaks and troughs of the wave structure are in contact with the surfaces of the top panel 661 and the plate body assemblies 603 opposite to each other, respectively.

Figure 25:
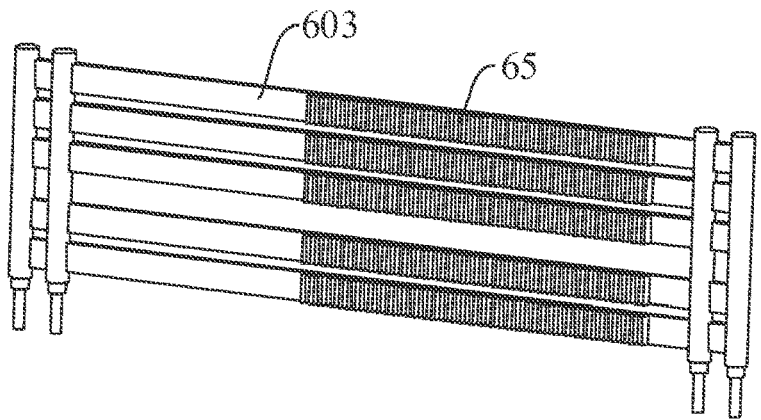
FIG. 25 is a structural schematic view of some embodiments of a heat dissipation fin of FIG. 23.

In some embodiments, the number of heat dissipation fins 65 may be at least two. As shown in FIG. 25, the number of heat dissipation fins 65 may be equal to the number of plate body assemblies 603, and each heat dissipation fin 65 is disposed on the corresponding one of the plate body assemblies 603. The width of each heat dissipation fin in the direction perpendicular to the extending direction of the plate body assemblies 603 may be equal to the width of the corresponding one of the plate body assemblies 603, so as to improve the heat transfer capacity and save material costs.

As shown in FIG. 25, each heat dissipation fin 65 may be attached to one plate body assembly 603. The plurality of heat dissipation fins 65 may be spaced apart from each other along the spacing direction of the plate body assemblies 603. In the welding process, the temperature of the gap defined between the plate bodies 613 is higher than that of the plate bodies 613. With this arrangement, the heat dissipation fins 65 may be prevented from being melted and deformed. The plurality of heat dissipation fins 65 are spaced apart from each other, so that the heat exchange efficiency of the heat dissipation fins 65 may be ensured, the material may be saved, and the production cost may be reduced.

Figure 26:
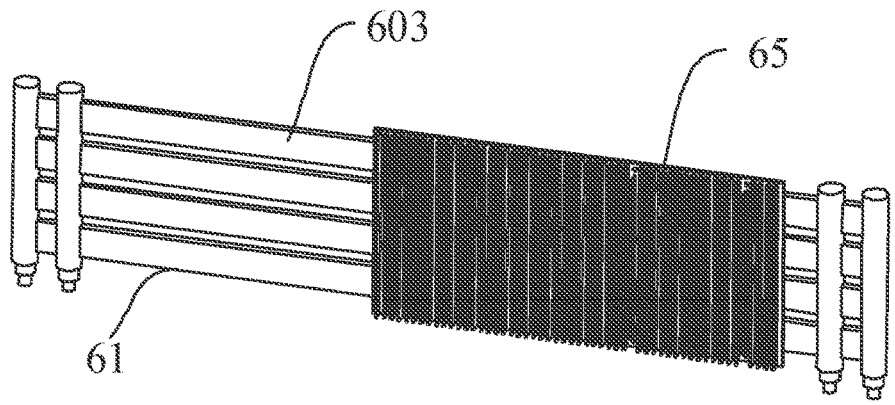
FIG. 26 is a structural schematic view of some embodiments of the heat dissipation fin of FIG. 23.

In some embodiments, as shown in FIG. 26, the number of the heat dissipation fins 65 may also be one. That is, the heat dissipation fin 65 may have an integral structure and be disposed on the at least two plate body assemblies 603. The width of the heat dissipation fin 65 in the direction perpendicular to the extending direction of the plate body assemblies 603 may be greater than or equal to the width of the heat exchange body 61. Thus, the number of the integrated heat dissipation fin 65 is small and the surface area of the integrated heat dissipation fin 65 is large. On one hand, it is convenient to connect the heat dissipation fin 65 to the heat exchange body 61, and the mounting efficiency of the heat dissipation fin 65 and the heat exchange body 61 is improved. On the other hand, the contact area between the heat dissipation fin 65 and the air may be enlarged to enhance the heat exchange effect.

In some embodiments, the fixing plate 66 is opened at two ends in the spacing direction of the at least two plate body assemblies 603, so that the airflow direction of the air in the heat dissipation channel is defined along the spacing direction of the at least two plate body assemblies 603. The flowing direction of the refrigerant medium in the plate body assemblies 603 is perpendicular to the spacing direction of the at least two plate body assemblies 603, so that the heat dissipation effect of the heat dissipation channel is enhanced, and the overall heat exchange efficiency of the heat exchanger 6 is improved.

Each plate body assembly 603 may be provided with the micro-passages, for example, the plate body assembly 603 may use the plate bodies and the micro-passages configured in any one of the above-described manners, which will not be described further herein.

As will be understood by those skilled in the art, the above-described heat dissipation fin 65 is applicable to the various forms of the heat exchanger 6 described herein and should not be limited to a specific embodiment.

5. Heat Exchanger Serving as Heat Sink

The heat exchanger 6 described above may further be used as a heat sink (described below as heat sink 6). The heat sink 6 includes the heat exchange body 61 and the collecting tube assembly 62. The heat sink 6 is configured to dissipate heat from electronic components within the electric control box 7. As will be appreciated by those skilled in the art, the heat sink 6 referred to herein should include the various forms of heat exchangers described above, and should not be limited to a specific embodiment.

In some embodiments, the heat sink 6, in addition to serving as the economizer of the air conditioning system 1, may further replace a module heat sink in the electric control box 7 for dissipating heat from the electric control box 7, so that the number of pipeline components and modules of the air conditioning system 1 is simplified, and the cost is lowered.

Figure 27:
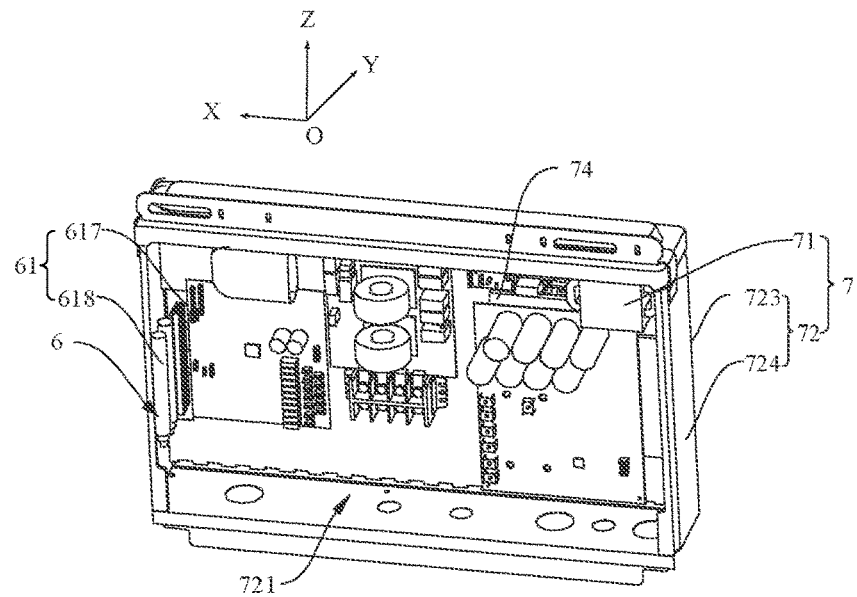
FIG. 27 is a perspective view of some embodiments of an electric control box with a portion of the components removed of the present disclosure.

Further, as shown in FIG. 27, the electric control box 7 includes a box body 72 and the heat sink 6, and the box body 72 defines a mounting cavity 721. An electronic component 71 is disposed in the mounting cavity 721, and the heat sink 6 is disposed in the mounting cavity 721 and is configured to dissipate heat from the electronic component 71 in the mounting cavity 721. In other embodiments, the heat sink 6 may be disposed outside the box body 72 and is configured to dissipate heat from the electronic component 71 in the mounting cavity 721.

As shown in FIG. 27, the box body 72 includes a top plate (not shown, opposite to a bottom plate 723 and covering an opening of the mounting cavity 721), the bottom plate 723, and a circumferential side plate 724. The top plate and the bottom plate 723 are opposite to and spaced apart from each other. The circumferential side plate 724 is connected to the top plate and the bottom plate 723, thereby defining the mounting cavity 721.

In some embodiments, as shown in FIG. 27, the bottom plate 723 and the top plate are each rectangular in shape. The number of the circumferential side plates 724 is four, and each of the four circumferential side plates 724 is connected to a corresponding side of the bottom plate 723 and a corresponding side the top plate. In this way, the cuboid electric control box 7 is formed by enclosing the four circumferential side plates 724, the bottom plate 723, and the top plate. The length of a long side of the bottom plate 723 is a length of the electric control box 7, the length of a short side of the bottom plate 723 is a width of the electric control box 7, and the height of each circumferential side plate 724 perpendicular to the bottom plate 723 is a height of the electric control box 7. As shown in FIG. 27, the length of the electric control box 7 refers to a length of the electric control box 7 in the X direction, the height of the electric control box 7 refers to a length of the electric control box 7 in the Y direction, and the width of the electric control box 7 refers to a length of the electric control box 7 in the Z direction.

The specific combination of the heat sink 6 and the electric control box 7 will be described in detail in the following embodiments.

5.1 Heat Exchange Body Form

In some embodiments, the heat exchange body 61 is disposed in a straight strip shape. As shown in FIG. 18, the heat exchange body 61 has an overall length, an overall width, and an overall height. The overall length is a length of the heat exchange body 61 along an extending direction of the heat exchange body 61, that is, the length of the heat exchange body 61 along an X direction shown in FIG. 18. The overall width is a length of the heat exchange body 61 in a direction perpendicular to the extending direction of the heat exchange body 61 and perpendicular to a plane where the heat exchange body 61 is located, that is, the length of the heat exchange body 61 along a Y direction shown in FIG. 18. The overall height is a length of the heat exchange body 61 along a Z direction shown in FIG. 18. The plane where the heat exchange body 61 is located refers to a plane where the collecting tube assembly 62 is located, which is an XOZ plane shown in FIG. 18.

In some embodiments, as shown in FIG. 27, the heat exchange body 61 may be disposed on the bottom plate 723 of the electric control box 7 or may be disposed on the circumferential side plate 724 of the electric control box 7. In other embodiments, the heat exchange body 61 may be fixed on other positions of the electric control box 7 according to the setting position of the electronic component 71. The embodiments of the present disclosure are not limited in this regard.

When the heat exchange body 61 is in the shape of the straight strip as shown in FIG. 18, the heat exchange body 61 may be abutted against the bottom plate 723, or the heat exchange body 61 and the bottom plate 723 are spaced apart from each other, so that the size of the bottom plate 723 in the length direction may be fully utilized. The heat exchange body 61 may be disposed as long as possible to improve the heat exchange effect. In some embodiments, the heat exchange body 61 may also be abutted against the circumferential side plate 724, or the heat exchange body 61 and the circumferential side plate 724 are spaced apart from each other. The embodiments of the present disclosure are not limited in this regard.

Figure 28:
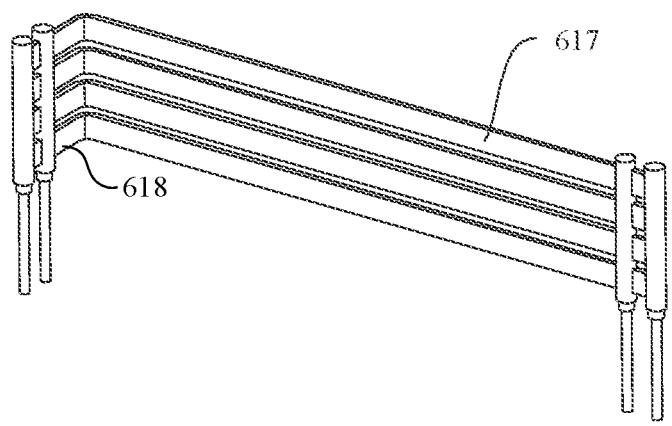
FIG. 28 is a perspective view of some embodiments of a heat sink of FIG. 27.

Further, referring to FIG. 28, in order to reduce the overall length of the heat exchange body 61, the heat exchange body 61 may be divided into a first extension part 617 and a second extension part 618. The second extension part 618 is connected to an end of the first extension part 617 and bent toward a side of the first extension part 617, so that the heat exchange body 61 is L-shaped.

By bending the heat exchange body 61 to form the first extension part 617 and the second extension part 618 that are connected in a bending way, the overall length of the heat exchange body 61 may be reduced under the condition of ensuring that the heat exchange body 61 has enough extension length, so that the length of the electric control box 7 matched with the heat sink 6 along the X direction may be reduced, and the volume of the electric control box 7 may be reduced.

In some embodiments, the first extension part 617 may be disposed parallel to the bottom plate 723 to fully utilize the size in the length direction of the bottom plate 723, and the heat exchange body 61 may be disposed as long as possible to enhance the heat exchange effect. The second extension part 618 may be disposed parallel to the circumferential side plate 724 to reduce the space occupied by the second extension part 618 in the X direction.

In other embodiments, the first extension part 617 may be parallel to one of the circumferential side plates 724, and the second extension part 618 may be parallel to another circumferential side plate 724 adjacent to the one circumferential side plate 724, to dispose the heat sink 6 on a side of the mounting cavity 721.

In some embodiments, the first extension part 617 may be abutted against the bottom plate 723, or may be spaced apart from the bottom plate 723. The second extension part 618 may be abutted against the circumferential side plate 724, or may be spaced apart from the circumferential side plate 724. The embodiments of the present disclosure are not limited in this regard.

Further, as shown in FIG. 28, the number of second extension part 618 may be one, and the second extension part 618 is connected to an end of the first extension part 617 so that the heat exchange body 61 is U-shaped.

Figure 29:
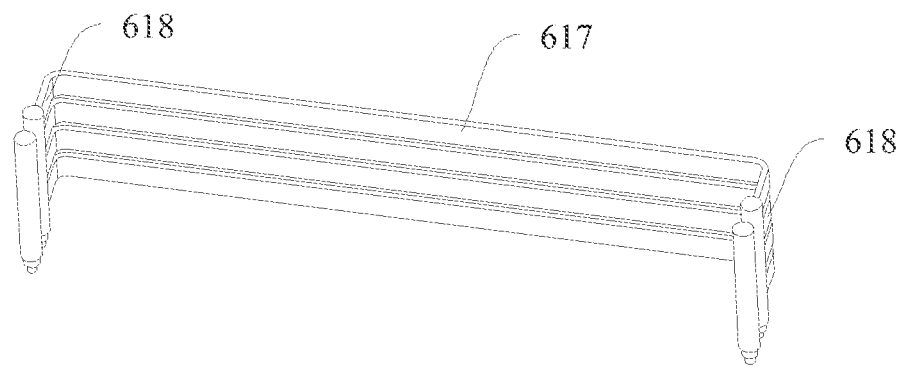
FIG. 29 is a perspective view of some embodiments of the heat sink of FIG. 27.

As shown in FIG. 29, the number of second extension parts 618 may be two. One of the two second extension parts 618 is connected to an end of the first extension part 617 and the other of the two second extension parts 618 is connected to the other end of the first extension part 617 opposite to the end. The two second extension parts 618 are bent toward the same side of the first extension part 617.

In some embodiments, the two second extension parts 618 may be spaced apart from each other and arranged in parallel at the two opposite ends of the first extension part 617, thereby reducing the overall length of the heat exchange body 61 and the volume of the heat sink 6 while ensuring the heat exchange effect of heat exchange body 61. In addition, compared with the two second extension parts 618 respectively located on two opposite sides of the first extension part 617, the two second extension parts 618 are located on the same side of the first extension part 617 in a bending mode, so that the overall width of the heat sink 6 may be reduced.

Further, the two second extension parts 618 may be disposed perpendicularly to the first extension part 617 to form the U-shaped heat exchange body 61, so that not only may the overall length of the heat exchange body 61 be reduced, but also the occupied space of the second extension parts 618 in the X direction may be reduced, thereby avoiding the interference between the two second extension parts 618 and the electronic component 71 in the mounting cavity 721.

In other embodiments, the two second extension parts 618 may be tilted with respect to the first extension part 617. The two second extension parts 618 may be inclined at the same or different angles with respect to the first extension part 617 to reduce the overall width of the electric control box 7.

Further, the extension length of the first extension part 617 may be greater than the extension length of the second extension part 618, so that the first extension part 617 is disposed along the length direction of the electric control box 7, and the second extension part 618 is disposed along the width or height direction of the electric control box 7.

Further, as shown in FIG. 27, the number of the heat sink 6 disposed in the mounting cavity 721 may be one. The heat sink 6 may disposed in the mounting cavity 721 extending along the length direction of the box body 72, or may disposed in the mounting cavity 721 extending along the height direction of the box body 72.

In some embodiments, the number of the heat sinks 6 disposed in the mounting cavity 721 may be at least two. For example, the number of the heat sinks 6 may be two, three, four or five, and the heat dissipation effect of the electric control box 7 may be improved by arranging a large number of the heat sinks 6.

5.2 Heat Sink Disposed Inside Electric Control Box

As will be appreciated by those skilled in the art, the various forms of the heat sink 6 disclosed herein may also be disposed within the mounting cavity 721 of the electric control box 7 or applied to the heat dissipation of the electric control box 7, and may be in thermally conductive connection with the electronic component 71 in a direct or indirect manner.

Further, as shown in FIG. 27, the heat sink 6 is disposed in the mounting cavity 721 of the electric control box 7. In some embodiments, the heat sink 6 may be in thermally conductive connection with the electronic component 71 disposed in the mounting cavity 721 for heat dissipation of the electronic component 71.

In some embodiments, the electronic component 71 may be in thermally conductive connection with the heat exchange body 61, and may be in thermally conductive connection with any position of the heat exchange body 61.

When the heat exchange body 61 in the heat sink 6 is in the straight strip shape (i.e., when the heat sink 6 is I-shaped), the electronic component 71 may be disposed at any position on the heat exchange body 61, which facilitates the assembly of the electronic component 71. In some embodiments, the electronic component 71 may be disposed in the middle position of the heat exchange body 61, or the electronic components 71 may be disposed at two ends of the heat exchange body 61. The electronic component 71 may be disposed on a side of the heat exchange body 61, or the electronic components 71 may be disposed on two opposite sides of the heat exchange body 61 according to practical application scenarios.

In the embodiments shown in FIGS. 28 and 29, when the heat sink 6 is L-shaped or U-shaped, the electronic component 71 may be in thermally conductive connection with the first extension part 617, and the electronic component 71 and the second extension part 618 may be disposed on the same side of the first extension part 617 to reduce the height of the electric control box 7, that is, the size in the Y direction.

In other embodiments, the electronic component 71 may be in thermally conductive connection with the second extension part 618, and in some embodiments, the electronic component 71 may be disposed on the side of the second extension part 618 facing the first extension part 617 to shorten the length of the electric control box 7, that is, the size in the X direction.

In other embodiments, the electronic component 71 may be partially disposed on the first extension part 617 and partially disposed on the second extension part 618, so that the electronic component 71 is uniformly distributed.

Figure 30:
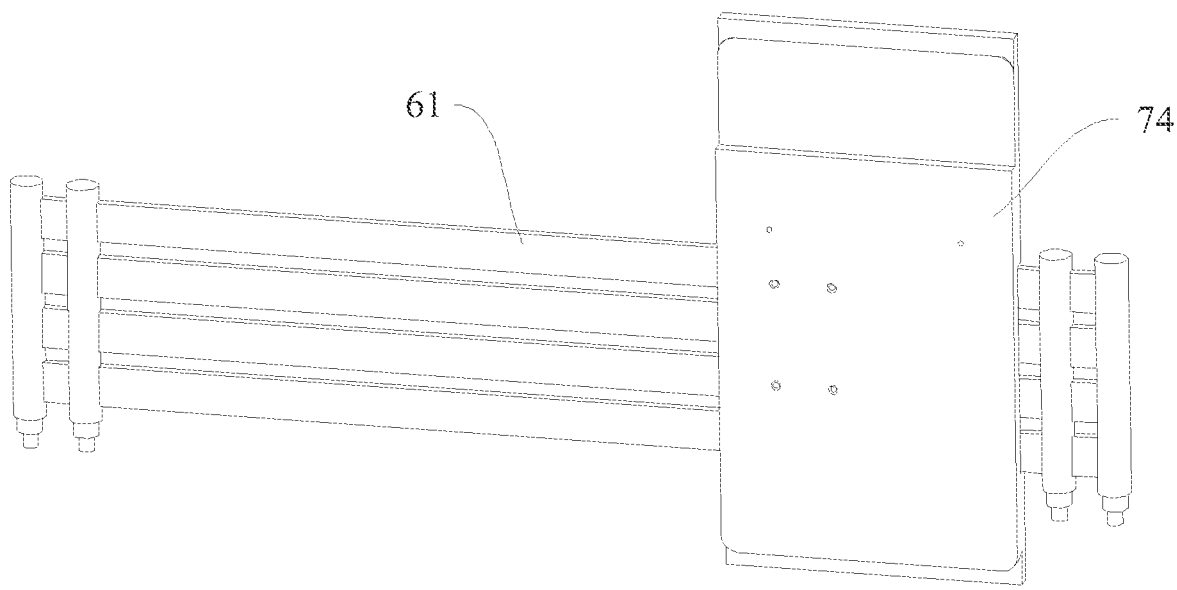
FIG. 30 is a perspective view of some embodiments of a heat dissipation fixing plate and the heat sink of the present disclosure.

As shown in FIGS. 27 and 30, a heat dissipation fixing plate 74 may further be disposed in the electric control box 7. The electronic component 71 is disposed on the heat dissipation fixing plate 74, and the heat dissipation fixing plate 74 is connected to the heat exchange body 61, so that the electronic component 71 and the heat exchange body 61 are in thermally conductive connection through the heat dissipation fixing plate 74. Therefore, the mounting efficiency of the electronic component 71 may be greatly improved.

The heat dissipation fixing plate 74 may be made of a metal plate or an alloy plate with good thermal conduction performance. In some embodiments, the heat dissipation fixing plate 74 may be made of an aluminum plate, a copper plate, an aluminum alloy plate and the like to improve the heat conduction efficiency.

Figure 31:
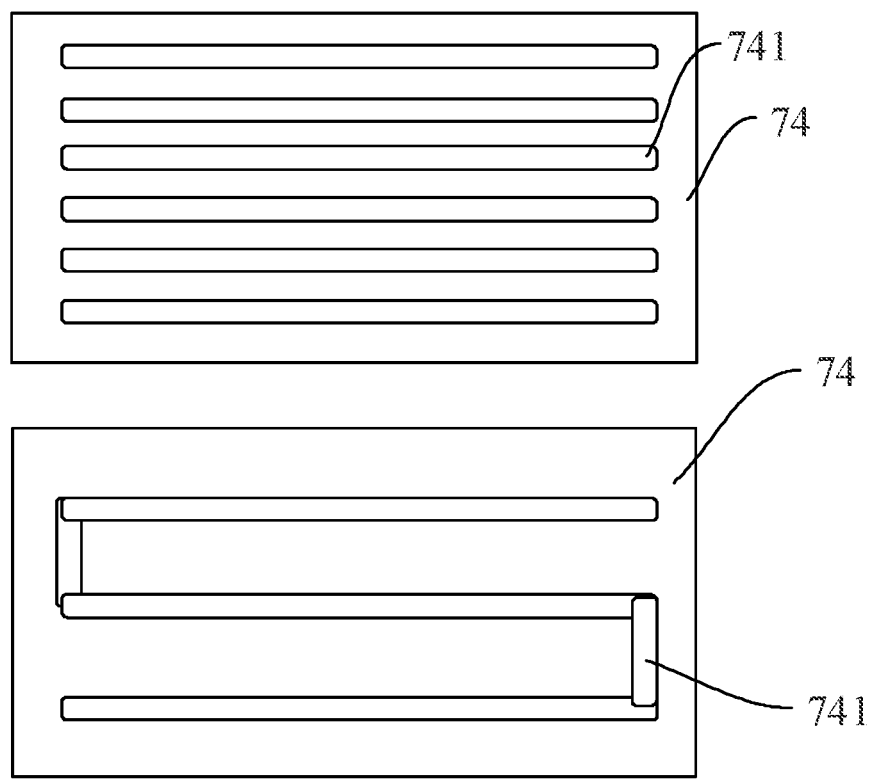
FIG. 31 is a plane structure schematic view of some embodiments of the heat dissipation fixing plate of FIG. 30.

In some embodiments, as shown in FIG. 31, a heat pipe 741 may be embedded in the heat dissipation fixing plate 74. The heat pipe 741 is configured to rapidly conduct and diffuse a concentrated high-density heat source to a surface of the whole heat dissipation fixing plate 74, so that the heat on the heat dissipation fixing plate 74 is uniformly distributed, and the heat exchange effect of the heat dissipation fixing plate 74 and the heat exchange body 61 is enhanced.

As shown in the figure on the upper side of FIG. 31, the heat pipe 741 may be in a long strip shape, the number of the heat pipes 741 may be multiple, and the multiple heat pipes 741 may be parallel to and spaced apart from each other. In some embodiments, as shown in the figure on the lower side of FIG. 31, the multiple heat pipes 741 may be sequentially connected to form an annular shape or a frame shape. The embodiments of the present disclosure are not limited in this regard.

5.3 Heat Sink Disposed Outside Electric Control Box

Figure 32:
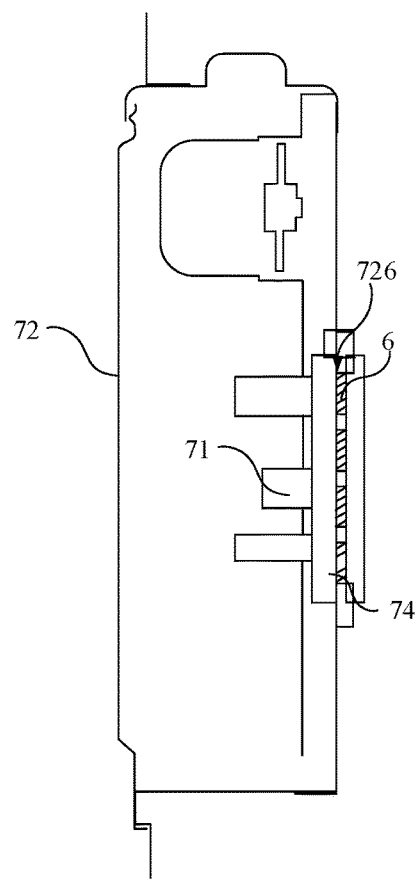
FIG. 32 is a cross-sectional structure schematic view of some embodiments of the heat sink and the electric control box of the present disclosure.

As shown in FIG. 32, the heat sink 6 is disposed outside the electric control box 7, an assembly port 726 may be disposed on the box body 72 of the electric control box 7, and the electronic component 71 is in thermally conductive connection with the heat sink 6 through the assembly port 726.

In some embodiments, as shown in FIG. 32, the electronic component 71 is disposed on a side surface of the heat sink fixing plate 74 away from the heat sink 6.

Figure 33:
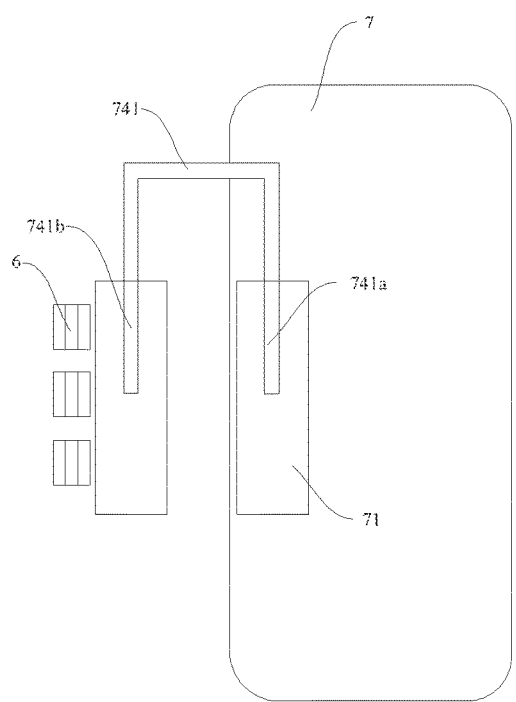
FIG. 33 is a cross-sectional structure schematic view of some embodiments of the heat sink and the electric control box of the present disclosure.

In other embodiments, as shown in FIG. 33, the heat pipe 741 may be disposed to be in thermally conductive connection with the heat sink 6. In some embodiments, the heat pipe 741 may include a heat absorbing end 741a and a heat releasing end 741b. The heat absorbing end 741a of the heat pipe 741 may be inserted into an interior of the mounting cavity 721 and in thermally conductive connection with the electronic component 71, for absorbing heat from the electronic component 71. The heat releasing end 741b of the heat pipe 741 may be disposed outside the electric control box 7 and in thermally conductive connection with the heat sink 6, for dissipating heat from the heat releasing end 741b of the heat pipe 741 through the heat sink 6.

5.4 Arrangements of Heat Dissipation Fins and Electronic Component

In the embodiments shown in FIGS. 23-26, the heat sink 6 includes the heat dissipation fins 65. When the heat sink 6 with the heat dissipation fins 65 is disposed in the electric control box 7, contact area between the heat exchange body 61 and air in the electric control box 7 may be increased through the heat dissipation fins 65, so that the heat exchange with the air is facilitated, the temperature in the mounting cavity 721 is reduced, and the electronic component 71 is protected.

In some embodiments, the electronic component 71 and the heat dissipation fins 65 may be disposed on the same side of the heat exchange body 61, and the electronic component 71 and the heat dissipation fins 65 are disposed in a staggered manner, so that interference between the electronic component 71 and the heat dissipation fins 65 is avoided. The distance between the electronic component 71 and the heat dissipation fins 65 is set larger, so that the temperature of the refrigerant contacting the heat dissipation fins 65 and the electronic component 71 is lower, and the dissipating effect of the heat exchange body 61 is improved.

In some embodiments, the electronic component 71 is disposed on a side of the heat exchange body 61, and the heat dissipation fins 65 are disposed on the other side of the heat exchange body 61. In some embodiments, the heat dissipation fins 65 may be disposed at any position on the other side of the heat exchange body 61.

In some embodiments, the heat dissipation fins 65 may extend to an outside of the electric control box 7. In some embodiments, the box body 72 is disposed with the assembly port, and the heat exchange body 61 is disposed in the box body 72 and in thermally conductive connection with the electronic component 71. A side of the heat dissipation fin 65 is in thermally conductive connection with the heat exchange body 61 and extends to the outside of the box body 72 through the assembly port, so that the dissipating heat capacity of the heat exchange body 61 may be further improved through air cooling assistance.

6. Electronic Component Disposed at a Position where Temperature of Heat Sink is Higher Referring to FIG. 34, the electric control box 7 of the present embodiments includes the box body 72 defining the mounting cavity 721, the heat sink 6 at least partially disposed in the mounting cavity 721, and the electronic component 71 disposed in the mounting cavity 721. The structures of the box body 72 and the heat sink 6 are substantially identical to those of the embodiments described above, reference may be made to the description of the embodiments described above.

In some embodiments, the heat exchange body 61 may be entirely disposed in the mounting cavity 721 of the electric control box 7; or may be partially disposed in the mounting cavity 721 of the electric control box 7, and partially protruding out of the electric control box 7 for connection with the collecting tube assembly 62 and an external pipeline.

The flowing of the refrigerant medium causes the temperature of the heat sink 6 to be lower. The electronic component 71 in the electric control box 7 generating heat causes the temperature in the mounting cavity 721 of the electric control box 7 to be higher. When the air with higher temperature in the electric control box 7 is contacted with the heat sink 6, the air is easy to condense, so that condensate water is formed on the surface of the heat sink 6. When the generated condensate water flows to the position where the electronic component 71 is located, the electronic component 71 is easy to short circuit or damage, and more serious fire hazards may be generated.

Figure 34:
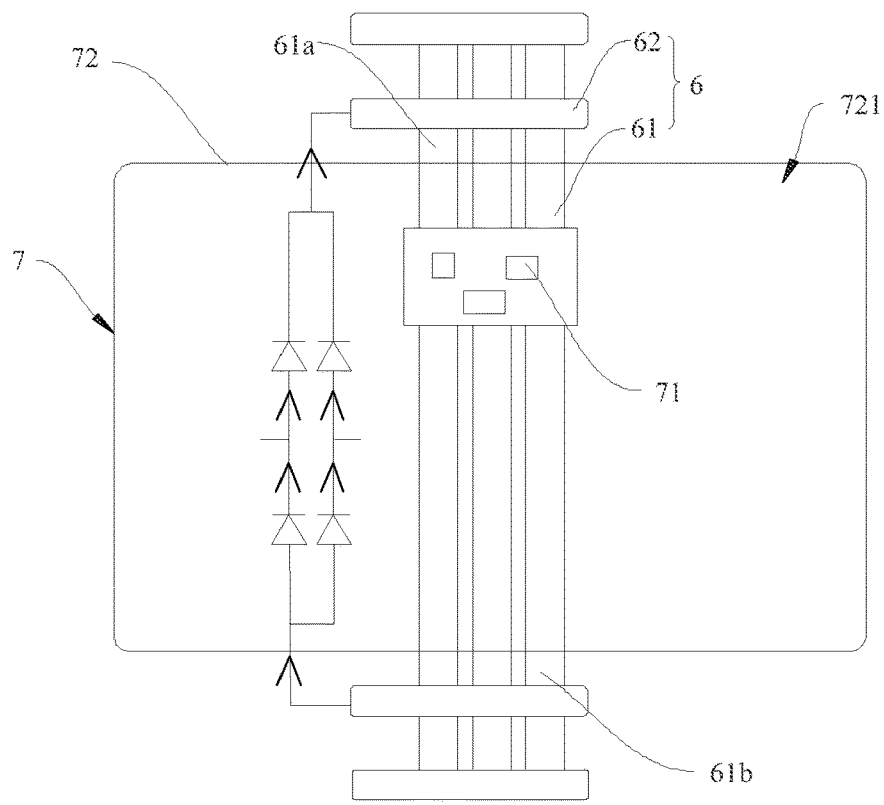
FIG. 34 is a plane structure schematic view illustrating a coordination between the heat sink and the electric control box according to some embodiments of the present disclosure.

Based on above, as shown in FIG. 34, the heat exchange body 61 may be divided into a first end 6A and a second end 61b along the flowing direction of the refrigerant medium. When the heat exchange body 61 operates, the temperature of the heat exchange body 61 is gradually reduced in the direction from the first end 6A to the second end 61b. That is, the temperature of the first end 6A, is higher than the temperature of the second end 61b. The electronic component 71 is disposed at a position close to the first end 61a, and the electronic component 71 is in thermally conductive connection with the heat exchange body 61. Since the heat exchange body 61 exchanges heat with an internal environment or internal components of the electric control box 7, the temperature of the heat exchange body 61 described above and below refers to surface temperature of the heat exchange body 61. In some embodiments, the change of the surface temperature of the heat exchange body 61 is determined by the heat exchange passages adjacent to the surface. In some embodiments, when the heat exchange passages adjacent to the surface of the heat exchange body 61 are the main passage, because the refrigerant medium in the main passage is continuously thermally absorbed by the refrigerant medium in the auxiliary passage, the surface temperature of the heat exchange body 61 gradually decreases along the flowing direction of the refrigerant medium in the main passage. In this case, the first end 61a is located upstream of the second end 61b along the flowing direction of the refrigerant medium in the main passage. When the heat exchange passages adjacent to the surface of the heat exchange body 61 are the auxiliary passage, the surface temperature of the heat exchange body 61 gradually increases along the flowing direction of the refrigerant medium in the auxiliary passage. In this case, the first end 61a is located downstream of the second end 61b along the flowing direction of the refrigerant medium in the auxiliary passage.

Therefore, according to the temperature change of the heat exchange body 61 during operation, the heat exchange body 61 is divided into the first end 6A with higher temperature and the second end 61b with lower temperature. Because the temperature difference between the first end 61a with higher temperature and hot air is less, the condensate water cannot be generated or the amount of the generated condensate water is less. By disposing the electronic component 71 at the position close to the first end 61a, the probability of the electronic component 71 contacting the condensate water may be reduced, and the electronic component 71 is further protected.

Since the air conditioner generally has a refrigeration mode and a heating mode, and in these two modes, there may be a case where the refrigerant medium flows in opposite directions. The temperature of the heat exchange body 61 has an opposite change tendency from the first end 6a to the second end 61b. That is, in one mode, the temperature of the heat exchange body 61 gradually decreases from the first end 61a to the second end 61b, and in the other mode, the temperature of the heat exchange body 61 gradually increases from the first end 61a to the second end 61b. In some embodiments, priority is given to ensuring that the temperature of the heat exchange body 61 gradually decreases from the first end 61a to the second end 61b in the refrigeration mode, for the following reasons.

When ambient temperature is low, for example, when the air conditioner operates in the heating mode in winter, the temperature of the air in the electric control box 7 is lower. In this case, the temperature difference between the air in the electric control box 7 and the heat sink 6 is less, the air is not easy to condense to form the condensate water. When the ambient temperature is high, for example, when the air conditioner operates in the refrigeration mode in summer, the temperature of the air in the electric control box 7 is higher. Since the temperature difference between the air in the electric control box 7 and the heat sink 6 is greater, the air is easy to condense to form the condensate water. In some embodiments, at least in the refrigeration mode of the air conditioner, the temperature of the heat exchange body 61 is set gradually reduced in the direction from the first end 61a to the second end 61b, so as to prevent the heat sink 6 from generating the condensate water in the refrigeration mode.

Further, disposing the electronic component 71 at the position close to the first end 61a means that a first distance exists between a thermally conductive connection position of the electronic component 71 on the heat exchange body 61 and the first end 61a, and a second distance exists between the thermally conductive connection position and the second end 61b. The first distance is less than the second distance.

In some embodiments, since the temperature of the heat exchange body 61 gradually decreases in the direction from the first end 6a to the second end 61b, the temperature of the first end 6a is the highest, and the temperature of the second end 61b is the lowest. The higher the temperature of the heat exchange body 61, the less the temperature difference between the heat sink 6 and the air in the electric control box 7, and the more difficult the condensate water is to condense. The lower the temperature of the heat exchange body 61, the greater the temperature difference between the heat sink 6 and the hot air, the easier the condensate water is to condense. That is, in the direction from the first end 61a to the second end 61b of the heat exchange body 61, the probability of generating condensate water is gradually increased. Therefore, the risk of contact between the electronic component 71 and the condensate water may be reduced by disposing the electronic component 71 close to the higher temperature end of the heat exchange body 61, that is, at the position where the condensate water is not easy to accumulate, thereby protecting the electronic component 71.

Further, as shown in FIG. 34, the extending direction of the heat exchange body 61 may be set along the vertical direction, and the first end 61a is disposed above the second end 61b, so that when the condensate water is generated at the position of the heat exchange body 61 closed to the second end 61b, the condensate water can flow downwards along the vertical direction. That is, the condensate water can flow towards a direction away from the electronic component 71, and the electronic component 71 is prevented from contacting the condensate water.

In other embodiments, the extending direction of the heat exchange body 61 may be set along the horizontal direction as required, so that the condensate water generated at the position close to the second end 61b may be quickly separated from the heat exchange body 61 under the action of gravity, thereby avoiding contacting with the electronic component 71. In other embodiments, the extending direction of the heat exchange body 61 may be tilted with respect to the horizontal direction, and the embodiments of the present disclosure are not limited in this regard.

The structure of the heat sink 6 in the present embodiments may be the same as in the embodiments described above, that is, the bent heat exchange body 61 is adopted. Alternatively, the structure of the heat sink 6 in the present embodiments may be adopted with a straight strip-shaped heat exchange body 61. Alternatively, beside the heat sink 6 with the micro-passages described above, other types of heat sinks may be adopted. The embodiments of the present disclosure do not limit the specific structure of the heat sink 6. In addition, other embodiments of the present disclosure that apply the heat sink to the electric control box may be adopted with the various heat sinks disclosed herein, or with other heat sinks well known in the art.

7. Waterproof for Condensate Water

Figure 35:
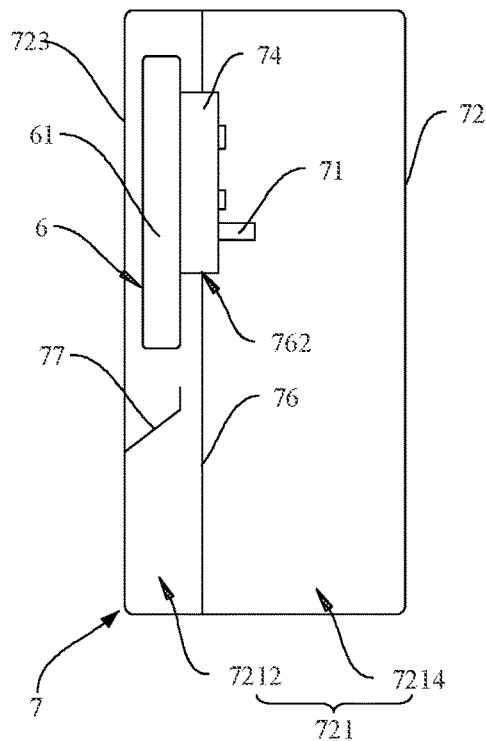
FIG. 35 is a cross-sectional structure schematic view illustrating the coordination between the heat sink and the electric control box according to some embodiments of the present disclosure.

Referring to FIG. 35, the electric control box 7 of the present embodiments includes the box body 72, a mounting plate 76, the electronic component 71, and the heat sink 6.

The box body 72 defines the mounting cavity 721, the mounting plate 76 is disposed in the mounting cavity 721 so that the mounting cavity 721 includes a first cavity 7212 and a second cavity 7214 on two sides of the mounting plate 76. The electronic component 71 is disposed in the second cavity 7214, at least a portion of the heat exchange body 61 is disposed in the first cavity 7212 and is in thermally conductive connection with the electronic component 71, and the mounting plate 76 is configured to block the condensate water on the heat sink 6 from flowing into the second cavity 7214.

By disposing the mounting plate 76 for dividing the mounting cavity 721 in the electric control box 7, the heat exchange body 61 and the electronic component 71 are respectively disposed in the first cavity 7212 and the second cavity 7214 which are independent of each other, so that the electronic component 71 may be completely isolated from the condensate water, and short circuit or damage of the electronic component 71 caused by contacting the condensate water may be avoided.

Further, the heat dissipation fixing plate 74 may be disposed to indirectly connect the electronic component 71 to the heat exchange body 61.

In some embodiments, an avoiding hole 762 may be defined on the mounting plate 76 at a position corresponding to the heat dissipation fixing plate 74. The heat dissipation fixing plate 74 is connected to the heat exchange body 61 and seals off the avoiding hole 762. The electronic component 71 is disposed on a side of the heat dissipation fixing plate 74 away from the heat exchange body 61, so that the electronic component 71 to the heat exchange body 61 may be in thermally conductive connection through the heat dissipation fixing plate 74, and the first cavity 7212 from the second cavity 7214 may be separated through the heat dissipation fixing plate 74, so as to prevent the condensate water from flowing into the second cavity 7214 receiving the electronic component 71 through the avoiding hole 762, and further prevent the condensate water from contacting the electronic component 71.

Further, when more condensate water is generated on the heat exchange body 61, the condensate water may fall down under the action of gravity after being accumulated, and the dripped condensate water is easy to sputter, bringing hidden dangers to circuits in the electric control box 7, and the dispersed condensate water is not easy to be discharged out of the electric control box 7.

Based on above, as shown in FIG. 35, a flow guide plate 77 may be disposed in the electric control box 7. The flow guide plate 77 is disposed below the heat sink 6 and configured for collecting the condensate water dripping from the heat sink 6, so that the dripping height of the condensate water may be reduced, and the sputtering of the condensate water may be avoided. The flow guide plate 77 further has a certain accumulation effect on the condensate water, so that the condensate water may be conveniently discharged out of the electric control box 7 after being converged.

As shown in FIG. 35, the flow guide plate 7 is fixed on the bottom plate 723 of the electric control box 7. An end of the flow guide plate 77 is connected to the bottom plate 723, and the other end of the flow guide plate 77 extends into the first cavity 7212. A projection of the heat sink 6 along the vertical direction is within the flow guide plate 77, so that condensate water dripping from the heat sink 6 may fall on the flow guide plate 77, thereby preventing the condensate water from dripping to other positions of the electric control box 7.

In other embodiments, the heat sink 6 may be disposed on the mounting plate 76. An end of the flow guide plate 77 is connected to the mounting plate 76, and the other end of the flow guide plate 77 extends into the first cavity 7212. The projection of the heat sink 6 along the vertical direction is within the flow guide plate 77.

Figure 36:
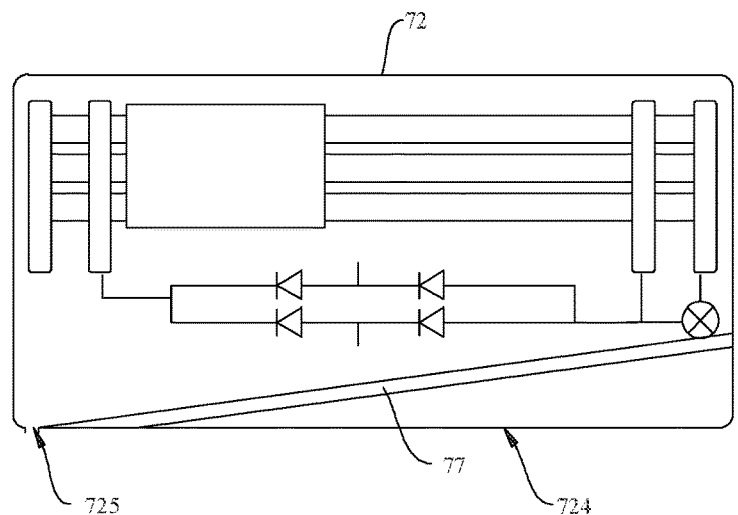
FIG. 36 is a structure schematic view of some embodiments of a flow guide plate of FIG. 35.

Further, as shown in FIG. 36, in order to facilitate timely discharging the condensate water on the flow guide plate 77 from the electric control box 7, a water outlet 725 may be defined on a bottom wall of the box body 72, and the flow guide plate 77 may be obliquely disposed relative to the bottom wall of the box body 72. In this way, the condensate water is guided by the flow guide plate 77 and discharged out of the box body 72 through the water outlet 725.

In some embodiments, the water outlet 725 may be defined on the circumferential side plate 724 of the electric control box 7. The flow guide plate 77 is connected to the mounting plate 76 or the bottom plate 723 of the box body 72 and is obliquely disposed in a direction toward the water outlet 725. After the condensate water drips on the flow guide plate 77, the condensate water can converge to the position of the water outlet 725 along the oblique flow guide plate 77 and is discharged out of the electric control box 7 through the water outlet 725.

The number and the size of the water outlet 725 may be flexibly set according to the amount of the condensate water, and the embodiments of the present disclosure are not limited in this regard.

In some embodiments, the flowing direction of the refrigerant medium in the heat exchange body 61 may be set horizontal. That is, the extending direction of the heat exchange body 61 is disposed along the horizontal direction. On one hand, the flowing path of the condensate water on the heat exchange body 61 may be shortened, so that the condensate water drips on the flow guide plate 77 as soon as possible under the action of gravity, the condensate water may be discharged out of the electric control box 7 in time, and the condensate water is prevented from contacting the electronic component 71 disposed in the mounting cavity 721. On the other hand, interference between the flow guide plate 77 and the heat exchange body 61 may be avoided, so that a relatively long heat exchange body 61 may be disposed, and the heat exchange efficiency of the heat sink 6 may be improved.

Figure 37:
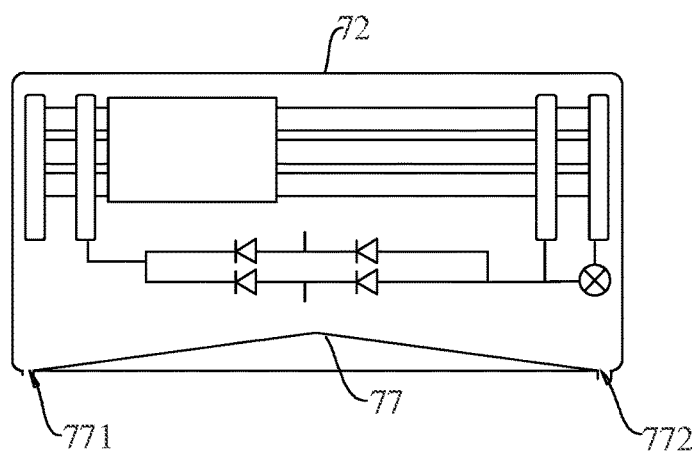
FIG. 37 is a structural schematic view of some embodiments of the flow guide plate of FIG. 35.

In other embodiments, as shown in FIG. 37, in a direction from a middle area of the flow guide plate 77 to two ends of the flow guide plate 77, the height of the flow guide plate 77 gradually decreases in the vertical direction, so as to make the condensate water dripped on the flow guide plate 77 flow to the two ends of the flow guide plate 77. That is, the flow guide plate 77 is disposed in an inverted V shape. In this way, the overall height of the flow guide plate 77 along the vertical direction may be reduced, the interference between the flow guide plate 77 and other parts in the electric control box 7 may be avoided, and the condensate water from the heat sink 6 dripped on the flow guide plate 77 may be quickly discharged.

Further, as shown in FIG. 37, the box body 72 defines a first water outlet 771 and a second water outlet 772 that correspond to the two ends of the flow guide plate 77 respectively, so that the condensate water flowing to the two ends of the flow guide plate 77 is discharged. The condensate water dripped on the flow guide plate 77 flows to the two ends of the flow guide plate 77, and is discharged out of the box body 72 through the first water outlet 771 and the second water outlet 772.

Figure 38:
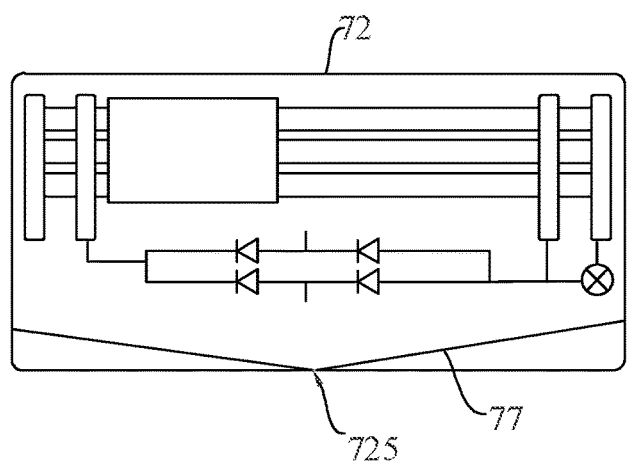
FIG. 38 is a structural schematic view of some embodiments of the flow guide plate of FIG. 35.

In other embodiments, as shown in FIG. 38, in the direction from the middle area of the flow guide plate 77 to the two ends, the height of the flow guide plate 77 is gradually increased in the vertical direction, so that the condensate water dripping on the flow guide plate 77 flows to the middle area of the flow guide plate 77. That is, the flow guide plate 77 may be disposed in a V shape. In this way, the condensate water may be collected to the middle area of the flow guide plate 77 through the flow guide plate 77 and may be discharged from the middle area.

Further, as shown in FIG. 38, the box body 72 defines the water outlet 725 corresponding to the middle area of the flow guide plate 77, so as to discharge the condensate water flowing to the middle area of the flow guide plate 77, which facilitates collection and drainage of the condensate water.

The number and the size of the water outlet 725, the first water outlet 771, and the second water outlet 772 may be flexibly set according to the amount of condensate water, and the embodiments of the present disclosure are not limited in this regard.

The flow guide plate 77 described above may be disposed below the heat sink 6, wherein the heat sink 6 may be installed in the electric control box 7 in other ways and configured to dissipate heat from the electronic component 71 in the electric control box 7. The present disclosure is not limited to the embodiments described above.

Figure 39:
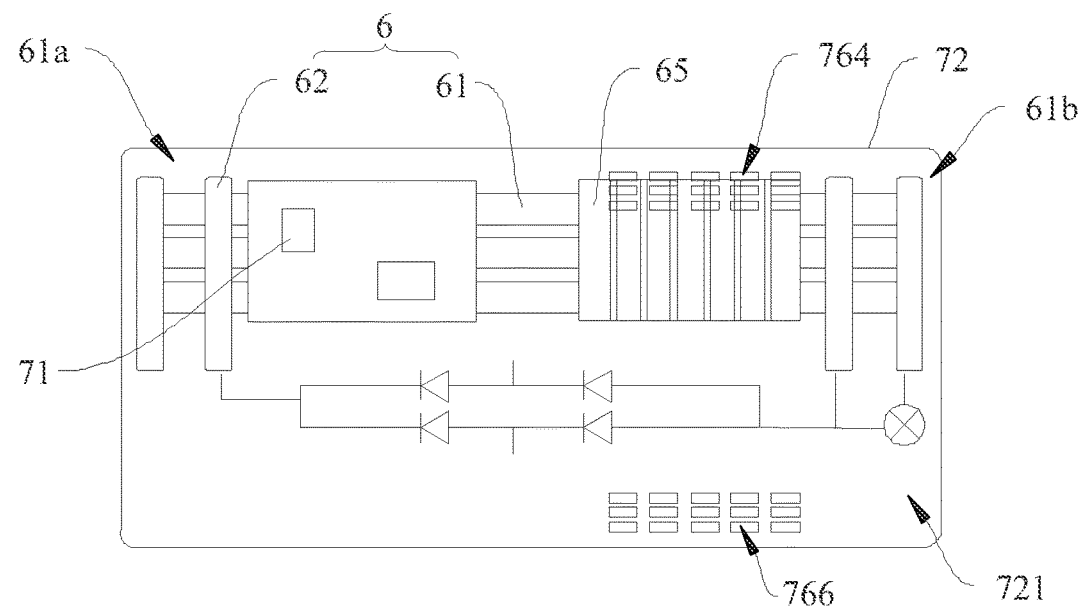
FIG. 39 is a plane structural schematic view illustrating the coordination between the heat sink and the electric control box according to some embodiments of the present disclosure.

8. Electronic Component Disposed in Upstream of Heat Sink, and Heat Dissipation Fins Disposed in Downstream of Heat Sink As shown in FIG. 39, the box body 72 defines the mounting cavity 721, and at least a portion of the heat exchange body 61 is disposed in the mounting cavity 721. The electronic component 71 is in thermally conductive connection with the heat exchange body 61 at a first position. The heat dissipation fins 65 are in thermally conductive connection with the heat exchange body 61 at a second position. The first position and the second position are spaced apart from each other along the flowing direction of the refrigerant medium in the heat exchange body 61. As described above, the refrigerant medium referred to herein may be either the main-path refrigerant medium or the auxiliary-path refrigerant medium in the air conditioning system shown in FIGS. 1 to 4.

In the present embodiments, the electronic component 71 and the heat dissipation fins 65 are spaced apart from each other along the flowing direction of the refrigerant medium in the heat exchange body 61, so that the space on the heat exchange body 61 may be fully utilized. Further, not only may the heat exchange body 61 be utilized to dissipate heat from the electronic component 71, but also the heat dissipation fins 65 may be utilized to reduce the temperature of the mounting cavity 721 of the electric control box 7, thereby protecting the electronic component 71 disposed in the mounting cavity 721.

Further, the heat exchange body 61 includes the first end 61a and the second end 61b that are spaced apart from each other in the flowing direction of the refrigerant medium. The temperature of the heat exchange body 61 gradually decreases in the direction from the first end 61a to the second end 61b. That is, the temperature of the first end 61a is greater than the temperature of the second end 61b, and the first position is closer to the first end 61a than the second position.

In some embodiments, during operation of the heat exchange body 61, the surface temperature of the heat exchange body 61 varies with the flowing direction of the refrigerant medium, forming the first end 6A with a higher temperature and the second end 61b with a lower temperature. The temperature difference between first end 6A with the higher temperature and the hot air in the mounting cavity 721 is less, so that it is not easy to generate the condensate water. Therefore, the electronic component 71 may be disposed close to the first end 6A. That is, the first position is close to the first end 6A. The temperature difference between the second end 61b with the lower temperature and the hot air in the mounting cavity 721 is greater, so that it is easy to generate the condensate water. Therefore, the heat dissipation fins 65 may be disposed close to the second end 61b. On one hand, the heat dissipation fins 65 with lower temperature may ensure that the temperature difference between the heat dissipation fins 65 and the hot air is large enough to dissipate heat from the electric control box 7. On the other hand, the condensate water formed by condensation on the heat dissipation fins 65 may be evaporated under the action of hot air, and the condensate water absorbs heat when being evaporated, so that the temperature of the refrigerant medium is further reduced, and the heat exchange effect of the heat sink 6 is improved.

8.1 Accelerating Flow Rate of Heat Dissipation Airflow

Figure 40:
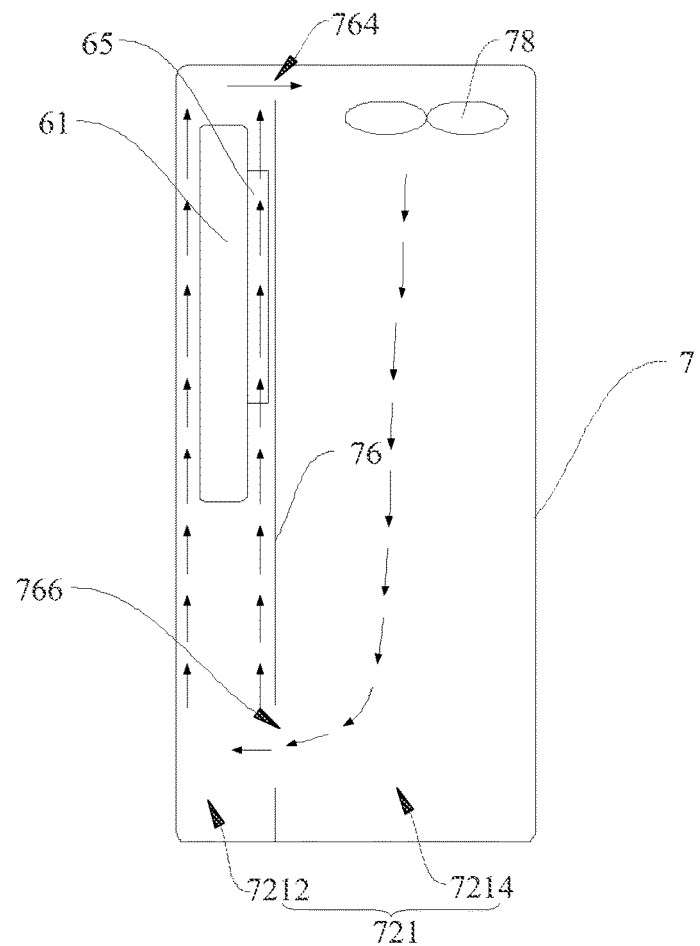
FIG. 40 is a cross-sectional structural schematic view illustrating the coordination between the heat sink and the electric control box of FIG. 39.

Furthermore, as shown in FIG. 40, a cooling fan 78 may further be disposed in the electric control box 7, and the cooling fan 78 is configured to generate a heat dissipation airflow in the electric control box 7 to act on the heat dissipation fins 65, so that a flowing speed of the heat dissipation airflow may be accelerated, and the heat exchange effect is further improved.

In some embodiments, the cooling fan 78 may be disposed close to the heat dissipation fins 65 to directly perform heat dissipation on the heat dissipation fins 65.

In some embodiments, as shown in FIG. 40, the mounting plate 76 may further be disposed in the electric control box 7. The mounting plate 76 is disposed in the mounting cavity 721, so that the mounting cavity 721 is divided into the first cavity 7212 and the second cavity 7214 on two sides of the mounting plate 76. A first vent 764 and a second vent 766 are defined in the mounting plate 76 and are spaced apart from each other, so that the air in the first cavity 7212 flows into the second cavity 7214 through the first vent 764, and the air in the second cavity 7214 flows into the first cavity 7212 through the second vent 766. At least part of the heat exchange body 61 is located in the first cavity 7212, and the electronic component 71 and the cooling fan 78 are disposed in the second cavity 7214.

The mounting cavity 721 is divided, by the mounting plate 76, into the first cavity 7212 and the second cavity 7214 that are independent of each other. The circulating airflow may be generated in the first cavity 7212 and the second cavity 7214 to increase the volume of the air that contacts the heat dissipation fins 65 disposed in the first cavity 7212. The cooled airflow may conveniently dissipate the heat of the electronic component 71 disposed in the second cavity 7214, so that the air is prevented from being mixed, and the heat dissipation efficiency of the heat dissipation fins 65 is improved.

The cooling fan 78 disposed in the second cavity 7214 is configured to accelerate the flowing speed of the air in the second cavity 7214, so that a speed of the air circulating between the first cavity 7212 and the second cavity 7214 is accelerated, and the heat dissipation efficiency of the electric control box 7 is improved.

Further, the direction of the heat dissipation airflow that flows through the heat dissipation fins 65 may be perpendicular to the flowing direction of the refrigerant medium.

As shown in FIGS. 39 and 40, when the refrigerant medium in the heat exchange body 61 is flowing in the horizontal direction, the heat dissipation airflow may be directed to flow in the vertical direction to prevent the heat dissipation airflow from flowing to the position where the electronic component 71 is located.

In some embodiments, the first vent 764 and the second vent 766 may be spaced apart from each other and disposed on two opposite sides of the heat dissipation fin 65 in the vertical direction. The number and arrangement density of the first vents 764 and the number and arrangement density of the second vents 766 may be determined according to demands.

In some embodiments, when the refrigerant medium in the heat exchange body 61 is flowing in the vertical direction, the heat dissipation airflow may be directed to flow in the horizontal direction to prevent the heat dissipation airflow from flowing to the position where the electronic component 71 is located. Alternatively, the flowing direction of the heat dissipation airflow and the flowing direction of the refrigerant medium may be directed to flow in two mutually perpendicular directions, the flowing directions are not limited by the present disclosure.

Further, when the first vent 764 and the second vent 766 are vertically disposed, the first vent 764 may be disposed above the second vent 766, such that the hot air entering the first cavity 7212 through the second vent 766 automatically rises to the position where the heat exchange body 61 is located, and exchanges heat with the heat exchange body 61.

In some embodiments, the cooling fan 78 may be disposed close to the first vent 764 to facilitate the cooled air at the top of the first cavity 7212 to enter the second cavity 7214 in time, and the cooling fan 78 may accelerate the cooled air to enhance the heat dissipation efficiency of the electronic component 71.

9. Internal Circulation

Typically, in order to cool the electric control box 7, the box body 72 of the electric control box 7 may define a heat dissipation hole communicated with the mounting cavity 721, to achieve natural air convection between the air in the mounting cavity 721 and the external air through the heat dissipation hole, thereby cooling the electric control box 7. However, sealing performance of the electric control box 7 is reduced by defining the heat dissipation hole in the box body 72, so that impurities such as moisture and dust at the outside of the box body 72 may enter the mounting cavity 721 through the heat dissipation hole, damaging electronic components disposed in the mounting cavity 721.

Figure 41:
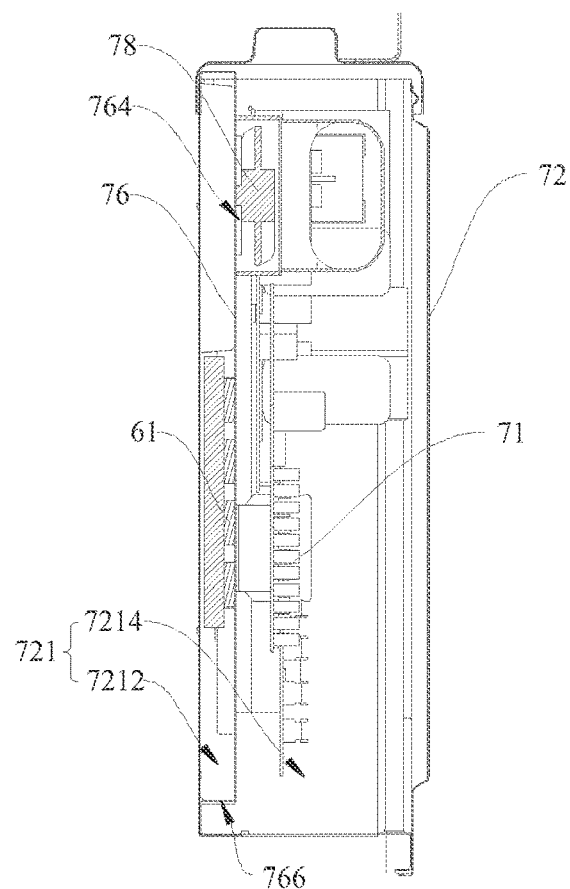
FIG. 41 is a cross-sectional structural schematic view illustrating the coordination between the heat sink and the electric control box according to some embodiments of present disclosure.

In order to solve the problems, the box body 72 of the electric control box 7 may be configured as a sealed structure. In some embodiments, as shown in FIG. 41, the electric control box 7 includes the box body 72, the mounting plate 76, the heat sink 6, the electronic component 71, and the cooling fan 78.

The box body 72 defines the mounting cavity 721, and the mounting plate 76 is disposed in the mounting cavity 721, such that the mounting cavity 721 is divided into the first cavity 7212 and the second cavity 7214 disposed on two sides of the mounting plate 76, respectively. The mounting plate 76 defines the first vent 764 and the second vent 766 spaced apart from each other, and the first vent 764 and the second vent 766 communicate with the first cavity 7212 and the second cavity 7214. At least part of the heat sink 6 is disposed in the first cavity 7212. The electronic component 71 is disposed in the second cavity 7214 and is in thermally conductive connection with the heat sink 6. The cooling fan 78 is configured to supply wind, such that the air in the first cavity 7212 flows into the second cavity 7214 through the first vent 764.

In some embodiments, the heat sink 6 is disposed at least partially in the first cavity 7212, and the electronic component 71 and the cooling fan 78 are disposed in the second cavity 7214. The first vent 764 and the second vent 766 spaced apart from each other and communicating with the first cavity 7212 and the second cavity 7214 are defined in the mounting plate 76. Thus, the electronic component 71 generates heat to cause the temperature of the air in the second cavity 7214 to be higher. The cooling fan 78 directs the hot air to the second vent 766. Since the density of the hot air is small, the hot air naturally rises to contact the heat sink 6 disposed in the first cavity 7212. The heat sink 6 is configured to cool the hot air to form cold air, and the cold air flows into the second cavity 7214 from the first vent 764. The cooling fan 78 is configured to accelerate the cold air, enabling the cold air to cool the electronic component 71 disposed in the second cavity 7214. The temperature of the cold air after performing heat exchange with the electronic component 71 is increased. The cold air with the increased temperature is directed by the cooling fan 78 to enter the second vent 766. In this way, air circulation is generated, and the electronic component 71 disposed in the electric control box 7 is cooled by the internal circulation. Compared with the mode that the electric control box 7 defines the heat dissipation hole for cooling, the electric control box 7 in the present disclosure is a completed sealed electric control box 7, so that the water proof, insect control, dust proof, moisture proof and the like may be effectively achieved, and electric control reliability of the electric control box 7 is improved.

Figure 42:
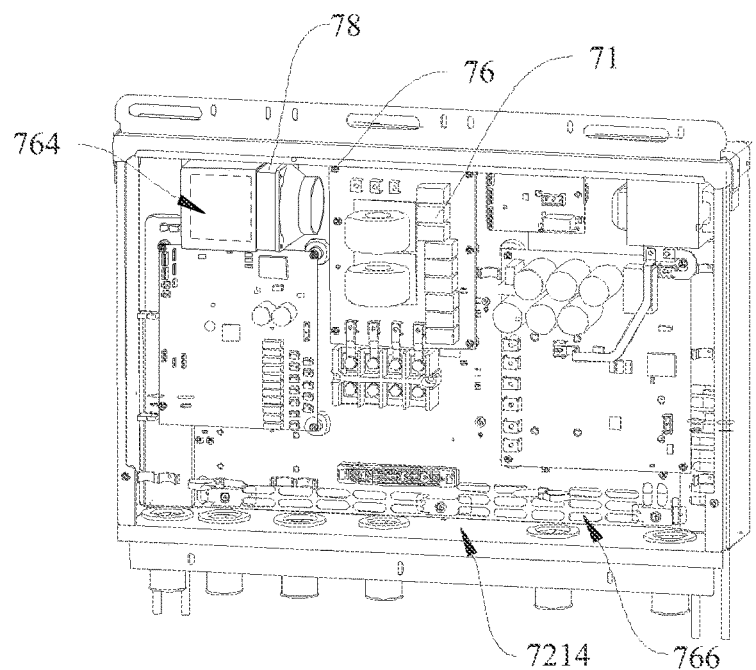
FIG. 42 is a perspective view of the electric control box with a part of the components removed in some embodiments of present disclosure.

In some embodiments, as shown in FIG. 42, a plane where the cooling fan 78 is located is perpendicular to a plane where the mounting plate 76 is located, and a leeward side of the cooling fan 78 is facing toward the first vent 764.

In some embodiments, the cooling fan 78 may be disposed on a side of the mounting plate 76 facing the second cavity 7214. An extending direction of a rotating axis of the cooling fan 78 is parallel to the plane where the mounting plate 76 is located. The leeward side of the cooling fan 78 refers to an air intake side of the cooling fan 78. In some embodiments, the cooling fan 78 may be disposed between the first vent 764 and the electronic component 71, and the cold air entering the second cavity 7214 through the first vent 764 flows out after being accelerated by the cooling fan 78, so that the flowing speed of the cold air is increased, and the heat dissipation efficiency of the electric control box 7 is improved.

Figure 43:
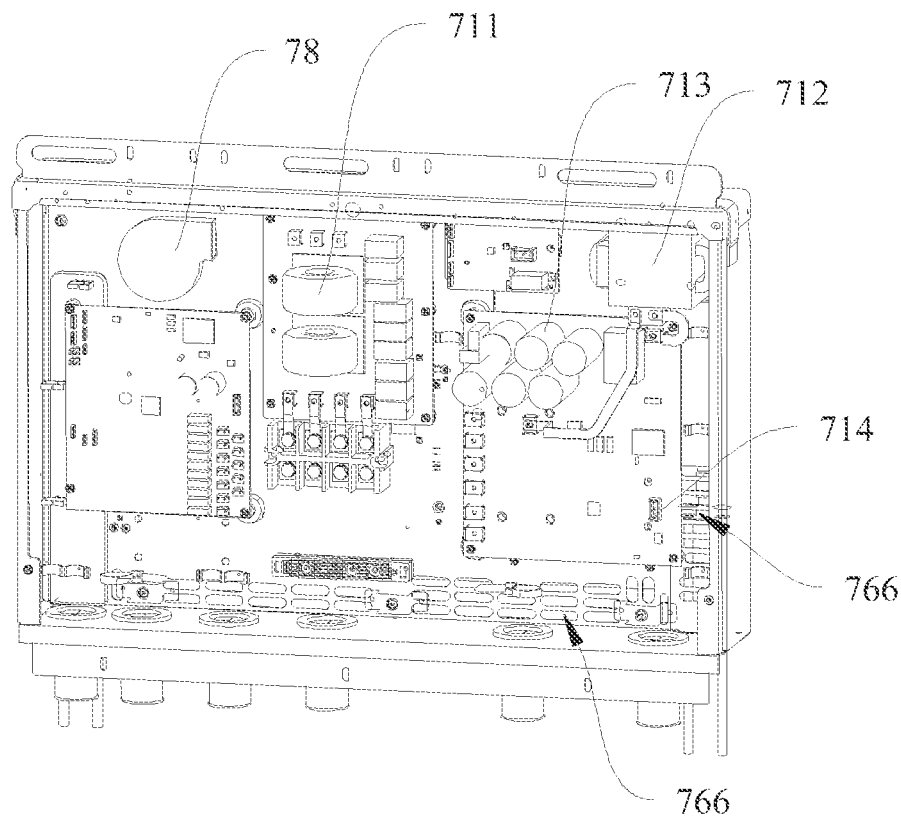
FIG. 43 is a perspective view of the electric control box with a part of the components removed in some embodiments of present disclosure.

In some embodiments, as shown in FIG. 43, the cooling fan 78 may alternatively be configured as a centrifugal fan.

The centrifugal fan is a mechanical device that increases, by an input mechanical energy, a pressure of the air and exhausts the air. A working principle of the centrifugal fan is to accelerate the air by a high-speed rotating impeller. Therefore, in some embodiments, by configuring the cooling fan 78 as the centrifugal fan, on one hand, the high-speed cold air may be obtained, and the heat dissipation efficiency of the electronic component 71 may be improved; and on the other hand, as the centrifugal fan, the structure of the cooling fan 78 may be simplified, and a mounting efficiency may be improved.

Air deflectors (not shown) may further be arranged on the mounting plate 76 and may be spaced apart from each other. Air guide channel may be formed between the air deflectors for guiding the air blown by the cooling fan 78.

In some embodiments, two air deflectors that are parallel to and spaced apart from each other may be provided between dispersedly disposed electronic components 71. An extending direction of each of the air deflectors is along a spacing direction of the electronic components 71, so that the air guide channel defined between the two air deflectors may be extending along the spacing direction of the electronic components 71. The cold air blown by the cooling fan 78 first flows to the position where a part of the electronic components 71 is located to dissipate heat from the electronic component 71. The air passing through the part of the electronic component 71 further flows to the position where the other part of the electronic components 71 is located through the air guide channel to dissipate heat from the other part of the electronic components 71. Therefore, the heat dissipation of the electronic components 71 is more uniform to prevent the electronic components 71 from being damaged caused by the temperature at the part of the electronic components 71 being excessively high.

The heat sink 6 may be disposed in the electric control box 7, that is, the heat exchange body 61 may be disposed in the first cavity 7212 to cool the air in the first cavity 7212.

In some embodiments, the heat sink 6 may be disposed outside of the electric control box 7, and at least part of the heat sink 6 extends to an inside of the first cavity 7212. In some embodiments, in the case where the heat sink 6 includes the heat exchange body 61, the collecting tube assembly 62, and the heat dissipation fins 65, an assembly port (not shown) communicating with the first cavity 7212 may be defined in the box body 72. In this case, the heat exchange body 61 is connected to an outer side wall of the box body 72, and the heat dissipation fins 65 are connected to the heat exchange body 61 and inserted into the first cavity 7212 through the assembly port.

The connection between the heat sink 6 and the electric control box 7 in some present embodiments is the same as that in the above embodiments. The connection may be referred to the description in the above embodiments and will not be repeated here.

As shown in FIG. 43, the electronic component 71 may be disposed within a range covered by air supplied by the cooling fan 78, so that the cooling fan 78 directly performs heat dissipation on the electronic component 71 to cool the electronic component 71.

The electronic component 71 may include a primary heating element having a large calorific value, such as a common mode inductor 711, a reactance 712 and a capacitor 713; and a secondary heating element having a small calorific value, such as a fan module 714. In order to improve the heat dissipation efficiency of the primary heating element, a distance between the primary heating element and the first vent 764 may be set to be less than a distance between the secondary heating element and the first vent 764. That is, the primary heating element having the large calorific value may be disposed close to the first vent 764, and the secondary heating element having the small calorific value may be disposed away from the first vent 764. Thus, the lower temperature air entering the cavity through the first vent 764 first perform heat dissipation on the primary heating element having the large calorific value to improve the heat dissipation efficiency of the primary heating element having the large calorific value.

In some embodiments, the second vent 766 may be disposed at the end of a flowing path of the airflow generated by the cooling fan 78, and close to the electronic component 71 with the large calorific value. On one hand, the range covered by the airflow generated by the cooling fan 78 may be increased, and the circulation efficiency of the air in the second cavity 7214 may be improved. On the other hand, the hot air after performing heat exchange with the electronic component 71 having the large calorific value may be discharged out of the second cavity 7214 in time, so that the temperature of the whole second cavity 7214 is prevented from being increased.

Further, the second vent 766 may be disposed close to the first vent 764 to shorten a circulation path of the air in the second cavity 7214, reduce resistance against the airflow, improve the air circulation efficiency, and further improve the heat dissipation efficiency of the electric control box 7.

Further, sizes of the first vent 764 and the second vent 766 may be determined according to the arrangement of the electronic components 71.

In some embodiments, the number of second vents 766 may be multiple. The multiple second vents 766 may be disposed at different positions on the mounting plate 76. A size of any second vent 766 located at the position where the electronic component 71 having the large calorific value is arranged may be relatively larger, the number of second vents 766, which are located at the position where the electronic component 71 having the large calorific value is arranged, may be relatively larger, and the distribution density of the second vents 766, which are located at the position where the electronic component 71 having the large calorific value is arranged, may be relatively larger. A size of any second vent 766 located at the position where the electronic component 71 having the small calorific value is arranged may be relatively smaller. The number of second vents 766, which are located at the position where the electronic component 71 having the small calorific value is arranged, may be relatively smaller, and the distribution density of the second vents 766, which are located at the position where the electronic component 71 having the small calorific value is arranged, may be relatively smaller.

Further, the size of the first vent 764 may be greater than that of the second vent 766 to increase a volume of returning air and to improve the efficiency of the cooling fan 78.

10. Natural Convection

Figure 44:
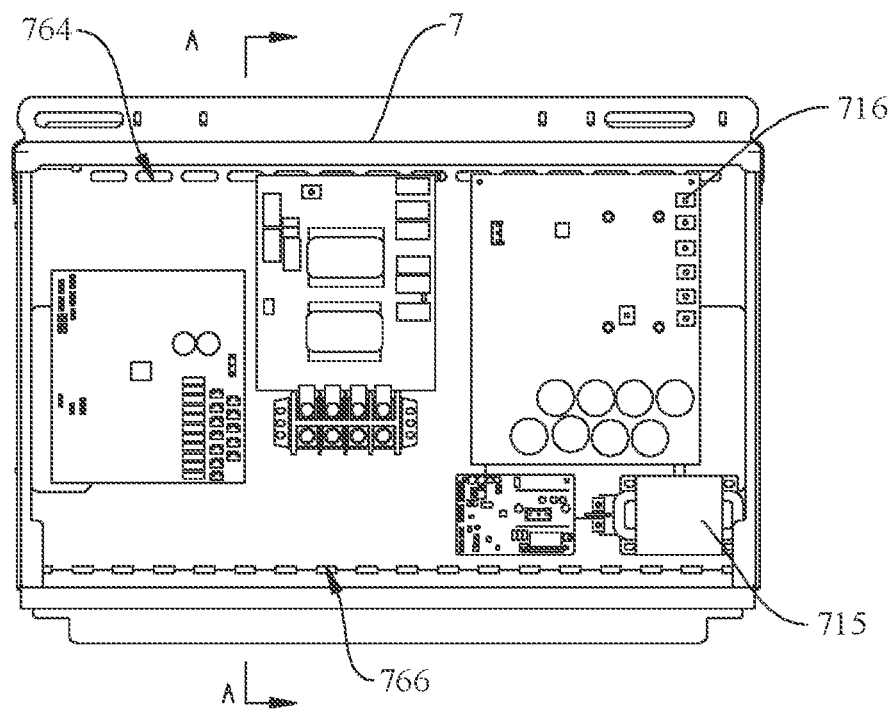
FIG. 44 is a plane structure schematic view of the electric control box with a part of the components removed in some embodiments of present disclosure.
Figure 45:
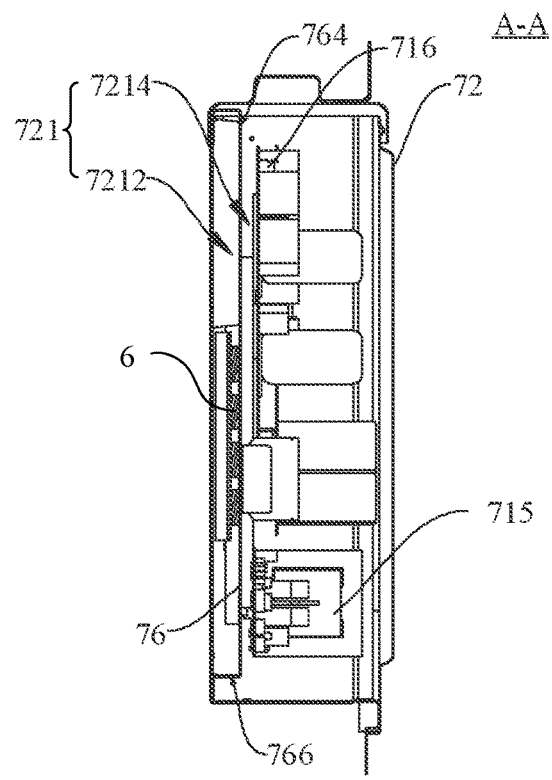
FIG. 45 is a cross-sectional structure schematic view of the electric control box of FIG. 44.

Referring to FIGS. 44 and 45, in some present embodiments, the electric control box 7 includes the box body 72, the mounting plate 76, the heat sink 6, and a primary heating element 715.

The box body 72 defines the mounting cavity 721, the mounting plate 76 is disposed in the mounting cavity 721, so that the mounting cavity 721 is divided into the first cavity 7212 and the second cavity 7214 that are disposed on two sides of the mounting plate 76 respectively. The mounting plate 76 defines the first vent 764 and the second vent 766 that are spaced apart from each other along the vertical direction. At least part of the heat sink 6 is disposed in the first cavity 7212. The primary heating element 715 is disposed in the second cavity 7214. The first vent 764 and the second vent 766 communicate with the first cavity 7212 and the second cavity 7214, such that the heat dissipation airflow, which is circulating between the first cavity 7212 and the second cavity 7214, is generated due to a temperature difference between the primary heating element 715 and the heat sink 6.

In some embodiments, the primary heating element 715 is disposed in the second cavity 7214. The heat generated by the operation of the primary heating element 715 causes the temperature in the second cavity 7214 to rise. Since the density of the hot air is small, the hot air naturally rises and enters the first cavity 7212 through the first vent 764 located at the top of the second cavity 7214. The hot air contacts the heat sink 6 and exchanges heat with the heat sink 6. The temperature of the hot air is reduced, and the density of the temperature-reduced air is increased. The temperature-reduced air naturally sinks to the bottom of the first cavity 7212 due to the gravity, and enters the second cavity 7214 through the second vent 766 to cool the primary heating element 715 disposed in the second cavity 7214. After exchanging heat with the primary heating element 715, the hot air further rises to the position where the first vent 764 is located. In this way, an internal circulating airflow between the first cavity 7212 and the second cavity 7214 is generated.

In some present embodiments, the first vent 764 and the second vent 766 communicating with the first cavity 7212 and the second cavity 7214 are defined in the mounting plate 76, and the first vent 764 and the second vent 766 are disposed in the vertical direction. The airflow circulating between the first cavity 7212 and the second cavity 7214 is achieved by the gravity of the air, thereby cooling the electronic component 71 disposed in the second cavity 7214, and reducing the overall temperature of the electric control box 7. Compared with configuring the cooling fan 78 to supply wind, the structure of the electric control box 7 in the present embodiments is more concise, the assembly efficiency of the electric control box 7 may be improved, and the production cost of the electric control box 7 may be reduced.

Further, the heat sink 6 may be disposed above the primary heating element 715 in the direction of gravity. That is, the heat sink 6 is disposed close to the top of the first cavity 7212, and the primary heating element 715 is disposed close to the bottom of the second cavity 7214. In this way, the distance between the heat sink 6 and the first vent 764 may be reduced, so that the hot air entering the first cavity 7212 through the first vent 764 may quickly contact the heat sink 6 to be cooled, and naturally sinks due to the gravity. By reducing the distance between the primary heating element 715 and the second vent 766, the hot air entering the second cavity 7214 through the second vent 766 may quickly contact the primary heating element 715 to be heated, and naturally rises due to buoyancy. Thus, a circulation speed of the airflow in the electric control box 7 may be increased, and the heat dissipation efficiency is improved.

Furthermore, as shown in FIG. 45, a secondary heating element 716 may be disposed in the electric control box 7. The secondary heating element 716 is disposed in the second cavity 7214 and is in thermally conductive connection with the heat exchange body 61. The amount of heat generated by the secondary heating element 716 is smaller than that of the primary heating element 715.

In some embodiments, in some embodiments, the primary heating element 715 having the large calorific value may be disposed close to the second vent 766. On one hand, the cold air entering through the first cavity 7212 may first contact the electronic component 71 having the large calorific value, improving the heat dissipation efficiency of the electronic component 71. On the other hand, a large temperature difference between the cold air and the electronic component 71 with the large calorific value may be realized, so that the cold air may be quickly heated, and then rapidly rises due to buoyancy. The secondary heating element 716 with the small calorific value is disposed on the heat exchange body 61 and contacts the heat exchange body 61, so that the heat exchange body 61 may directly cool the electronic component 71 with the small calorific value. Thus, the primary heating element 715 with the large calorific value and the secondary heating element 716 with the small calorific value are disposed in different areas, so that the electronic components 71 may be reasonably distributed, and the internal space of the electric control box 7 may be fully utilized.

In some embodiments, the secondary heating element 716 is connected to the heat exchange body 61 through the heat dissipation fixing plate 74 to improve the assembly efficiency of the secondary heating element 716.

The connection between the secondary heating element 716 and the heat exchange body 61 may be the same as that in the embodiments described above. The connection may be referred to the above embodiments, and will not be described herein.

In some embodiments, the heat sink 6 may be disposed outside of the electric control box 7 and at least partially extend into the first cavity 7212.

The connection between the heat sink 6 and the electric control box 7 is the same as that in the embodiments described above, and may be referred to the description of the embodiments described above.

11. Flow Guiding Sleeve is Disposed on Pipeline

Figure 46:
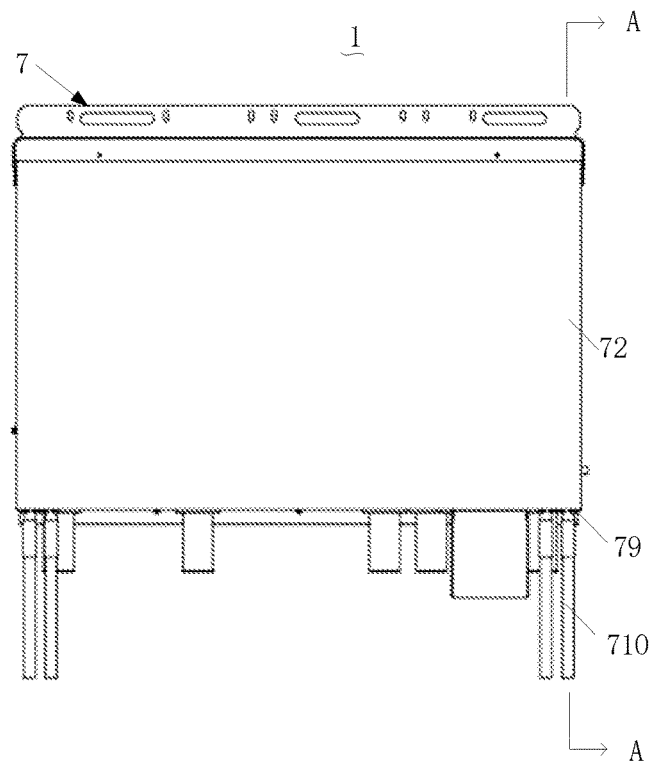
FIG. 46 is a structure schematic view of some embodiments of the air conditioning system of the present disclosure.
Figure 47:
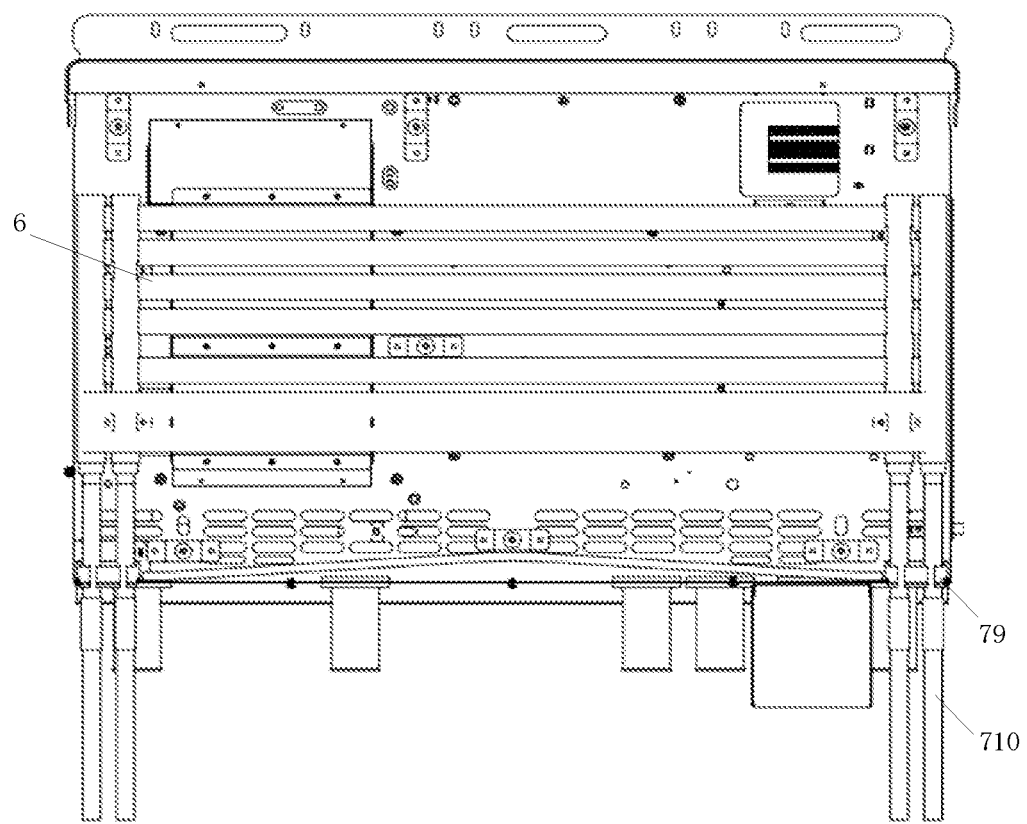
FIG. 47 is a structure schematic view of an interior structure of the air conditioning system of FIG. 46 with the box body removed.

As shown in FIGS. 46 and 47, the air conditioning system 1 of the present embodiments includes the heat sink 6, pipelines 710, and a flow guiding sleeve 79.

The pipelines 710 are configured to connect to the heat sink 6 to provide the refrigerant medium to the heat sink 6 or to collect the refrigerant medium flowing out of the heat sink 6. In some embodiments, the pipelines 710 are connected to the collecting tube assembly of the heat sink 6.

The pipelines 710 may include an input line and an output line. The input line is configured to provide the refrigerant medium to the heat sink 6, and the output line is configured to collect the refrigerant medium in the heat sink 6.

The flow guiding sleeve 79 sleeves the pipelines 710, and is configured to guide a flowing direction of condensate water that is formed on the pipelines 710 or flows through the pipeline. The condensate water on the pipelines 710 may be guided by the flow guiding sleeve 79. Further, the flow guiding sleeve 79 may protect the pipelines 710, improving the reliability of the air conditioning system 1.

Figure 48:
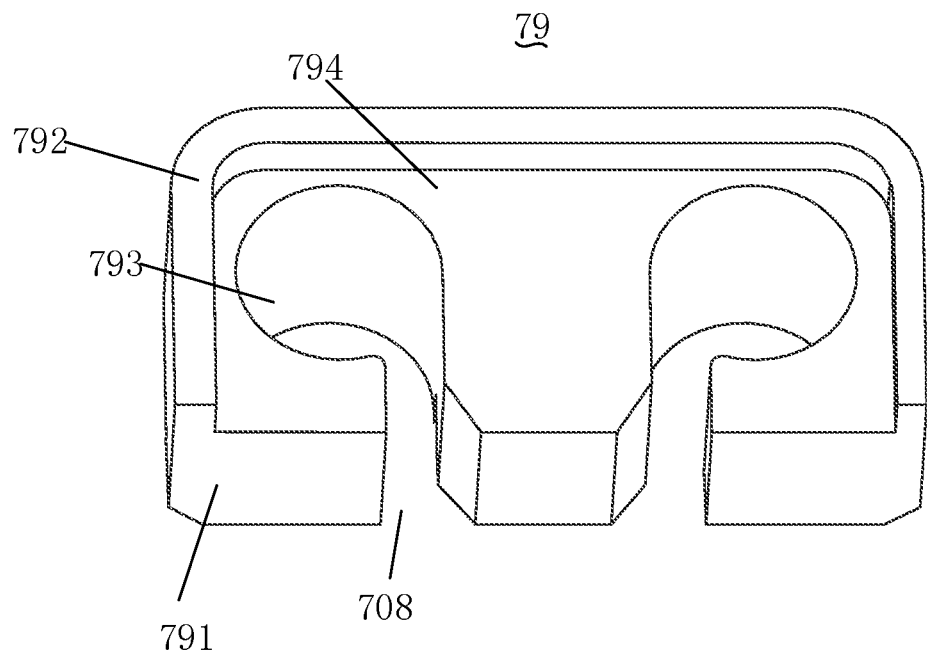
FIG. 48 is a structure schematic view of some embodiments of a drainage sleeve of FIG. 46.

In some embodiments, as shown in FIG. 48, the flow guiding sleeve 79 includes a sleeve body 791 and a flange 792.

The sleeve body 791 defines an insertion hole 793 and a drainage groove 708. The insertion hole 793 is configured to accommodate the pipelines 710. The number and a size of the insertion hole 793 may be determined according to distribution and sizes of the pipelines 710. In some embodiments, as shown in FIG. 46, two insertion holes 793 are defined. In some embodiments, the number of the insertion holes 793 may be one, three, and so on.

The sleeve body 791 may be made of a flexible material, such as thermoplastic polyurethane elastomer rubber, so as to protect the pipelines 710 and to prevent the pipelines 710 from being abrased due to contacting a sheet metal of the electrical control box.

The flange 792 is disposed at an end face of the sleeve body 791, and is located at a periphery of the insertion hole 793, and further is engaged with the sleeve body 791 to form a water collecting groove 794. The water collecting groove 794 is configured to collect the condensate water on the pipelines 710. The drainage groove 708 is communicated with the water collecting groove 794 and is configured to discharge the condensate water in the water collecting groove 794. While the air conditioning system is operating, the condensate water flows into the water collecting groove 794 of the drainage sleeve 79 along the pipelines 710, and then is discharged through the drainage groove 708 on the sleeve body 791.

As shown in FIG. 48, an outer side wall of the flange 793 is aligned with an outer side wall of the sleeve body 791 to increase a volume of the water collecting groove 794, thereby facilitating the collection of condensate water.

The pipelines 710 may be disposed along the direction of gravity. The sleeve body 791 includes an upper end face and a lower end face opposite to each other. The flange 792 and the water collecting groove 794 are disposed on the upper end face of the sleeve body 791. The drainage groove 708 allows the upper end face to be fluidly connected with the lower end face of the sleeve body 791. The condensate water on the pipelines 710 may flow into the water collecting groove 794 due to the gravity, and then may be discharged through the drainage groove 708 communicated with the water collecting groove 794. In this way, the condensate water on pipelines 710 may be discharged automatically. In some embodiments, the pipelines 710 may configured to be tilted to be applicable for different application scenarios.

As shown in FIG. 48, the drainage groove 708 is defined in the side wall of the sleeve body 791, and further communicates with the insertion hole 793 and the outer side surface of the sleeve body 791 to allow the pipelines 710 to be inserted into the insertion hole 793 through the drainage groove 708. On one hand, the flow guiding sleeve 79 may sleeve the pipelines 710 through the drainage groove 708, so that the flow guiding sleeve 79 and the pipelines 710 may be assembled conveniently; and on the other hand, the condensate water in the water collecting groove 794 may be discharged through the drainage groove 708, so that the structure of the flow guiding sleeve 79 is simplified. A size of the drainage groove 708 may be determined according to the amount of the condensate water, and no specific limitation is made here.

In some embodiments, the flange 792 has an opening on a side where the drainage groove 708 is defined to allow the pipelines 710 to enter the water collecting groove 794 through the opening, which facilitates the assembly of the flow guiding sleeve 79.

Figure 50:
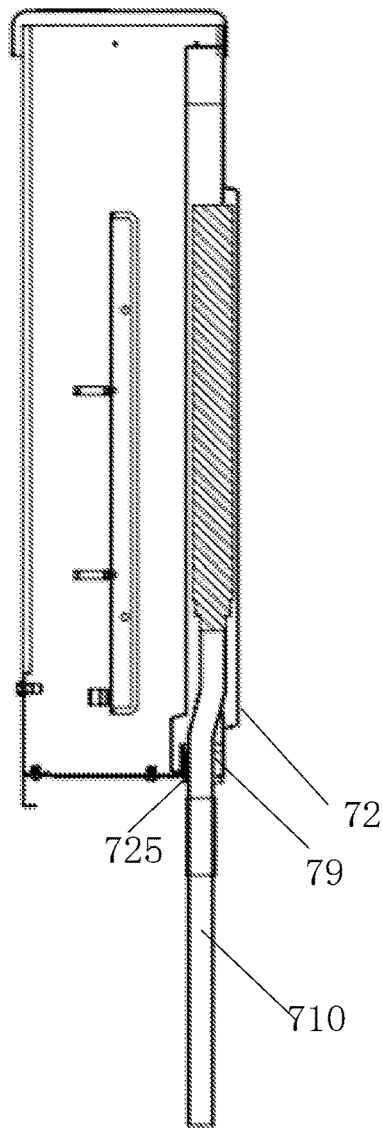
FIG. 50 is a cross-sectional structure schematic view of the air conditioning system of FIG. 46 in an A-A direction.

As shown in FIGS. 46 and 50, the air conditioning system 1 further includes the electric control box 7. The electric control box 7 includes the box body 72, and the heat sink 6 is disposed in the box body 72. In some embodiments, the box body 72 defines a water outlet 725, and the flow guiding sleeve 79 is embedded in the water outlet 725. The condensate water in the electric control box 7 may be collected in the water collecting groove 794 of the flow guiding sleeve 79 and discharged through the drainage groove 708. Thus, the discharge of the condensate water is facilitated, the electric control box 7 may be sealed through the flow guiding sleeve 79, and the reliability of the electric control box 7 is improved.

The sleeve body 791 and the flange 792 are abutted against the box body 72. The openings on the drainage groove 708 and the flange 792 are located on the abutted side of the sleeve body 791 and the box body 72. The openings of the drainage groove 708 and the flange 792 are located on sides of the sleeve body 791 and the flange 792 abutting against the box body 72. Thus, the drainage groove 708 and the opening may be blocked, by the box body 72, from the side of the flow guiding sleeve 79, so that the sealing performance of the electric control box 7 may be improved, and area of the electric control box 7 communicating with the outside environment may be reduced.

Figure 49:
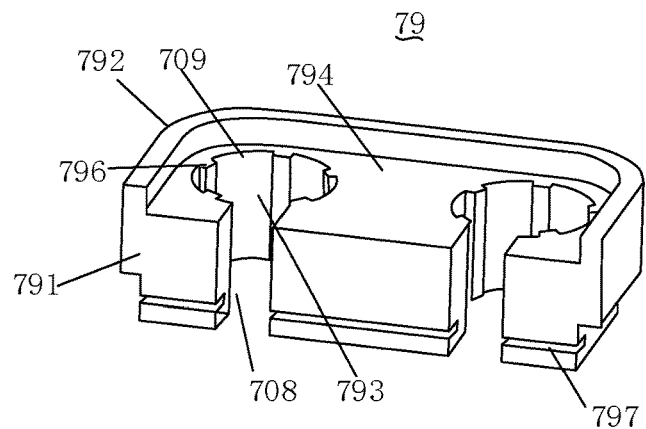
FIG. 49 is a structural schematic view of some embodiments of the drainage sleeve of FIG. 46.

In some embodiments, as shown in FIG. 49, some embodiments differ from the embodiments shown in FIG. 48 in that: a plurality of convex ribs 796 are disposed in the insertion hole 793, the plurality of convex ribs 796 are spaced apart from each other and around the pipeline 710, and the plurality of convex ribs 796 abut against the pipeline 710 to further form a drainage groove 709 between the plurality of convex ribs 796. The water collecting groove 794 communicates with the drainage groove 709, and the condensate water collected in the water collecting groove 794 may also be discharged through the drainage groove 709. In the embodiments shown in FIG. 49, the flow guiding sleeve 79 defines both the drainage groove 708 and the drainage passage 709. In this way, the discharge of the condensate water in the water collecting groove 794 is facilitated, and the condensate water in the water collecting groove 794 is prevented from overflowing. The convex ribs 796 may be connected to the upper end face and the lower end face of the sleeve body 791. The number of the convex ribs 796 may be two, three, four, five, and so on. The extending direction of the convex ribs 796 is the same as that of the pipelines 710, so that the discharge of the condensate water is facilitated.

The convex ribs 796 may be integrally formed with the sleeve body 791 to facilitate processing and make the structure of the drainage sleeve 79 more reliable. In some embodiments, the convex ribs 796 may alternatively be adhered to an inner surface of the insertion hole 793. The number of convex ribs 796 may be determined according to the actual amount of the condensate water discharged, and there is no specific limit in the present disclosure.

In some embodiments, the flow guiding sleeve 79 may define only the drainage groove 709, and no drainage groove 708 is defined. In this way, discharging the condensate water from the water collecting groove 794 may also be achieved, and the structure of the flow guiding sleeve 79 may be simplified.

As shown in FIG. 49, the sleeve body 791 may further define a fixing groove 797. The fixing groove 797 is configured to snap with the box body 72 to fix the flow guiding sleeve 79. In some embodiments, the fixing groove 797 may be defined in a side of the sleeve body 791 defining the drainage groove 708 to facilitate the installation of the flow guiding sleeve 79. The fixing groove 797 may be configured to fix the flow guiding sleeve 79, preventing the flow guiding sleeve 79 from sliding on the pipeline 710. At the same time, the flow guiding sleeve 79 may fix the pipeline 710, thereby preventing the pipeline 710 from being tilted under external forces, and improving the reliability of air conditioning system 1.

In some embodiments, the flow guiding sleeve 79 sleeves the pipelines 710 of the air conditioning system 1, so that the condensate water on the pipelines 710 may be guided, the pipelines 710 may be protected, the electric control box 7 may be sealed, and the reliability of the air conditioning system 1 is improved.

The structures of the embodiments described above may be used in combination with one another. It will be appreciated that other types of heat sinks 6 may be applied in addition to the heat sinks 6 described previously, and a specific type of the heat sink will not be limited herein.

The foregoing description is merely embodiments of the present disclosure and is not intended to limit the scope of the present disclosure. Any equivalent structure or equivalent process transformation made using the description and accompanying drawings of the present disclosure, or directly or indirectly applied in other related technical fields, are equally included in the scope of patent protection of this disclosure.

What is claimed is:

1. A heat exchanger, comprising:
   at least two plate bodies stacked with each other, wherein each of the at least two plate bodies is provided with a plurality of micro-passages and each plate body comprises a body part and a connecting part, wherein a first end of the connecting part is connected to the body part;
   at least one collecting tube, wherein the collecting tube has at least two insertion holes formed in a tube wall of the collecting tube, a second end of the connecting part of the plate body faces the insertion holes, a first distance is defined between two adjacent insertion holes defined in the tube, a second distance is defined between the body parts of two adjacent plate bodies, and the first distance is greater than the second distance; and
   at least one connecting sheet, arranged between the body parts of adjacent plate bodies of the at least two plate bodies, wherein each of two opposite sides of the at least one connecting sheet disposed with a solder, and the solder is configured to weld and fix the at least one connecting sheet with the body parts of the adjacent plate bodies of the at least two plate bodies.

2. The heat exchanger as claimed in claim 1, wherein the at least one connecting sheet disposed between the adjacent plate bodies of the at least two plate bodies is a single-layer structure, or the at least one connecting sheet comprises at least two connecting sheets disposed between the adjacent plate bodies and two adjacent ones of the at least two connecting sheets are welded and fixed with each other by solder therebetween.

3. The heat exchanger as claimed in claim 2, further comprising a main collecting tube and a baffle plate, wherein the baffle plate is disposed in the main collecting tube, the main collecting tube is divided into at least two groups of collecting tubes corresponding to the plurality of micro-passages; and the plurality of micro-passages extend through a tube wall of the main collecting tube and are communicated with the at least two groups of collecting tube correspondingly.

4. The heat exchanger as claimed in claim 3, wherein an inserting slot having a width equal to a lamination thickness of the at least two connecting sheets is defined between the at least two plate bodies, and the baffle plate is embedded into the inserting slot.

5. The heat exchanger as claimed in claim 1, wherein a melting point of the at least one connecting sheet is greater than a melting point of the solder.

6. The heat exchanger as claimed in claim 5, wherein the at least one connecting sheet is a metal foil.

7. The heat exchanger as claimed in claim 6, wherein the at least one connecting sheet is an aluminum foil or a copper foil.

8. The heat exchanger as claimed in claim 1, wherein a thickness of the at least one connecting sheet ranges from 0.9 mm to 1.2 mm.

9. The heat exchanger as claimed in claim 1, wherein a coverage area of the solder on the at least one connecting sheet, which covers a corresponding one of the adjacent plate bodies that are located on the two opposite sides of the at least one connecting sheet, is greater than or equal to 80% of an overlapping area of the adjacent plate bodies that are located on two sides of the at least one connecting sheet.

10. The heat exchanger as claimed in claim 1, wherein the at least two plate bodies comprise a first plate body and a second plate body, the first plate body is provided with a plurality of first micro-passages for a first refrigerant medium to flow, the second plate body is provided with a plurality of second micro-passages for a second refrigerant medium to flow, the second refrigerant medium is configured to absorb heat from the first refrigerant medium to subcool the first refrigerant medium, or the first refrigerant medium is configured to absorb heat from the second refrigerant medium to subcool the second refrigerant medium.

11. The heat exchanger as claimed in claim 1, wherein the at least two plate bodies are in one-to-one correspondence with the at least two insertion holes and are fixed with the collecting tube by welding, and a distance between adjacent insertion holes of the at least two insertion holes is greater than or equal to 2 mm.

12. An electric control box, comprising:
a box body, defining a mounting cavity; and
a heat exchanger, located in the mounting cavity, wherein the heat exchanger is configured to dissipate heat of the electric control box, and the heat exchanger comprises:
at least two plate bodies stacked with each other, wherein each of the at least two plate bodies is provided with a plurality of micro-passages and each plate body comprises a body part and a connecting part, wherein a first end of the connecting part is connected to the body part;
at least one collecting tube, wherein the collecting tube has at least two insertion holes formed in a tube wall of the collecting tube, a second end of the connecting part of the plate body faces the insertion holes, a first distance is defined between two adjacent insertion holes defined in the tube, a second distance is defined between the body parts of two adjacent plate bodies, and the first distance is greater than the second distance; and
at least one connecting sheet, arranged between the body parts of adjacent plate bodies of the at least two plate bodies, wherein each of two opposite sides of the at least one connecting sheet disposed with a solder, and the solder is configured to weld and fix the at least one connecting sheet with the body parts of the adjacent plate bodies of the at least two plate bodies.

13. An air conditioning system, comprising:
a compressor;
an outdoor heat exchanger;
an indoor heat exchanger; and
a heat exchanger, wherein the compressor is configured to provide a circulating refrigerant medium between the outdoor heat exchanger and the indoor heat exchanger through connecting pipelines, and the heat exchanger is disposed between the outdoor heat exchanger and the indoor heat exchanger and communicated with the connecting pipelines;
wherein the heat exchanger comprises:
at least two plate bodies stacked with each other, wherein each of the at least two plate bodies is provided with a plurality of micro-passages and each plate body comprises a body part and a connecting part, wherein a first end of the connecting part is connected to the body part;
at least one collecting tube, wherein the collecting tube has at least two insertion holes formed in a tube wall of the collecting tube, a second end of the connecting part of the plate body faces the insertion holes, a first distance is defined between two adjacent insertion holes defined in the tube, a second distance is defined between the body parts of two adjacent plate bodies, and the first distance is greater than the second distance; and
at least one connecting sheet, arranged between the body parts of adjacent plate bodies of the at least two plate bodies, wherein each of two opposite sides of the at least one connecting sheet disposed with a solder, and the solder is configured to weld and fix the at least one connecting sheet with the body parts of the adjacent plate bodies of the at least two plate bodies.

14. The air conditioning system as claimed in claim 13, wherein the at least one connecting sheet disposed between the adjacent plate bodies of the at least two plate bodies is a single-layer structure, or the at least one connecting sheet comprises at least two connecting sheets disposed between the adjacent plate bodies and two adjacent ones of the at least two connecting sheets are welded and fixed with each other by solder therebetween.

15. The air conditioning system as claimed in claim 14, further comprising a main collecting tube and a baffle plate, wherein the baffle plate is disposed in the main collecting tube, the main collecting tube is divided into at least two groups of collecting tubes corresponding to the plurality of micro-passages; and the plurality of micro-passages extend through a tube wall of the main collecting tube and are communicated with the at least two groups of collecting tube correspondingly.

16. The air conditioning system as claimed in claim 15, wherein an inserting slot having a width equal to a lamination thickness of the at least two connecting sheets is defined between the at least two plate bodies, and the baffle plate is embedded into the inserting slot.

17. The air conditioning system as claimed in claim 13, wherein a melting point of the at least one connecting sheet is greater than a melting point of the solder.

18. The air conditioning system as claimed in claim 13, wherein a coverage area of the solder on the at least one connecting sheet, which covers a corresponding one of the adjacent plate bodies that are located on the two opposite sides of the at least one connecting sheet, is greater than or equal to 80% of an overlapping area of the adjacent plate bodies that are located on two sides of the at least one connecting sheet.

19. The air conditioning system as claimed in claim 13, wherein the at least two plate bodies comprise a first plate body and a second plate body, the first plate body is provided with a plurality of first micro-passages for a first refrigerant medium to flow, the second plate body is provided with a plurality of second micro-passages for a second refrigerant medium to flow, the second refrigerant medium is configured to absorb heat from the first refrigerant medium to subcool the first refrigerant medium, or the first refrigerant medium is configured to absorb heat from the second refrigerant medium to subcool the second refrigerant medium.

20. The air conditioning system as claimed in claim 13, wherein the at least two plate bodies are in one-to-one correspondence with the at least two insertion holes and are fixed with the collecting tube by welding, and a distance between adjacent insertion holes of the at least two insertion holes is greater than or equal to 2 mm.

\* \* \* \* \*